US009398255B2

(12) United States Patent
Mihara et al.

(10) Patent No.: US 9,398,255 B2
(45) Date of Patent: Jul. 19, 2016

(54) INFORMATION PROCESSING APPARATUS, INFORMATION PROCESSING SYSTEM AND INFORMATION PROCESSING METHOD

(71) Applicants: Akihiro Mihara, Tokyo (JP); Yoshinaga Kato, Kanagawa (JP)

(72) Inventors: Akihiro Mihara, Tokyo (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 22 days.

(21) Appl. No.: 14/484,973

(22) Filed: Sep. 12, 2014

(65) Prior Publication Data

US 2015/0077511 A1 Mar. 19, 2015

(30) Foreign Application Priority Data

Sep. 19, 2013 (JP) .................................. 2013-194124
Jul. 30, 2014 (JP) .................................. 2014-155220

(51) Int. Cl.
*H04N 7/14* (2006.01)

(52) U.S. Cl.
CPC .................................... *H04N 7/147* (2013.01)

(58) Field of Classification Search
CPC ......... H04N 7/14; H04N 7/147; H04N 7/149; H04N 7/15; H04N 7/152
USPC .............................. 348/14.01–14.16; 709/204
See application file for complete search history.

(56) References Cited

U.S. PATENT DOCUMENTS 5,659,369 A * 8/1997 Imaiida ................ H04N 7/0122
348/240.2
6,252,590 B1 6/2001 Sawai et al.
2009/0234919 A1 * 9/2009 Jefremov ............ H04L 43/0894
709/204
2012/0274728 A1 * 11/2012 Yasoshima ............... H04N 7/15
348/14.07
2013/0038676 A1 2/2013 Tanaka et al.
2013/0227015 A1 8/2013 Mihara et al.
2014/0074932 A1 3/2014 Mihara et al.
2014/0077937 A1 3/2014 Kato et al.

FOREIGN PATENT DOCUMENTS

| JP | H10-124021 | 5/1998 |
| JP | 2007-233256 | 9/2007 |
| JP | 2011-254453 | 12/2011 |

OTHER PUBLICATIONS

U.S. Appl. No. 14/203,981, filed Mar. 11, 2014.

* cited by examiner

*Primary Examiner* — Melur Ramakrishnaiah
(74) *Attorney, Agent, or Firm* — Oblon, McClelland, Maier & Neustadt, L.L.P

(57) ABSTRACT

An information processing apparatus is communicably connectable to a first transmission terminal, which is communicably connected with a second transmission terminal via a network. The information processing apparatus includes an aspect ratio change unit that transforms a shape of a display region in a screen which is displayed on a display unit so that an aspect ratio of the display region is changed to a predetermined value, the display unit being integrated with the information processing apparatus or being connected to the information processing apparatus; an acquisition unit that acquires display data displayed in the display region, an aspect ratio of the display region having been changed to the predetermined value by the aspect ratio change unit; and a data transmission unit that transmits the display data displayed in the display region acquired by the acquisition unit to the first transmission terminal.

12 Claims, 40 Drawing Sheets

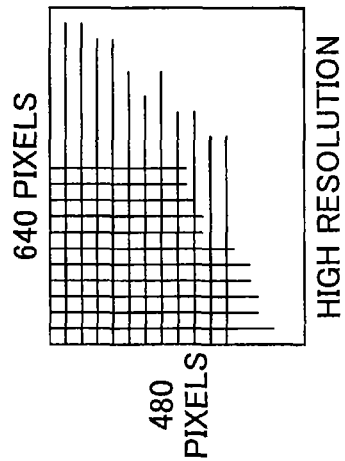
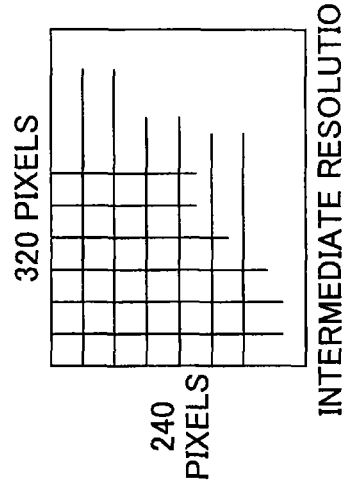
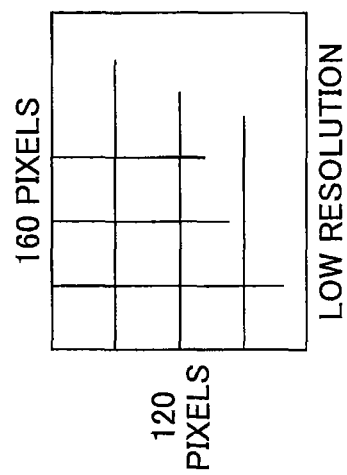

FIG.6

| IP ADDRESS OF DESTINATION TERMINAL | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | LOW IMAGE QUALITY |
| 1.3.4.3 | INTERMEDIATE IMAGE QUALITY |
| ... | ... |

FIG.7

| RELAY APPARATUS ID | OPERATIONAL STATUS | RECEPTION TIME | IP ADDRESS OF RELAY APPARATUS | MAXIMUM DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.8

| TERMINAL ID | PASSWORD |
|---|---|
| 01aa | aaaa |
| 01ab | abab |
| 01ba | baba |
| ... | ... |

FIG.9

| TERMINAL ID | OPERATIONAL STATUS | RECEPTION TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.10

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.11

| SESSION ID FOR SELECTION | RELAY APPARATUS ID | REQUEST SOURCE TERMINAL ID | DESTINATION TERMINAL ID | DELAY TIME (ms) | DELAY INFORMATION RECEPTION TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.12

| DELAY TIME (ms) | IMAGE QUALITY OF IMAGE DATA (QUALITY OF IMAGE) |
|---|---|
| 0~100 | HIGH IMAGE QUALITY |
| 100~300 | INTERMEDIATE IMAGE QUALITY |
| 300~500 | LOW IMAGE QUALITY |
| 500~ | (INTERRUPTION) |

FIG.14

| RESOLUTION (WIDTH) | RESOLUTION (HEIGHT) |
|---|---|
| 1024 | 768 | ns
INFORMATION PROCESSING APPARATUS, INFORMATION PROCESSING SYSTEM AND INFORMATION PROCESSING METHOD

BACKGROUND OF THE INVENTION

1. Field of the Invention

The disclosures herein generally relate to an information processing apparatus or the like for a communications connection with another terminal via a network and connected to a display device.

2. Description of the Related Art

Recently, a transmission system to conduct a video conference between remote locations via a communication network, such as the Internet, has become popular. In such a transmission system, by sending and receiving image data and voice data between plural transmission terminals, the video conference is realized. Moreover, according to recent enhancements of the broadband environment, high-quality image data and voice data can be sent and received, understanding the status of the other party in the video conference becomes easier, and the fulfillment of communication by a video conference has been improved.

Moreover, on conducting the video conference using the transmission terminal, a participant of the video conference may connect an external input device other than the transmission terminal, such as a personal computer (PC) of his/her own. The participant displays an image of conference materials or the like on a display unit of the external input device, and discusses the conference materials with the other party viewing them. The external input device in the related art sends the image data of the conference materials or the like, displayed on the display unit of the external input device, to the transmission terminal used by the other party in the video conference via the communication network.

The participants in the video conference share not only the voice data and the image data sent/received by the transmission terminal but also the display data displayed on the display unit of the external input device with the other party in the video conference.

Some external input devices can execute multitasking processes. On a display unit of such an external input device plural regions (called "windows" in the following) generated by different tasks are displayed. Japanese Published Patent Application No. 2011-254453 discloses selecting data to be sent to the transmission terminal used by the other party in the video conference from the data displayed on the display unit of the external input device.

FIG. 45 is a diagram illustrating an example of a screen displayed on the external input device, disclosed in Japanese Published Patent Application No. 2011-254453. The remote communication terminal, disclosed in Japanese Published Patent Application No. 2011-254453, shares a region, which the user selects using a mouse, with a transmission terminal of the other party from the plural regions displayed on the display unit of the remote communication terminal.

SUMMARY OF THE INVENTION

It is a general object of at least one embodiment of the present invention to provide an information processing apparatus, an information processing system and an information processing method that substantially obviates one or more problems caused by the limitations and disadvantages of the related art.

In one embodiment, an information processing apparatus, communicably connectable to a first transmission terminal, which is communicably connected with a second transmission terminal via a network, includes an aspect ratio change unit that transforms a shape of a display region in a screen which is displayed on a display unit so that an aspect ratio of the display region is changed to a predetermined value, the display unit being integrated with the information processing apparatus or being connected to the information processing apparatus; an acquisition unit that acquires display data displayed in the display region, the aspect ratio of the display region having been changed to the predetermined value by the aspect ratio change unit; and a data transmission unit that transmits the display data displayed in the display region acquired by the acquisition unit to the first transmission terminal.

In another embodiment, an information processing system includes a program for causing to be executed an aspect ratio change step of transforming a shape of a display region in a screen which is displayed on a display unit so that an aspect ratio of the display region is changed to a predetermined value, the display unit being connected to an information processing apparatus that executes the program; an acquisition step of acquiring display data displayed in the display region, an aspect ratio of the display region having been changed to the predetermined value in the aspect ratio change step; and a data transmission step of transmitting the display data displayed in the display region acquired in the acquisition step to a first transmission terminal; wherein the first transmission terminal transmits the display data to a second transmission terminal connected via a network.

In yet another embodiment, an information processing method in an information processing apparatus communicably connectable to a first transmission terminal, which is communicably connected with a second transmission terminal via a network, includes transforming a shape of a display region in a screen which is displayed on a display unit so that an aspect ratio of the display region is changed to a predetermined value, the display unit being integrated with the information processing apparatus or being connected to the information processing apparatus; acquiring display data displayed in the display region, an aspect ratio of the display region having been changed to the predetermined value; and transmitting the display data displayed in the acquired display region to the first transmission terminal.

According to the present invention an information processing apparatus, an information processing system and an information processing method which display a region selected by a user in a proper size are provided.

BRIEF DESCRIPTION OF THE DRAWINGS

Other objects and further features of embodiments will be apparent from the following detailed description when read in conjunction with the accompanying drawings, in which:

FIGS. 5A to 5C are explanatory diagrams for explaining image quality of image data according to the present embodiment;

FIG. 6 is a diagram illustrating an example of a table for managing change in quality of image data according to the present embodiment;

FIG. 7 is a diagram illustrating an example of a table for managing the relay apparatus according to the present embodiment;

FIG. 8 is a diagram illustrating an example of a table for managing authentication for the terminal according to the present embodiment;

FIG. 9 is a diagram illustrating an example of a table for managing the terminal according to the present embodiment;

FIG. 10 is a diagram illustrating an example of a table for managing a destination list according to the present embodiment;

FIG. 11 is a diagram illustrating an example of a table for managing a session according to the present embodiment;

FIG. 12 is a diagram illustrating an example of a table for managing the image quality of the image data according to the present embodiment;

FIG. 14 is a diagram illustrating an example of a table for managing a resolution of image data according to the present embodiment;

DESCRIPTION OF THE PREFERRED EMBODIMENTS

In the following, embodiments of the present invention will be described with reference to the accompanying drawings. However, the technical scope of the present invention is not limited to the present embodiment.

Figure 1:
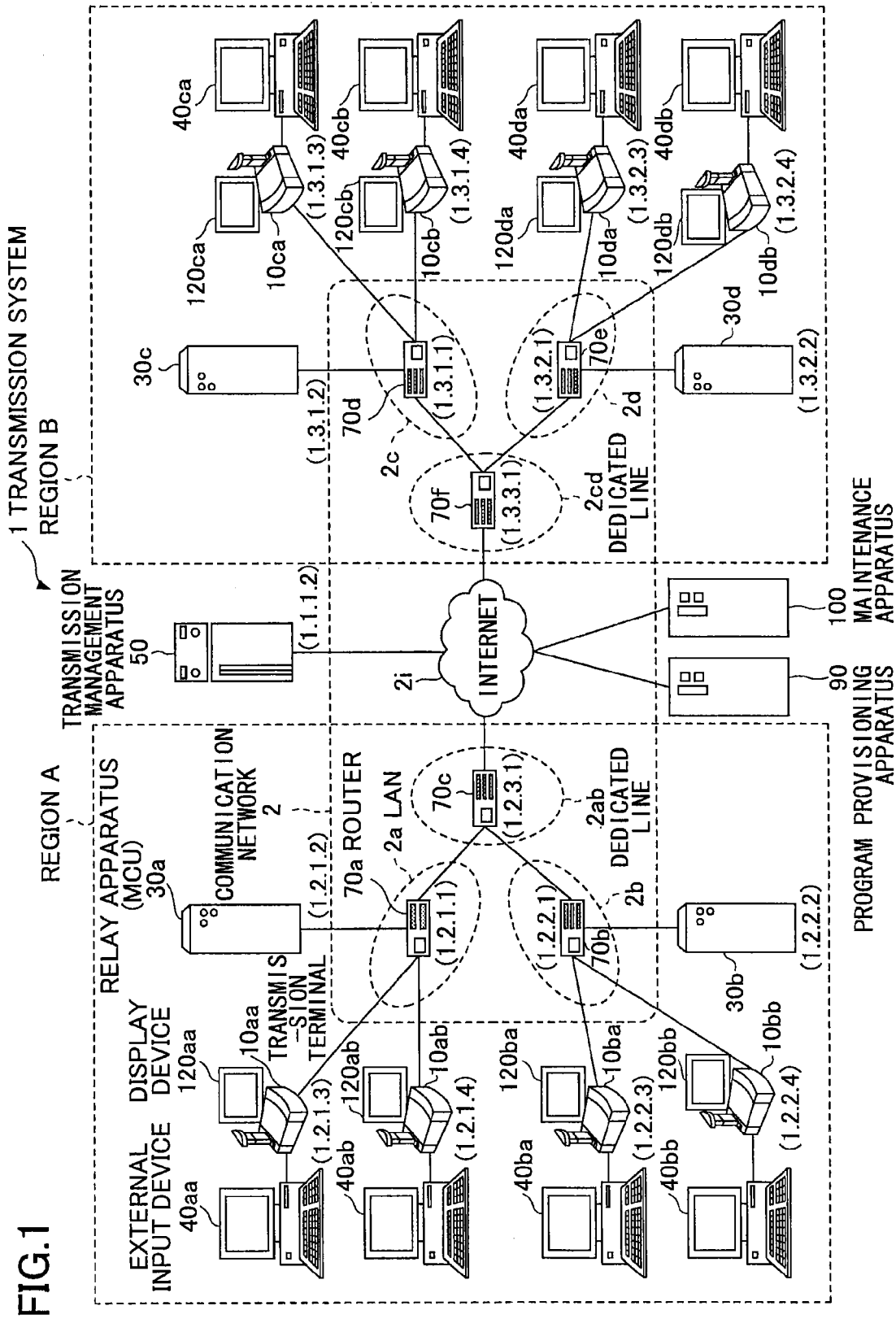
FIG. 1 is a diagram schematically illustrating an example of a whole configuration of a transmission system according to a present embodiment.

FIG. 1 is a schematic diagram illustrating an example of a whole configuration of a transmission system 1 according to the present embodiment. With reference to FIG. 1, the present embodiment will be explained in the following.

Generally, a transmission system includes a data provision system, in which content data are transmitted unidirectionally via a transmission management apparatus from one transmission terminal to another transmission terminal, and a communication system, in which information, visual or the like is communicated bidirectionally via the transmission management apparatus among plural transmission terminals. The communication system communicates via the communication management apparatus (corresponding to the "transmission management apparatus") among plural communication terminals (corresponding to the "transmission terminals") information, visual or the like bidirectionally. A video conference system, a visual telephony system, a voice conference system, a voice telephony system, a PC screen sharing system and the like belong to the communication system.

In the present embodiment, the video conference system is assumed to be an example of the communication system. The video conference management apparatus is assumed to be an example of the communication management apparatus. The video conference terminal is assumed to be an example of the communication terminal. With the above assumptions, the transmission system, the transmission management apparatus and the transmission terminal will be explained. That is, the transmission terminal and the transmission management apparatus can be applied not only to the video conference system, but also to the communication system or to the transmission system.

A transmission system 1 according the present embodiment (see FIG. 1) includes plural transmission terminals 10aa, 10ab, 10ba, 10bb, 10ca, 10cb, 10da and 10db, plural display units 120aa, 120ab, 120ba, 120bb, 120ca, 120cb, 120da and 120db for the respective transmission terminals, plural external input devices 40aa, 40ab, 40ba, 40bb, 40ca, 40cb, 40da and 40db connected to the respective transmission terminals, plural relay apparatuses 30a, 30b, 30c, and 30d, a transmission management apparatus 50, a program provisioning apparatus 90 and a maintenance apparatus 100.

In the following, unless otherwise stated, an arbitrary transmission terminal of the plural transmission terminals 10aa, . . . , 10db is denoted "transmission terminal 10", an arbitrary display unit of the plural display units 120aa, . . . , 120db is denoted "display unit 120", an arbitrary external input device of the plural external input devices 40aa, . . . , 40db is denoted "external input device 40", and an arbitrary relay apparatus of the plural relay apparatuses 30aa, . . . , 30db is denoted "relay apparatus 30". Moreover, the display unit 120 is an example of a display unit of the transmission terminal 10.

The transmission terminal 10 sends/receives image data, voice data, or the like to/from other transmission terminals 10. In the present embodiment, the image data are video data. The image data may be still image data. Moreover, images of the image data may include both video and still images. The relay apparatus 30 relays image data and voice data between the transmission terminals 10. The transmission management apparatus 50 manages the plural transmission terminals 10 and the plural relay apparatuses 30 in an integrated fashion.

The external input device 40 is connected to the transmission terminal 10, and sends display data for an image displayed on a display unit (a display unit 216, which will be explained later) of the external input device 40 to the transmission terminal 10. The external input device 40 is, for example, a PC. But, in addition to the PC, the external input device 40 may be a smartphone, a tablet type terminal, a mobile phone, an electronic whiteboard, a projection device such as a projector, a digital signage device or a wearable PC.

Moreover, plural routers 70a, 70b, 70c, 70d, 70e and 70f, as shown in FIG. 1, select optimum paths on which the image data and voice data are sent/received. In the following explanation, unless otherwise stated, an arbitrary router of the plural routers 70a, . . . , 70db is denoted "router 70". The program provisioning apparatus 90 includes a hard disk (HD), which is not shown. The HD stores a program for the transmission terminal 10 to realize various functions and various means in the transmission terminal 10, a program for the relay apparatus 30 to realize various functions and various means in the relay apparatus 30, and a program for the transmission management apparatus 50 to realize various functions and various means in the transmission management apparatus 50. The program provisioning apparatus 90 sends the program for the transmission terminal 10, the program for the relay apparatus 30 and the program for the transmission management apparatus 50 stored in the HD to the transmission terminal 10, the relay apparatus 30, and the transmission management apparatus 50, respectively.

Moreover, the transmission terminals 10aa and 10ab, the relay apparatus 30a, and the router 70a are connected with each other for a communications connection via a LAN (Local Area Network) 2a, and the transmission terminals 10ba and 10bb, the relay apparatus 30b, and the router 70b are connected with each other for a communications connection via a LAN 2b. The LAN 2a and the LAN 2b are connected with each other for a communications connection via a dedicated line 2ab including a router 70c, and configured in a predetermined region A. For example, region A is Japan, the LAN 2a is configured in an office in Tokyo, and the LAN 2b is configured in an office in Osaka.

On the other hand, the transmission terminals 10ca and 10cb, the relay apparatus 30c, and the router 70d connected with each other for a communications connection via a LAN 2c, and the transmission terminals 10da and 10db, the relay apparatus 30d, and the router 70e are connected with each other for a communications connection via a LAN 2d. The LAN 2c and the LAN 2d are connected with each other for a communications connection via a dedicated line 2cd including a router 70f, and configured in a predetermined region B. For example, region B is the United States of America, the LAN 2c is configured in an office in New York, and the LAN 2d is configured in an office in Washington D.C. Region A and region B are connected for a communications connection via an Internet 2i by routers 70c and 70f, respectively.

Moreover, the transmission management apparatus 50, the program provisioning apparatus 90 and the maintenance apparatus 100 are connected for a communications connection with the transmission terminal 10 and the relay apparatus 30 via the Internet. The transmission management apparatus 50, the program provisioning apparatus 90 and the maintenance apparatus 100 may be installed in region A, in region B, or in another region.

In the present embodiment, the communication network 2 is configured by the LAN 2a, the LAN 2b, the dedicated line 2ab, the Internet 2i, the dedicated line 2cd, the LAN 2c and the LAN 2d.

Moreover, combinations of four integers with parenthesis, indicated below for the transmission terminals 10, the relay apparatuses 30, the transmission management apparatus 50, the routers 70, the program provisioning apparatus 90, and the maintenance apparatus 100 in FIG. 1, represent IP (Internet Protocol) addresses in a form of IPv4. For example, the IP address of the transmission terminal 10aa is "1.2.1.3". Moreover, IPv6 may be adopted instead of IPv4, but IPv4 is employed for simplicity in the present embodiment.

<<Hardware Configuration>>

Next the hardware configuration according to the present embodiment will be explained.

Figure 2:
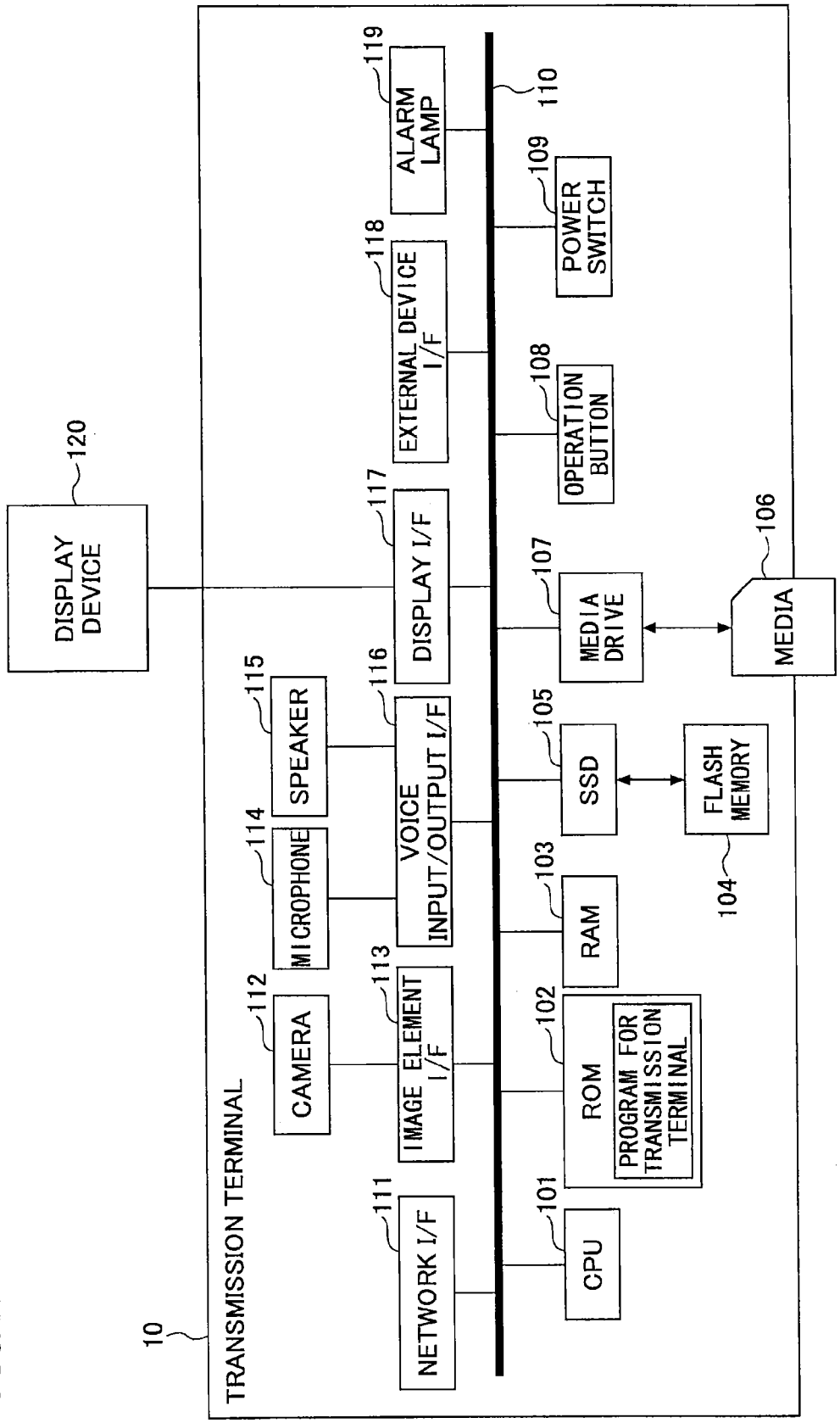
FIG. 2 is a diagram illustrating an example of a hardware configuration of a transmission terminal in the transmission system according to the present embodiment.

FIG. 2 is a diagram illustrating a hardware configuration of the transmission terminal 10 in the transmission system 1 according to the present embodiment. As shown in FIG. 2, the transmission terminal 10 includes a CPU (central processing unit) 101, which controls operations of the whole terminal 10; a ROM (read-only memory) 102, which stores the program for the transmission terminal; a RAM (random access memory) 103, used as a work area for the CPU 101; a flash memory 104, storing a program for the terminal and various data, such as image data and voice data; an SSD (solid state drive) 105, which controls reading from and writing to the flash memory 104 the various data according to the control by the CPU 101; a media drive 107, which controls reading data from and writing (storing) data to a recording medium 106, such as a flash memory; an operation button 108, which is operated when switching a destination of the transmission terminal 10, or the like; a power switch 109, used for turning on or off the transmission terminal 10; and a network I/F (interface) 111 for transmitting data using the communication network 2. Moreover, the transmission terminal 10 further includes a camera 112, for acquiring image data by taking a picture of an object according to control by the CPU 101; an image element I/F 113, which controls the driving of the camera 112; a microphone 114 for inputting voice (sound); a speaker 115 for outputting voice; a voice input/output I/F 116, which performs inputting/outputting processing for a voice signal between the microphone 114 and the speaker 115 according to the control by the CPU 101; a display I/F 117, which transmits image data to an external display unit 120 according to the control by the CPU 101; an external device I/F 118, for sending/receiving various data to/from external devices; an alarm lamp 119 for giving notice of a problem in the functions of the transmission terminal 10; and a bus line 110, such as an address bus or a data bus, which electrically connects the above components.

The recording medium 106 is detachable from the terminal 10. Moreover, if the recording medium 106 is a non-volatile memory, from which data are read, or into which data are written according to the control by the CPU 101, not only the flash memory 104, but also EEPROM (electrically erasable and programmable ROM) may be used. Moreover, the camera 112 includes a solid-state image element, which converts light into an electric signal to obtain digital data for an image (picture) of an object. For the solid-state image element, for example, CMOS (complementary metal oxide semiconductor), CCD (charge coupled device), or the like is used. Furthermore, instead of the SSD 115, a hard disk drive (HDD) may be used.

The display unit 120 includes a display unit, formed of liquid crystal or organic EL (electro luminescence), which displays an image of the object or an icon image for operation.

Furthermore, the program for the transmission terminal 10 may be distributed as a file in an installable form or in an executable form stored in a recording medium readable by a computer, such as the recording medium 106.

Each of the camera 112, the microphone 114, and the speaker 115 may be an external device. The transmission terminal 10 may be, for example, a general-purpose PC (personal computer), a smartphone, a tablet terminal, or a mobile phone.

Figure 3:
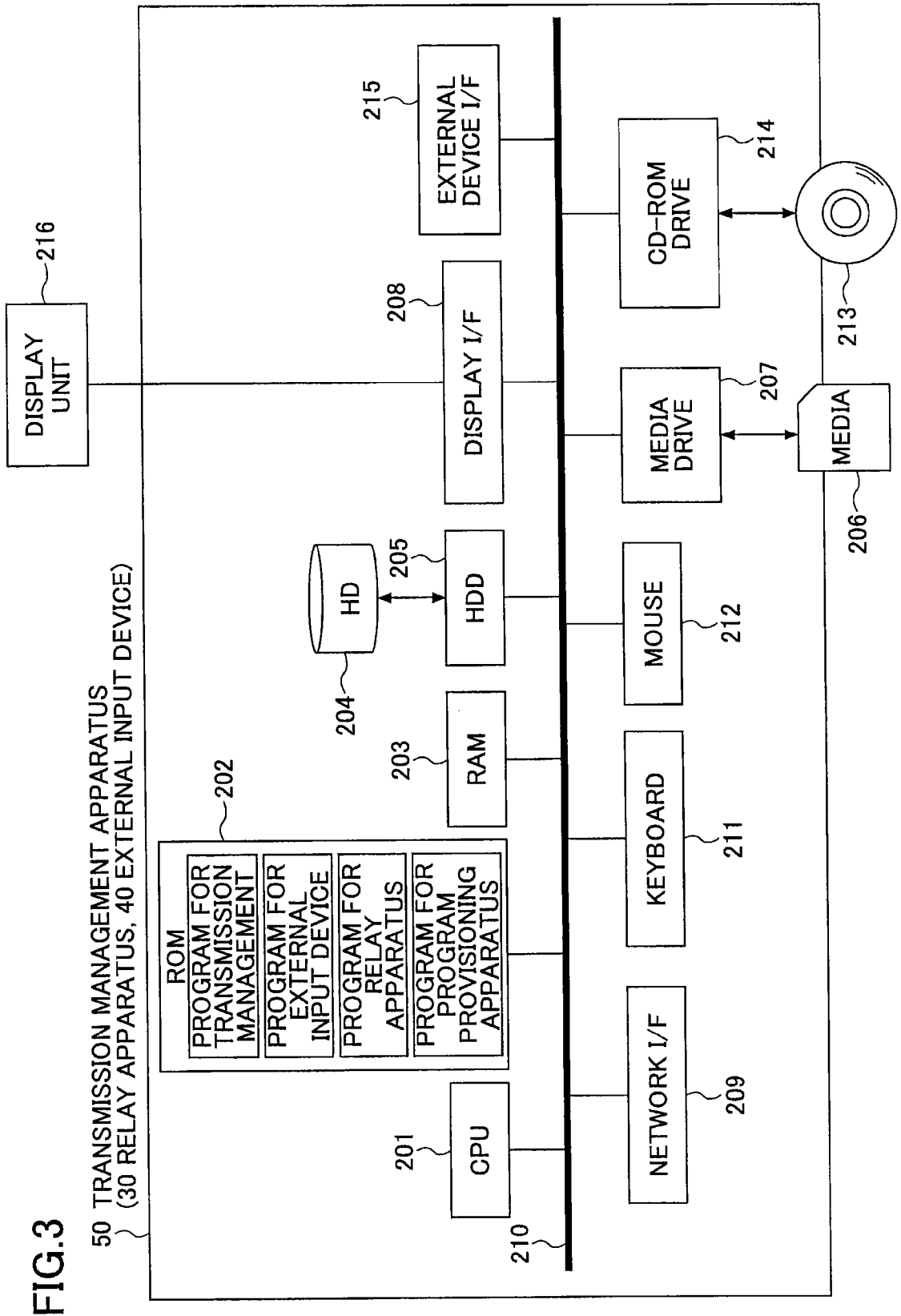
FIG. 3 is a diagram illustrating an example of a hardware configuration of a transmission management apparatus in the transmission system according to the present embodiment.

FIG. 3 is a diagram illustrating an example of a hardware configuration of the transmission management apparatus 50 in the transmission system 1 according to the present embodiment. The transmission management apparatus 50 includes a CPU 201, which controls operations of the whole transmission management apparatus 50; a ROM 202, which stores a program for transmission management; a RAM 203, used as a work area for the CPU 201; a HD (hard disk) 204, which stores various data; a HDD (hard disk drive) 205, which controls reading data from and writing data to the HD 204 according to control by the CPU 201; a media drive 207, which controls reading data from and writing (storing) data to a recording medium 206, such as a flash memory; a display I/F 208 for displaying on a display unit 216 various information items, such as a cursor, a menu, a window, a character or an image; a network I/F 209 for transmitting data using the communication network 2, which will be explained later; a keyboard 211 equipped with plural keys for inputting characters, numerical values, various instructions or the like; a mouse 212 for performing selection and execution of various instructions, selection of a processing object, a cursor movement, or the like; a CD-ROM drive 214, which controls reading various data from and writing various data to a CD-ROM (compact disc read only memory) 213, as an example of a detachable recording medium; an external device I/F 215, which sends/receives information items to/from an external device; and a bus line 210, such as an address bus or a data bus, which electrically connects the above components. The display unit 216 is also an example of the display unit of the external input device 40.

Moreover, the program for the transmission management may be distributed as a file in an installable form or in an executable form stored in a recording medium readable by a computer, such as the recording medium 206, the CD-ROM 213 or the like. The program for the transmission management may be stored in the HD 204.

Furthermore, since the external input device 40 has the same hardware configuration as the transmission management apparatus 50, an explanation will be omitted. However, a program for an external input device for controlling the external input device 40 is stored in the ROM 202. Also in this case, the program for an external input device may be distributed as a file in an installable form or in an executable form stored in a recording medium readable by a computer, such as the recording medium 206, the CD-ROM 213 or the like.

Moreover, since the relay apparatus 30 has the same hardware configuration as the transmission management apparatus 50, an explanation will be omitted. However, a program for a relay apparatus for controlling the relay apparatus 30 is stored in the ROM 202. Also in this case, the program for a relay apparatus may be distributed as a file in an installable form or in an executable form stored in a recording medium readable by a computer, such as the recording medium 206, the CD-ROM 213 or the like.

Moreover, since the program provisioning apparatus 90 has the same hardware configuration as the transmission management apparatus 50, an explanation will be omitted. However, a program for a program provisioning apparatus for controlling the program provisioning apparatus 90 is stored in the ROM 202. Also in this case, the program for the relay apparatus may be distributed as a file in an installable form or in an executable form stored in a recording medium readable by a computer, such as the recording medium 206, the CD-ROM 213 or the like. The program for the program provisioning apparatus 90 may be stored in the HD 204, other than the ROM 202.

Furthermore, since the maintenance apparatus 100 has the same hardware configuration as the transmission management apparatus 50, an explanation will be omitted. The maintenance apparatus 100 is a computer which maintains or manages at least one of the transmission terminal 10, the relay apparatus 30, the transmission management apparatus 50 or the program provisioning apparatus 90. For example, in the case that the maintenance apparatus 100 is installed in one country and the transmission terminal 10, the relay apparatus 30, the transmission management apparatus 50 or the program provisioning apparatus 90 is installed in another country, the maintenance apparatus 100 performs the maintenance process of keeping, managing, maintaining, or the like, for at least one of the transmission terminal 10, the relay apparatus 30, the transmission management apparatus 50 or the program provisioning apparatus 90, remotely via the communication network 2.

Moreover, the maintenance apparatus 100 performs a maintenance process of managing a model number, a production number, a sales destination, maintenance and inspection, a failure history or the like, for at least one of the transmission terminal 10, the relay apparatus 30, the transmission management apparatus 50, or the program provisioning apparatus 90, without using the communication network 2.

As another example of the detachable recording medium, the program may be distributed as a file stored in a recording medium readable by a computer, such as a CD-R (compact disc recordable), a DVD (digital versatile disk), a Blu-ray disc, or the like.

Functional Configuration According to Embodiment

Figure 4:
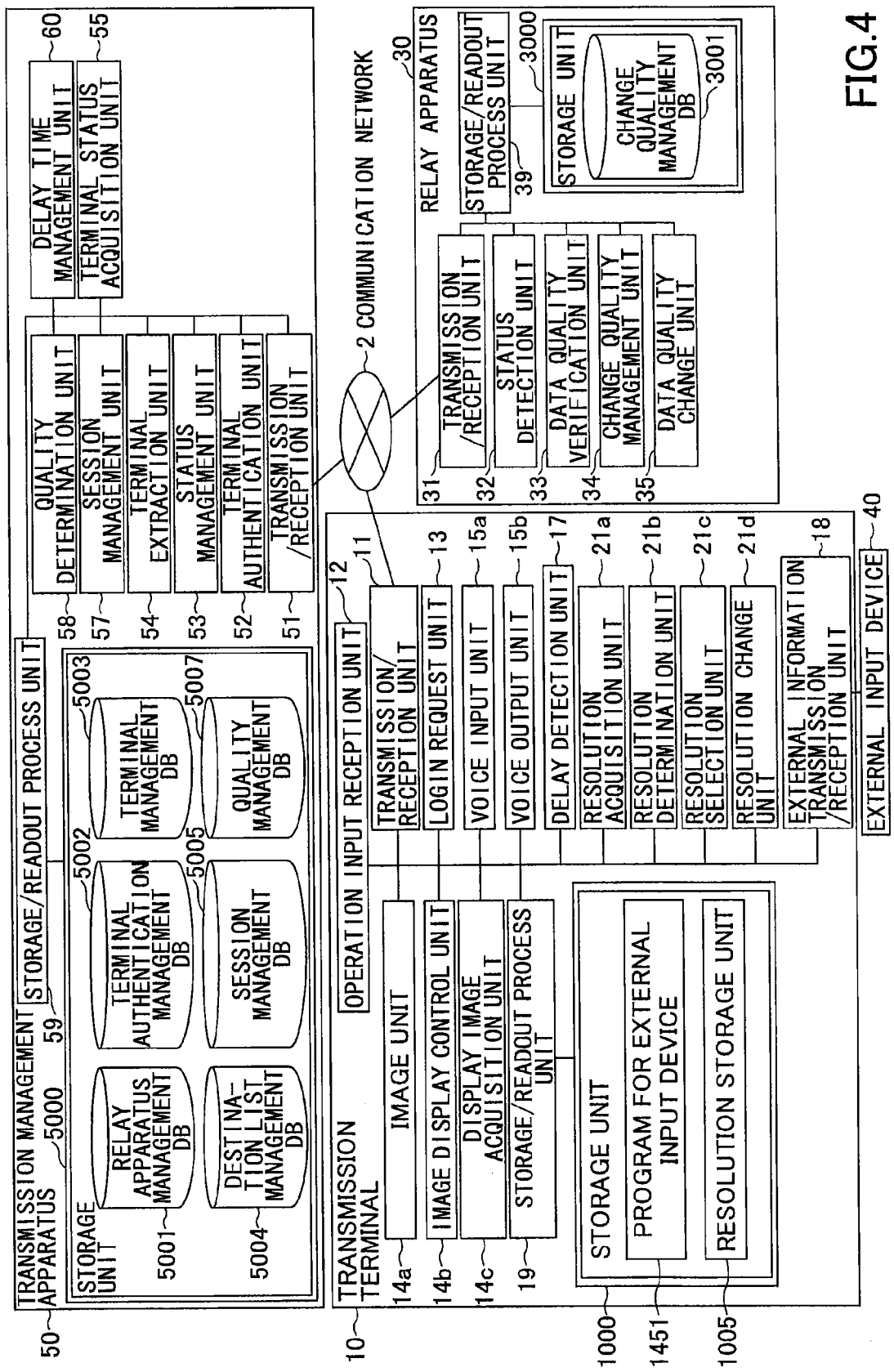
FIG. 4 is a functional block diagram illustrating an example of a transmission terminal, a relay apparatus and the transmission management apparatus in the transmission system according to the present embodiment.

Next, the functional configuration according to the present embodiment will be explained with reference to FIGS. 4 to 14. FIG. 4 is a functional block diagram illustrating an example of the transmission system according to the present embodiment. The transmission system 1 includes the transmission terminal 10, the relay apparatus 30 and the transmission management apparatus 50. In the example shown in FIG. 4, the transmission terminal 10, the relay apparatus 30 and the transmission management apparatus 50 are connected so as to perform data communications via the communication network 2. Moreover, the external input device 40 is connected so as to send/receive data to/from the transmission terminal 10. The program provisioning apparatus 90 and the maintenance apparatus 100, shown in FIG. 1, are not relevant to the communication for the video conference directly, and are omitted in FIG. 4.

Figure 13:
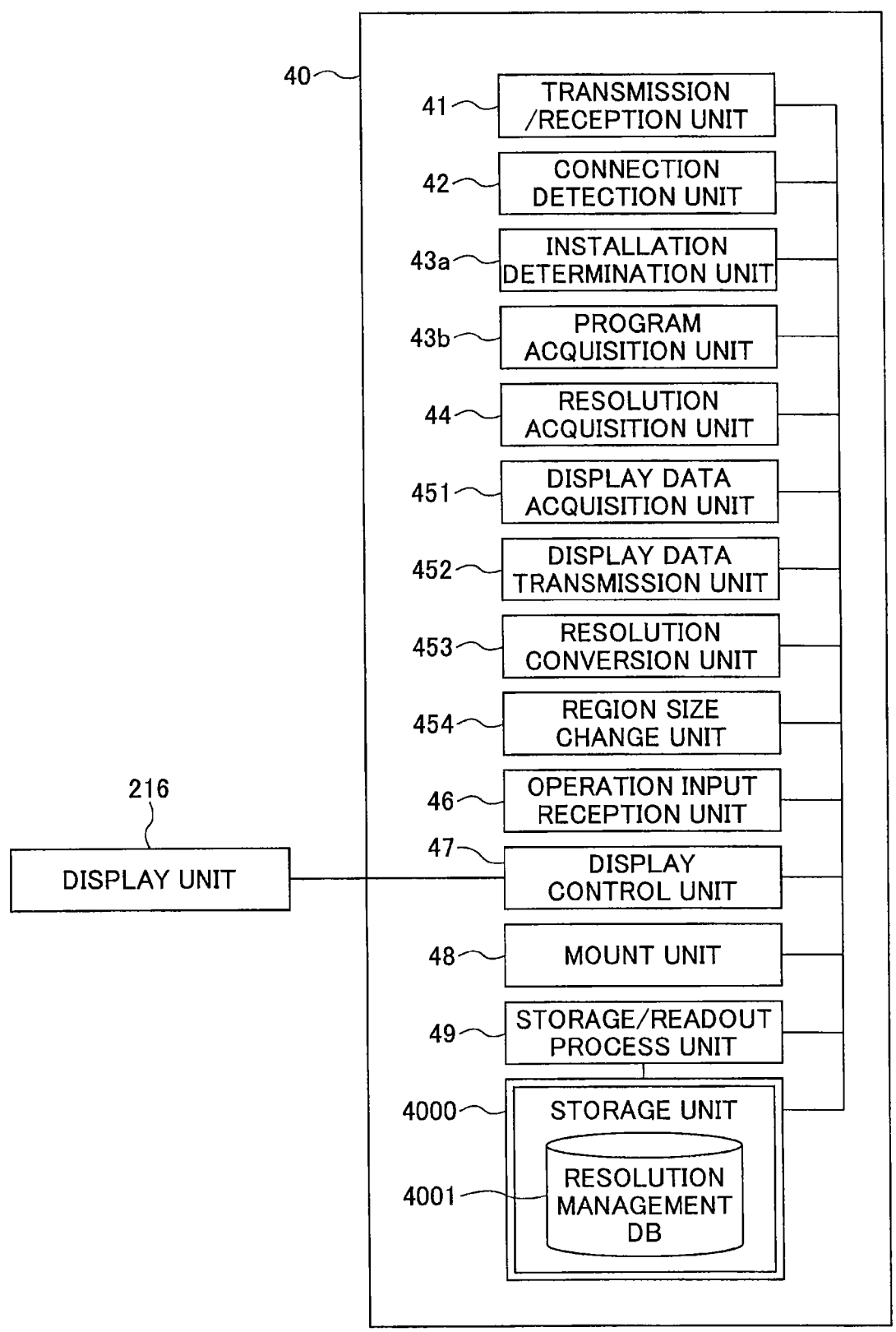
FIG. 13 is a functional block diagram illustrating an example of an external input device according to the present embodiment.

FIGS. 5A to 5C are explanatory diagrams for explaining image quality of image data. FIG. 6 is a diagram illustrating an example of a table for managing change in quality of image data. FIG. 7 is a diagram illustrating an example of a table for managing the relay apparatus. FIG. 8 is a diagram illustrating an example of a table for managing authentication for the terminal. FIG. 9 is a diagram illustrating an example of a table for managing the terminal. FIG. 10 is a diagram illustrating an example of a table for managing a destination list. FIG. 11 is a diagram illustrating an example of a table for managing a session. FIG. 12 is a diagram illustrating an example of a table for managing the image quality of the image data. FIG. 13 is a functional block diagram of the external input device 40. FIG. 14 is a diagram illustrating an example of a table for managing a resolution of image data.

<Functional Configuration of Transmission Terminal>

The transmission terminal 10, as shown in FIG. 4, includes a transmission/reception unit 11; an operation input reception unit 12; a login request unit 13, an image unit 14$a$, an image display control unit 14$b$, a display image acquisition unit 14$c$, a voice input unit 15$a$, a voice output unit 15$b$, a delay detection unit 17, an external information transmission/reception unit 18, a storage/readout process unit 19, a resolution acquisition unit 21$a$, a resolution determination unit 21$b$, a resolution selection unit 21$c$, and a resolution change unit 21$d$. Each of the above units is a function or a functioning means realized by one of the components, shown in FIG. 2, operating according to an instruction from the CPU 101 following the program stored in the ROM 102. Moreover, the terminal 10 includes a storage unit 1000, including the SSD 105, shown in FIG. 2.

<Each Functional Element of Transmission Terminal>

Next, each of the functional elements of the transmission terminal 10 will be explained in detail. The transmission/reception unit 11 is realized by the network I/F 111, shown in FIG. 2, and sends various data to and receives various data from other transmission terminals 10, the relay apparatus 30 or the transmission management apparatus 50 via the communication network 2. The operation input reception unit 12 is realized by the operation button 108 and the power switch 109, shown in FIG. 2, and receives various inputs from a user. For example, when the user turns the power switch 109 to ON, the operation input reception unit 12 receives a signal of the user's operation, and turns on the power. Moreover, the operation input reception unit 12 receives resolution information representing a resolution input by the user's operation.

The login request unit 13 is realized by the instruction from the CPU 101, show in FIG. 2, and when receiving the operation for turning on the power, automatically sends login request information for requiring a login and an IP address of the transmission terminal 10 at the time of sending, from the transmission/reception unit 10 to the transmission management apparatus 50 via the communication network 2.

The image unit 14$a$ is realized by the camera 112 and the image element I/F 113, shown in FIG. 2, and generates image data for an image of an object obtained by taking a picture of the object. The image display control unit 14$b$ is realized by the display I/F 117, shown in FIG. 2, and performs a rendering process for image data, to control the image data so as to display the image represented by the image data on the display unit 120. The display image acquisition unit 14$c$ acquires image data which represents the image displayed on the display unit 120. In the present embodiment, data representing an image taken by the camera 112 is denoted as "image data". Moreover, data representing an image displayed on the display unit 216 of the external input device 40, which will be explained later in detail, is denoted as "display data". The image data and the display data are, for example, in the format of JPEG (Joint Photographic Experts Group), Bitmap, GDI (Graphics Device Interface) or the like.

The voice input unit 15*a* realized by the microphone 114 and the voice input/output I/F 116, shown in FIG. 2, inputs the user's voice, converts the voice into a voice signal, and outputs voice data regarding the voice signal. The voice output unit 15*b* realized by the speaker 115 and the voice input/output I/F 116, converts the voice signal regarding the voice data into a sound, and outputs the sound.

The delay detection unit 17 is realized by the instruction from the CPU 101, shown in FIG. 2, and detects a delay time (ms) of the image data or the voice data sent from the other transmission terminal 10 via the relay apparatus 30. Moreover, the external information transmission/reception unit 18 sends/receives data to/from the external input device 40 via the external device I/F 118, shown in FIG. 2. Moreover, a storage/readout process unit 19 is executed by the SSD 105, shown in FIG. 2, which stores various data into the storage unit 1000, and reads out various data stored in the storage unit 1000.

The resolution acquisition unit 21*a* acquires a resolution, with which the display unit 120, connected to the transmission terminal 10, can display an image. The resolution determination unit 21*b* determines whether the resolution acquired by the resolution acquisition unit for display includes a resolution other than the standard aspect ratio used for transmitting image data. The resolution selection unit 21*c* selects, based on a result of a determination by the resolution determination unit 21*b*, a resolution other than the standard aspect ratio, or a resolution of the standard aspect ratio, from the resolution for display. The resolution change unit 21*d* changes the resolution of the display unit 120 to a resolution represented by resolution information received by the operation input reception unit 12. The resolution in the present embodiment is a number of pixels in a unit length on the display screen, and includes a resolution in the vertical direction and a resolution in the horizontal direction.

The storage unit 1000 stores a terminal ID (Identification) for identifying the transmission terminal 10, including a password, image data, voice data, a relay apparatus ID for identifying the relay apparatus 30 (which sends various data), an IP address of a destination terminal, and the like. Moreover, the storage unit 1000 stores a program for an external input device 1451 and is provided with a resolution storage unit 1005 for storing the resolution information representing a resolution of the display data output by the transmission terminal 10. By transmitting the program for the external input device 1451 to the external input device 40 and installing the program in the external input device 40, the external input device 40 is equipped with a display data acquisition unit 451, a display data transmission unit 452, a resolution conversion unit 453 and a region size change unit 454. The relation between the program for the external input device 1451 and functions with which the external input device 40 is equipped is an example. A function other than the minimum function for installing the program for the external input device 1451 in the external input device 40 may be given by installing the program for the external input device 1451. Meanwhile, the external input device 40 will be explained in detail in the section of <Each functional element of external input device>.

The terminal ID and the relay apparatus ID, which will be explained later, according to the present embodiment, are identification information, such as a language, a character, a symbol, numerical signs, or the like, used for uniquely identifying the transmission terminal 10 and the relay apparatus 30, respectively. Moreover, the terminal ID and the relay apparatus ID may be a combination of at least two of the language, the character, the symbol, or the numerical signs. In the following explanation, the transmission terminal 10 which is a request source requesting the start of the video conference is denoted "request source terminal", and the transmission terminal 10 which is a destination of the request is denoted "destination terminal".

<Functional Configuration of Relay Apparatus>

Next, the function or means of the relay apparatus 30 will be explained in the following. The relay apparatus 30 includes a transmission/reception unit 31, a status detection unit 32, a data quality verification unit 33, a change quality management unit 34, a data quality change unit 35, and a storage/readout process unit 39. Each of the above units is a function or a means realized by one of the components, shown in FIG. 3, operating according to an instruction from the CPU 201 following the program stored in the ROM 202. Moreover, the relay apparatus 30 includes a storage unit 3000, which includes a storage unit 3000 configured by one of the ROM 202, RAM 203 and the HDD 205.

<<Change Quality Management Table>>

The storage unit 3000 includes a change quality management DB 3001, configured by a change quality management table, as shown in FIG. 6. The change quality management table manages an IP address of a transmission terminal 10, to which image data are relayed, and a quality of the image data, to be relayed to the transmission terminal 10 by the relay apparatus, which are associated with each other.

The resolution of an image represented by image data, processed in the transmission system 1 according to the present embodiment, will be explained in the following. FIG. 5A illustrates an example of an image with a low resolution, as a base image, having 160 pixels in the horizontal direction and 120 pixels in the vertical direction. FIG. 5B illustrates an example of an image with an intermediate resolution, having 320 pixels in the horizontal direction and 240 pixels in the vertical direction. FIG. 5C illustrates an example of an image with a high resolution, having 640 pixels in the horizontal direction and 480 pixels in the vertical direction. In the case of communication through a narrow bandwidth path, image data of low image quality including only image data of low resolution as a base image are relayed. In the case where the bandwidth is relatively broad, image data of intermediate quality including image data of the low resolution as a base image and image data of the intermediate resolution are relayed. In the case where the bandwidth is quite broad, image data of high image quality including image data of the low resolution as a base image, image data of the intermediate resolution and image data of the high resolution are relayed. For example, FIG. 6 shows that according to the change quality management table, the relay apparatus 30 relays to the destination terminal 10*db* (see FIG. 1) with the IP address (1.3.2.4) image data of "high image quality".

<Each Functional Element of the Relay Apparatus>

Next, each functional element of the relay apparatus 30 will be explained in detail. In the following, in the explanation of the functional element of the relay apparatus 30, a relationship between the functional element and the component, shown in FIG. 3, which realizes the functional element of the relay apparatus 30, will be described.

The transmission/reception unit 31 (see FIG. 4) of the relay apparatus 30 is realized by the network I/F 209, shown in FIG. 3, and sends various data to and receives various data from the transmission terminals 10, the other relay apparatuses 30 and the transmission management apparatus 50, via the communication network 2. The status detection unit 32 is realized by the instruction from the CPU 201, shown in FIG. 3, and detects an operational status of the relay apparatus 30, which includes the status detection unit 32. The operational status is, for example, "online", or "offline".

The data quality verification unit 33 is realized by the instruction from the CPU 201, show in FIG. 3, and searches the change quality management table (see FIG. 6) utilizing the IP address of the destination terminal 10 as a search key, extracts image quality of the image data relayed to the destination terminal with the IP address, and verifies the image quality of the image data to be relayed. The change quality management unit 34 is realized by the instruction from the CPU 201, shown in FIG. 3, and changes content in the change quality management DB 3001, based on quality information, which will be described later, transmitted from the transmission management apparatus 50. For example, in the case where the request source terminal 10aa with the terminal ID "01aa" communicates with the destination terminal 10db with the terminal ID "01db" in the video conference by sending/receiving image data of high image quality, the request source terminal 10bb and the destination terminal 10ca start another video conference, and when a delay occurs in receiving image data at the destination terminal 10db, the relay apparatus 30 is required to lower the image quality of the image data, which has been relayed, to the intermediate image quality. In such a case, the content in the change quality management DB 3001 is updated so as to lower the image quality of image data relayed by the relay apparatus 30 from the high image quality to the low image quality, based on the quality information for the intermediate image quality.

The data quality change unit 35 is realized by the instruction from the CPU 201, shown in FIG. 3, and changes the image quality of the image data sent from the request source terminal 10 based on the content in the updated change quality management DB 3001. The storage/readout process unit 39 is realized by the instruction from the CPU 201, stores various data into the storage unit 3000, and reads out various data from the storage unit 3000.

<Functional Configuration of the Transmission Management Apparatus>

Next, the functions of the transmission management apparatus 50 will be explained in the following. The transmission management apparatus 50 includes, as shown in FIG. 4, a transmission/reception unit 51, a terminal authentication unit 52, a status management unit 53, a terminal extraction unit 54, a terminal status acquisition unit 55, a session management unit 57, a quality determination unit 58, a storage/readout process unit 59, and a delay time management unit 60. Each of the above units is a function realized by one of the components shown in FIG. 3, operating according to an instruction from the CPU 201 following the program stored in the ROM 202. Moreover, the transmission management apparatus 50 includes a storage unit 5000, configured by one of the ROM 202, the RAM 203, and the HDD 205.

<<Relay Apparatus Management Table>>

The storage unit 5000 includes a relay apparatus management DB 5001, including a relay apparatus management table, as shown in FIG. 7. The relay apparatus management table manages an operational status of the relay apparatus 30, a reception time when the transmission management apparatus 50 receives status information indicating the operational status, an IP address of the relay apparatus 30, and the maximum data transmission rate (Mbps) at the relay apparatus 30, which are associated with each other, for each relay apparatus ID of the relay apparatus 30. For example, the relay apparatus management table, shown in FIG. 7, indicates that the relay apparatus 30a with the relay apparatus ID "111a" (see FIG. 1), is in the operational status "online", the status information is received by the management apparatus 50 on "Nov. 10, 2009, 13:00", the IP address of the relay apparatus 30a is "1.2.1.2", and the maximum data transmission rate of the relay apparatus 30a is 100 Mbps.

<<Terminal Authentication Management Table>>

Moreover, the storage unit 5000 includes a terminal authentication management DB 5002, including a terminal authentication managing table, as shown in FIG. 8. In the terminal authentication management table, each terminal ID of all the transmission terminals 10 managed by the transmission management apparatus 50 is associated with a password for the terminal ID. For example, the terminal authentication management table, as shown in FIG. 8, indicates that a terminal ID of the transmission terminal 10aa (see FIG. 1) is "01aa" and a password is "aaaa".

<<Terminal Management Table>>

Moreover, the storage unit 5000 includes a terminal management database (DB) 5003, including a terminal management table, as shown in FIG. 9. The terminal management table manages, for each terminal ID of the transmission terminals 10, an operational status of the transmission terminal 10, a reception time when the transmission management apparatus 50 receives login request information, which will be explained later, and an IP address of the transmission terminal 10, which are associated with each other. For example, the terminal management table, as shown in FIG. 9, indicates that the transmission terminal 10aa with the terminal ID "01aa" (see FIG. 1), is in the operational status "online", the transmission management apparatus 50 receives the login request information at "Nov. 10, 2009, 13:40" and the IP address of the transmission terminal 10aa is "1.2.1.3".

<<Destination List Management Table>>

Moreover, the storage unit 5000 includes a destination list management DB 5004, including a destination list management table, as shown in FIG. 10. The destination list management table manages request source terminals 10, which require starting communicating in the video conference, so that all terminal IDs of destination terminals 10 registered as candidates of a destination terminal 10 are associated with each of the terminal IDs of the request source terminals 10. For example, the destination list management table, shown in FIG. 10, indicates that the candidates of a destination terminal 10, with which the request source terminal 10aa with the terminal ID "01aa" (see FIG. 1) requires to start communication in the video conference, are three transmission terminals, i.e. the transmission terminal 10ab with the terminal ID "01ab", the transmission terminal 10ba with the terminal ID "01ba" and the transmission terminal 10db with the terminal ID "10db". The candidate of the destination terminal 10 may be updated by appending or deleting an item in the destination list management table according to a request from the request source terminal 10 to the transmission management apparatus 50.

<<Session Management Table>>

Moreover, the storage unit 5000 includes a session management DB 5005, including a session management table, as shown in FIG. 11. The session management table manages, for each of the session IDs for selection used for executing a session to select the relay apparatus 30, a relay apparatus ID of the relay apparatus 30, a terminal ID of the request source terminal 10, a terminal ID of the destination terminal 10, a delay time (ms), and a reception time, which are associated with each other. The delay time (ms) in this table is a delay time of reception in receiving image data at the destination terminal 10. The reception time is when the transmission management apparatus 50 receives delay information from the destination terminal 10 which indicates the delay time.

For example, the session management table, shown in FIG. 11, indicates that the relay apparatus 30a (with the relay device ID "111a"), selected in a session executed using the session ID for selection "se1", relays image data and voice data between the request source terminal 10aa (with the terminal ID "01aa") and the destination terminal 10db (with the terminal ID "01db"). The session management table further indicates that the delay time of image data at the destination terminal 10db at the time of "Nov. 10, 2009, 14:00" is 200 ms.

In the case of conducting the video conference between two transmission terminals 10, the reception time of the delay information may be managed based on the delay information sent from the request source terminal 10, not the destination terminal 10. However, in the video conference among two or more transmission terminals 10, the reception time of the delay information is managed based on the delay information sent from the transmission terminal 10, which receives image data and voice data.

<<Quality Management Table>>

Furthermore, the storage unit 5000 includes a quality management DB 5007, including a quality management table, as shown in FIG. 12. The quality management table manages the delay time (ms) of image data at the request source terminal 10 or the destination terminal 10, and image quality of the image data to be relayed at the relay apparatus 30, which are associated with each other.

<Each Functional Element in Transmission Management Apparatus>

Next, each function element in the transmission management apparatus 50 will be explained in detail. In the following, in the explanation of the functional element of the transmission management apparatus 50, a relationship between the functional element and the component, shown in FIG. 3, which realizes the functional element of the transmission management apparatus 50, will be described.

The transmission/reception unit 51 (see FIG. 4) is executed by the network I/F 209, and sends various data to and receives various data from the transmission terminal 10, the relay apparatus 30 or other system (the program provisioning apparatus 90, or the maintenance apparatus 100) via the communication network 2. The terminal authentication unit 52 searches the terminal authentication management DB 5002 in the storage unit 5000 with a terminal ID and a password used as a search key which is included in the login request information received via the transmission/reception unit 51, and determines whether the same terminal ID and the same password are managed in the terminal authentication management DB 5002, in order to perform the terminal authentication. The status management unit 53, in order to manage the operational status of the request source terminal 10, which requires a login, manages the terminal ID of the request source terminal 10, the operational status of the request source terminal 10, the reception time when the transmission management apparatus 50 receives the login request information, and the IP address of the request source terminal 10, by associating them with each other and then storing them in the terminal management table (see FIG. 9).

The terminal extraction unit 54 extracts a terminal ID by searching the destination list management table (see FIG. 10) with the terminal ID of the request source terminal 10 as a search key which requires a login, and reads out terminal IDs of candidates of a destination terminal 10 which can communicate with the request source terminal 10. Moreover, the terminal extraction unit 54 searches the destination list management table (see FIG. 10) with the terminal ID of the request source terminal 10 as a search key which requires a login, and searches for terminal IDs of other request source terminals, that are registered candidates of a destination terminal 10 which includes the above request source terminal 10.

The terminal status acquisition unit 55 searches the terminal management table (see FIG. 9), with the terminal ID of the candidate of the destination terminal 10 as a search key extracted by the above terminal extraction unit 54, and reads out operating status for each of the terminal IDs extracted by the terminal extraction unit 54. Accordingly, the terminal status acquisition unit 55 can acquire the operating status of the candidates of the destination terminal 10, which are allowed to communicate with the request source terminal 10, which has required the login. Moreover, the terminal status acquisition unit 55, with the terminal ID as a search key extracted by the terminal extraction unit 54, searches the terminal management table (see FIG. 9), and also acquires the operational status of the request source terminal 10, which has required the login.

The session management unit 57 manages the generated session ID, terminal ID of the request source terminal 10 and terminal ID of the destination terminal 10, by associating them with each other, and stores them in the session management DB 5005 of the storage unit 5000 (the session management table in FIG. 11). Furthermore, the session management unit 57 manages the relay apparatus ID of the relay apparatus 30 by storing them in the session management table (see FIG. 11).

The quality determination unit 58 determines image quality of image data to be relayed by the relay apparatus 30, by searching the quality management table (see FIG. 12) with the above delay time as a search key, and extracts image quality corresponding to the image data. The storage/readout process unit 59 is executed by the HDD 205, shown in FIG. 3, and performs a process of storing various data into the storage unit 5000 and a process of reading out various data stored in the storage unit 5000. The delay time management unit 60 searches the terminal management table (see FIG. 9) with the IP address of the above destination terminal 10, and extracts a corresponding terminal ID. The delay time management unit 60 manages the delay time by storing the delay time indicated by the above delay information into a field of delay time in the record, including the terminal ID, extracted as above, in the session management table (see FIG. 11).

<Functional Configuration of an External Input Device>

The external input device 40, as shown in FIG. 13, includes a transmission/reception unit 41, a connection detection unit 42, an installation determination unit 43a, a program acquisition unit 43b, a resolution acquisition unit 44, a display data acquisition unit 451, a display data transmission unit 452, a resolution conversion unit 453, a region size change unit 454, an operation input reception unit 46, a display control unit 47, a mount unit 48, and a storage/readout process unit 49. Each of the above units is a function or a means realized by one of the components, shown in FIG. 3, operating according to an instruction from the CPU 201 following the program stored in the ROM 202. Moreover, the display data acquisition unit 451, the display data transmission unit 452, the resolution conversion unit 453, and the region size change unit 454 are realized by downloading a program for external input device 1451 stored in the storage unit 1000 of the transmission terminal 10 (see FIG. 4) by the program acquisition unit 43b, and by installing the program. Other function may be included in the program for external input device 1451.

Furthermore, the external input device 40 includes a storage unit 4000 configured by the ROM 202, the RAM 203 or the HDD 205, shown in FIG. 3. Moreover, on the external input device 40, an OS (operating system), such as "Windows" (registered trademark), "Mac (registered trademark) OS", "Mac (registered trademark) OS X Lion", "Mac (registered trademark) OS X", "OS X", or the like, though not especially shown. Accordingly, the external input device is equipped with a function of executing a program when it is connected to the other apparatus.

<Each Functional Element of an External Input Device>

Next, each functional element of the external input device 40 will be explained in detail. The transmission/reception unit 41 (see FIG. 13) is realized by the network I/F 209, shown in FIG. 3, and sends/receives various data (information) to/from the transmission terminal 10. The transmission/reception unit 41, as information relevant to the present embodiment, when the display resolution is changed on the side of the transmission terminal 10, receives resolution information indicating the resolution after the change (first resolution information). The connection detection unit 42 detects that sending/receiving various data to/from the transmission terminal 10 becomes possible by the external device I/F 215, shown in FIG. 3.

The installation determination unit 43a, when the connection detection unit 42 detects that sending/receiving data between the external input device and the transmission terminal 10 becomes possible, determines whether the program for external input device 1451 is installed in the external input device 40. The program acquisition unit 43b, when the installation determination unit 43a determines that the program for external input device 1451 is not installed in the external input device 40, acquires the program for external input device 1451 from the storage unit 1000 of the transmission terminal 10 (see FIG. 4). Meanwhile, the program for external input device 1451 may be installed without determining whether it is installed.

The resolution acquisition unit 44 acquires resolution information indicating a resolution of the display unit 216 of the external input device 40 (second resolution information). The operation input reception unit 46 receives information input by a user's operation. The display control unit 47 displays an image read out by the storage/readout process unit 49, which will be described later, on the display unit 216. The mount unit 48 has the storage unit 1000 of the transmission terminal 10 mounted thereon. According to the above processes, the external input device 40 can install the program for external input device 1451.

The display data acquisition unit 451 acquires display data representing the image displayed on the display unit 216 of the external input device 40. The display data transmission unit 452 transmits the display data acquired by the display data acquisition unit 451 to the transmission terminal 10. The resolution conversion unit 453, based on the resolution of the display unit 216 of the external input device 40 (the second resolution information) and the resolution of the display unit 120 of the transmission terminal 10, which has been sent from the transmission terminal 10 and stored in the storage unit 4000 of the external input device 40 (the first resolution information), converts the resolution of the display data to be transmitted to the transmission terminal 10 from the external input device 40.

The region size change unit 454 changes an aspect ratio of the region selected by the user to 16:9. The aspect ratio of 16:9 is an aspect ratio of the display unit 120 of the transmission terminal 10, and is also an aspect ratio of the region where the display data are displayed. In the explanation in the present embodiment, the aspect ratio is assumed to be determined in advance, but the region size change unit can change arbitrarily the aspect ratio of the region. The external input device 40 may inquire of the transmission terminal 10 for the aspect ratio of the region to be changed by the region size change unit 454.

The storage/readout process unit 49 is executed by the HDD 205, shown in FIG. 3, and performs a process of storing various data into the storage unit 4000 and a process of reading out the various data stored in the storage unit 4000.

<<Resolution Management Table>>

The storage unit 4000 includes a resolution management DB 4001. FIG. 14 illustrates an example of a resolution management table stored in the resolution management DB 4001. The resolution management table stores information indicating the resolution in the vertical direction (height direction) of the display unit 120 of the transmission terminal 10, received by the transmission/reception unit 41 and information indicating the resolution in the horizontal direction (width direction), which are associated with each other. For example, the resolution management table, shown in FIG. 14, indicates that the resolution in the width direction of the display unit 120 of the transmission terminal 10 is 1024 and the resolution in the height direction is 768.

Process and Operation in Present Embodiment

Figure 15:
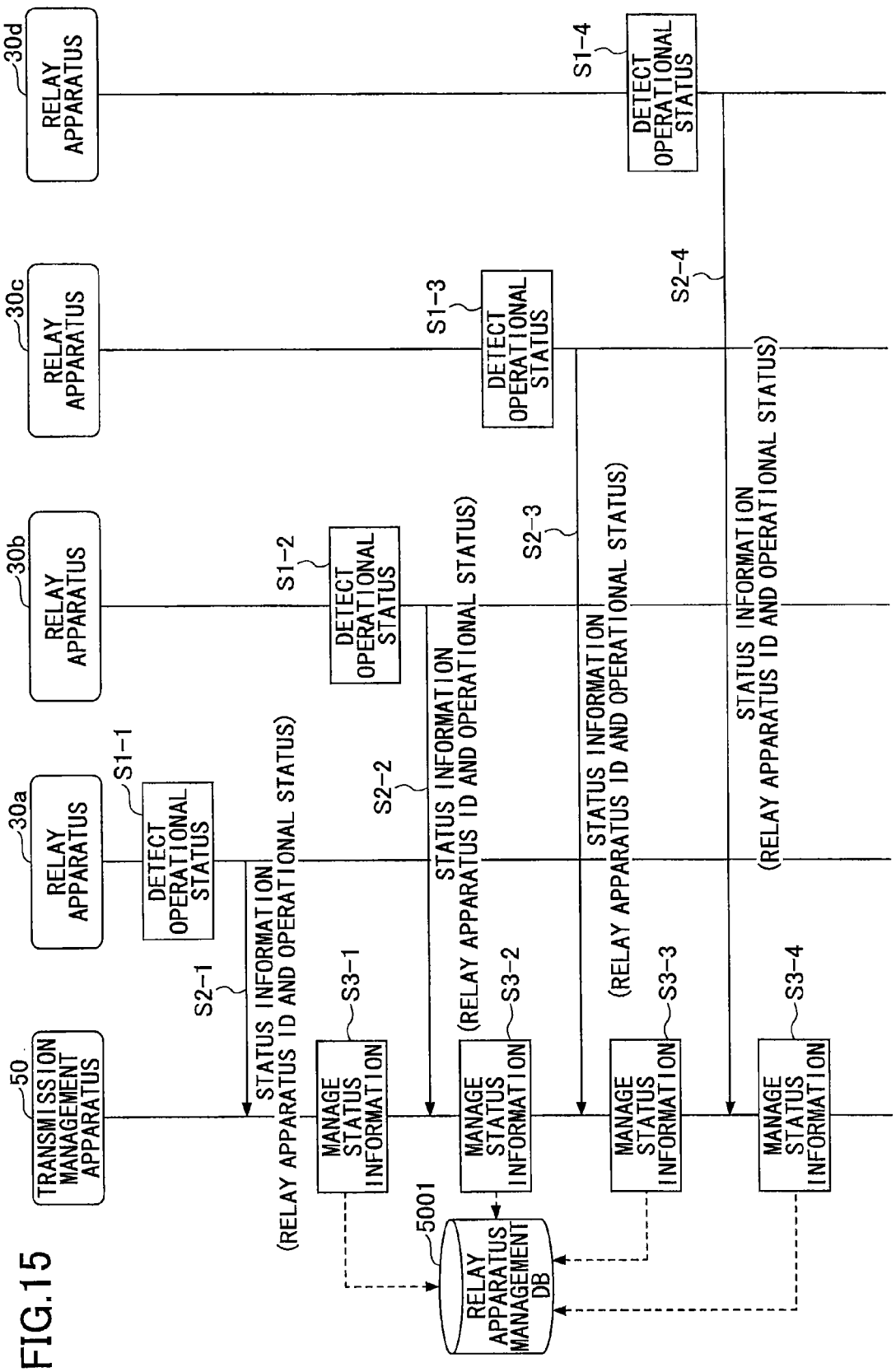
FIG. 15 is a sequence diagram illustrating an example of a process for managing status information representing an operational status of each relay apparatus, sent from the relay apparatus to the transmission management apparatus according to the present embodiment.
Figure 16:
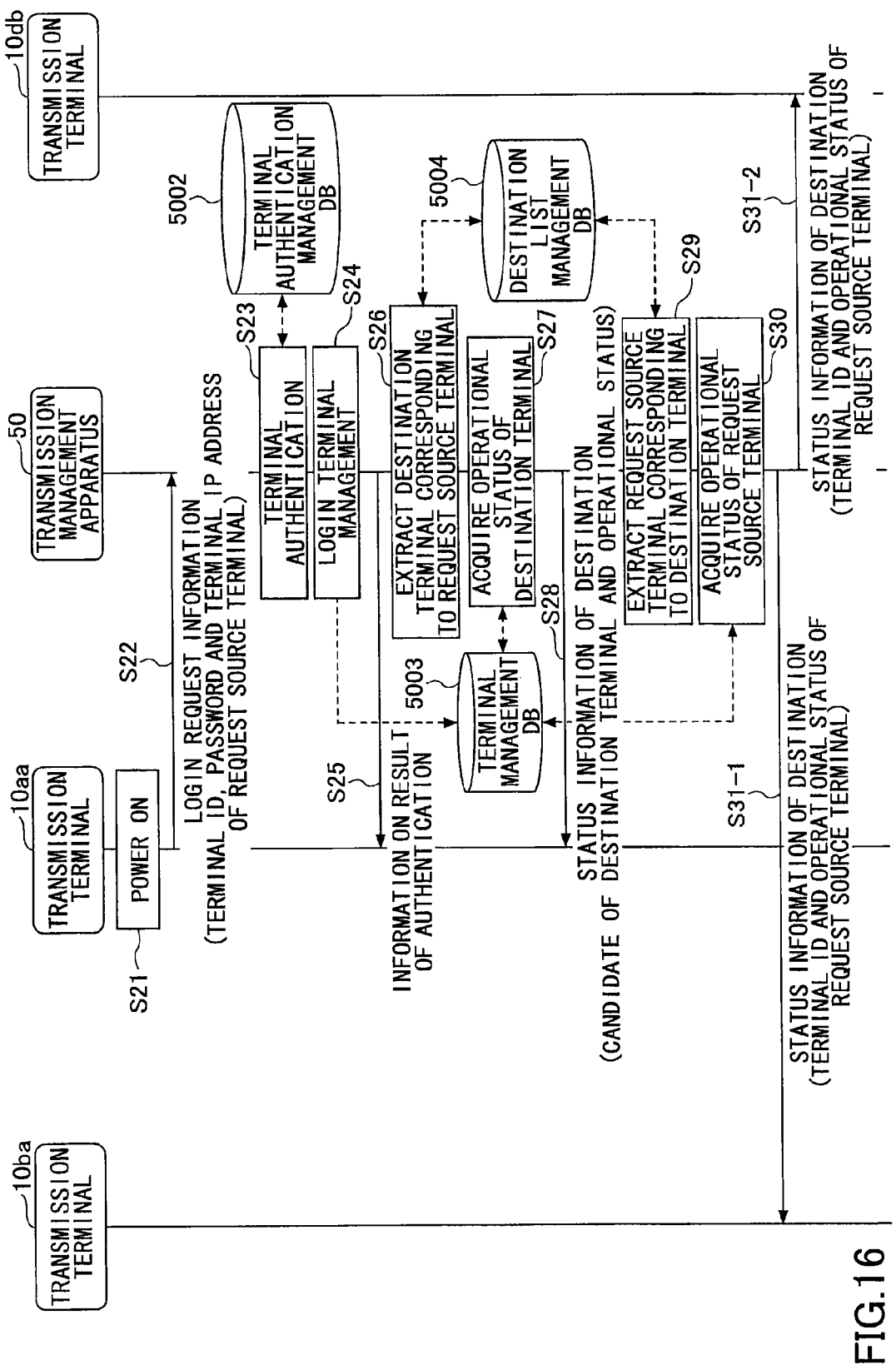
FIG. 16 is a sequence diagram illustrating an example of a process in a stage of preparation for starting the communication between the transmission terminals according present embodiment.
Figure 17:
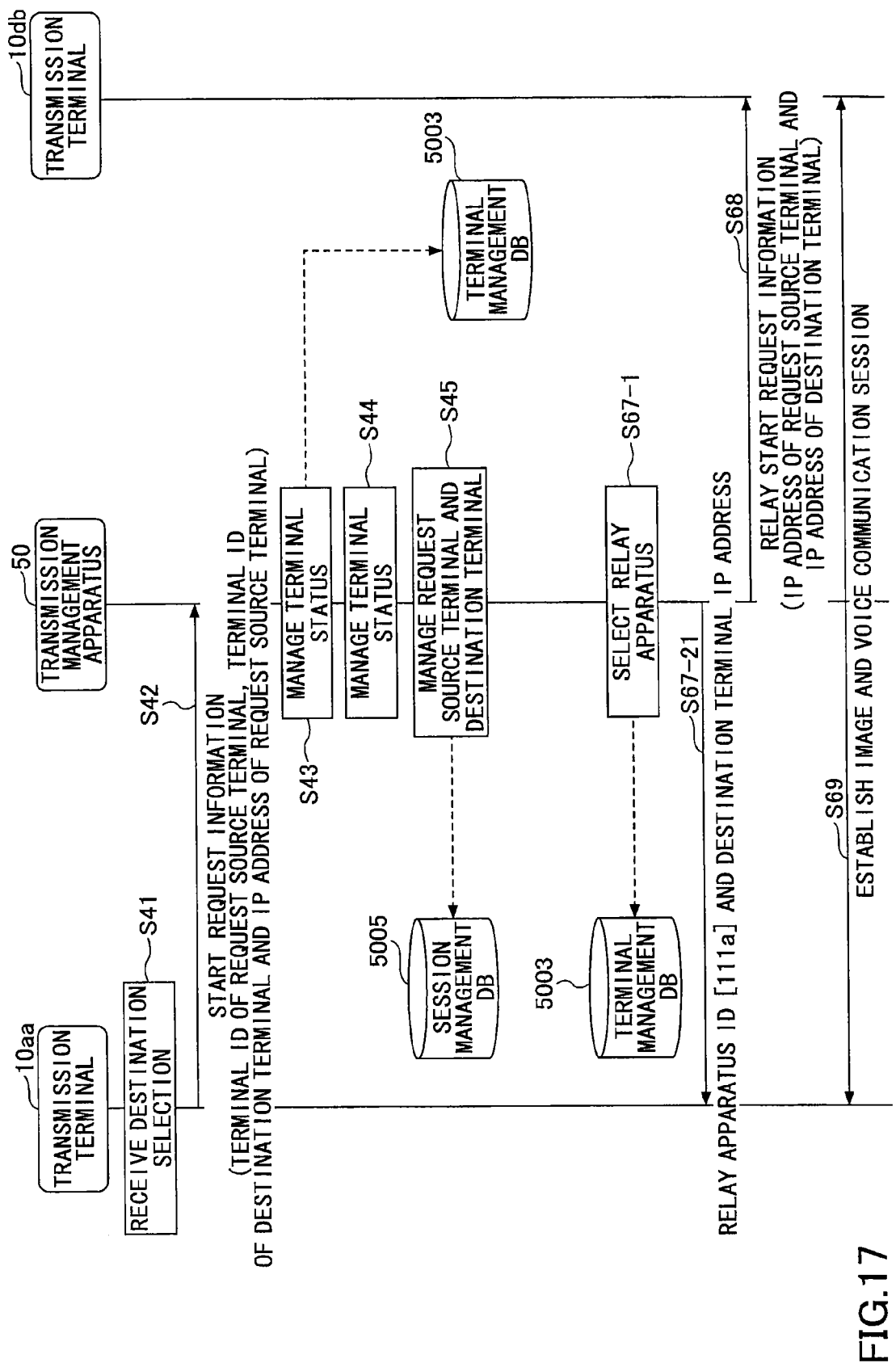
FIG. 17 is a sequence diagram illustrating an example of a process of establishing a session in the transmission terminal according to the present embodiment.
Figure 18:
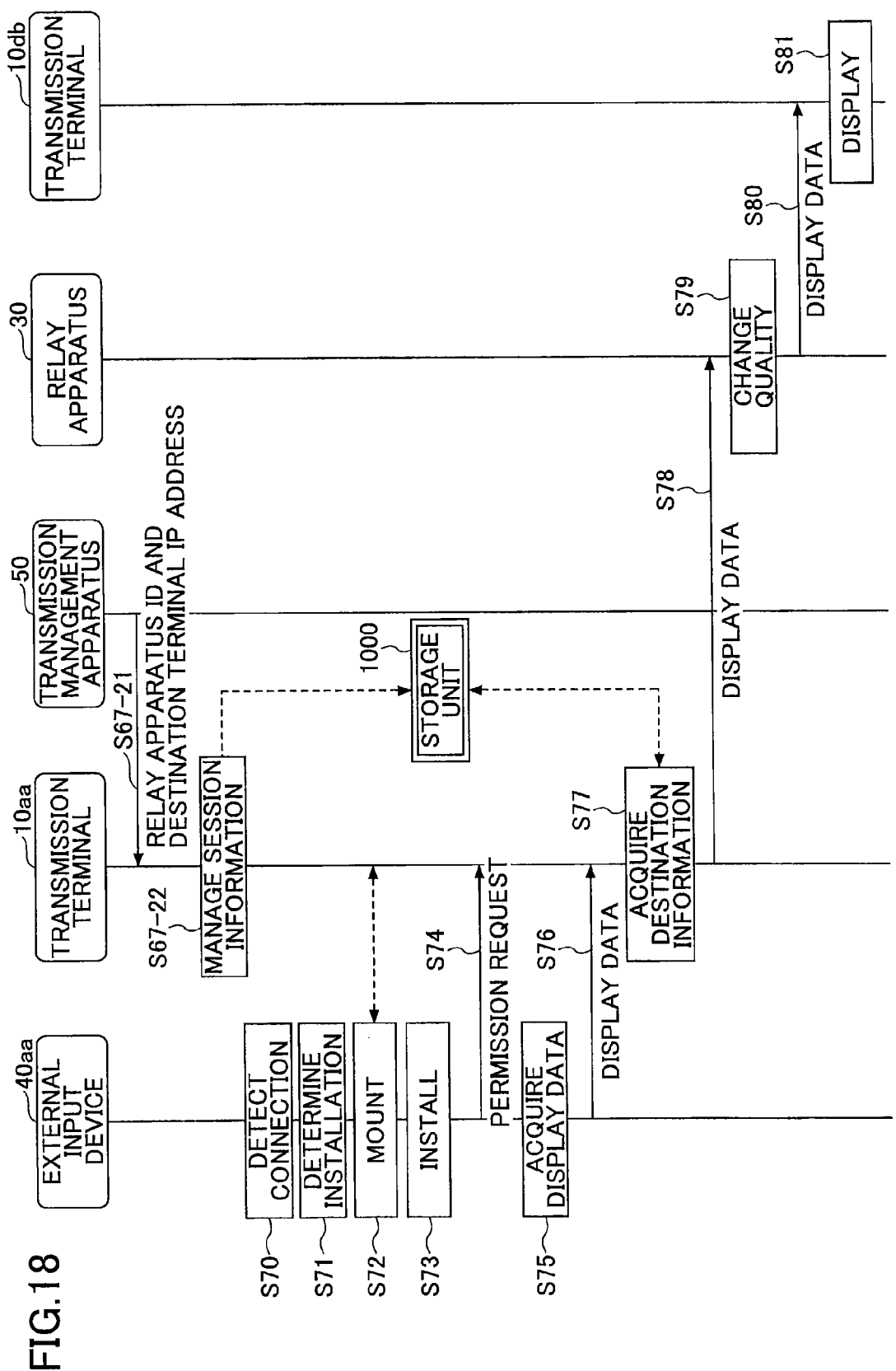
FIG. 18 is a sequence diagram illustrating an example of a process of displaying the display data, displayed on the external input device, on a transmission terminal of another party in the conference according to the present embodiment.
Figure 19:
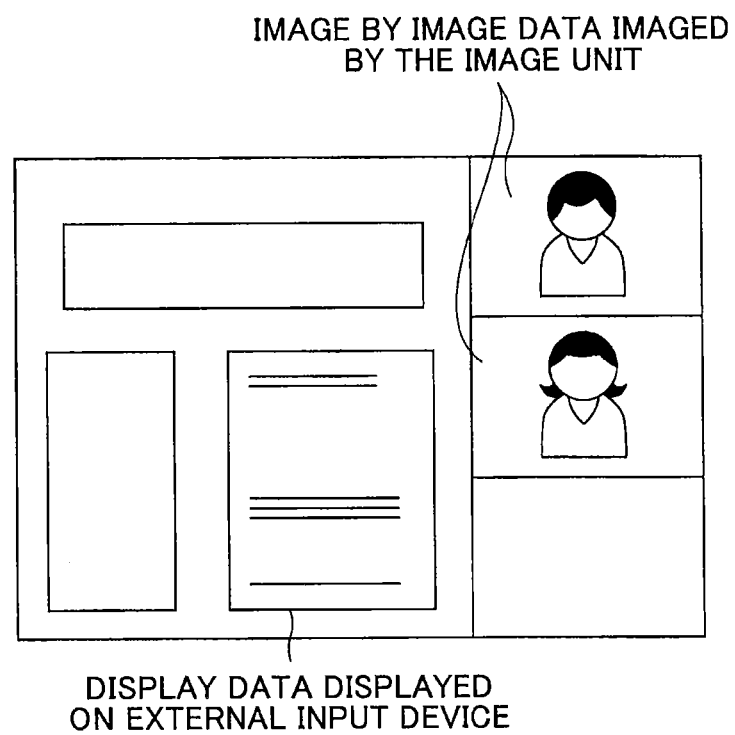
FIG. 19 is a diagram illustrating an example of display data displayed on the display unit according to the present embodiment.
Figure 20:
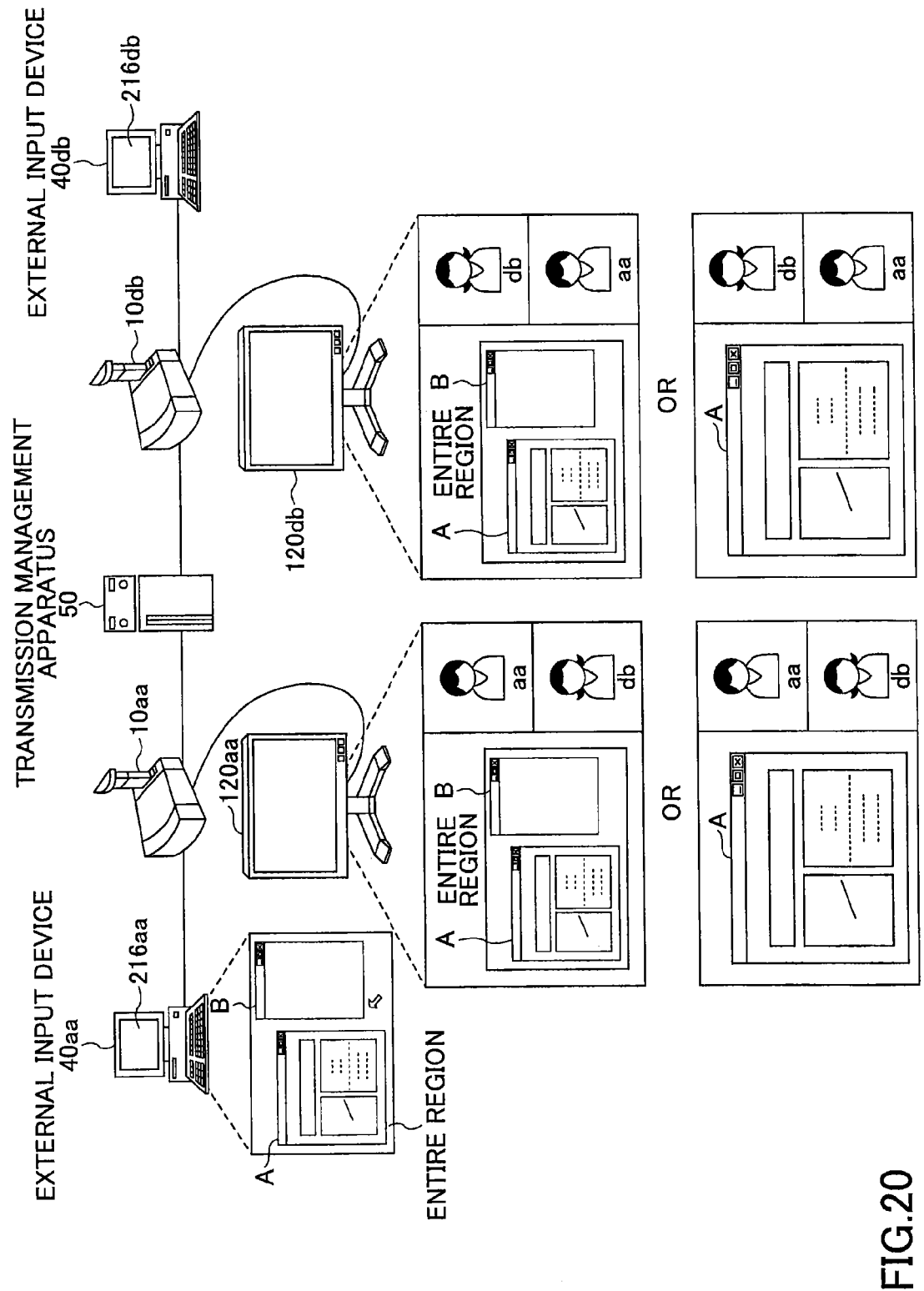
FIG. 20 is an explanatory diagram illustrating an example of screens displayed on display units of the external input devices in the transmission system according to the present embodiment.

Next, each process performed in the transmission system 1 according to the present embodiment will be explained with reference to FIGS. 15 to 20. FIG. 15 is a sequence diagram illustrating an example of the process of managing the status information, sent from the relay apparatus 30 to the transmission management apparatus 50, which indicates the operational status of the relay apparatus 30. FIG. 16 is a sequence diagram illustrating an example of the process in the preliminary stage for starting the communication between the transmission terminals 10. FIG. 17 is a sequence diagram illustrating an example of the process of establishing a session by the transmission terminal 10. FIG. 18 is a sequence diagram illustrating an example of the process of displaying the display data, displayed on the external input device, on the transmission terminal 10 of the other party in the conference. FIG. 19 is a diagram illustrating an example of display data displayed on the display unit 120. FIG. 20 is an explanatory diagram illustrating an example of screens displayed on the display units 216aa and 216db of the external input devices 40aa and 40db, and on the display units 120aa and 120db of the terminal devices 10aa and 10db in the transmission system 1.

With reference to FIG. 15, the process of managing the status information indicating the operational status of the relay apparatus 30, transmitted from the relay apparatus 30 to the transmission management apparatus 50, will be described. In each of the relay apparatuses 30 (30a to 30d), the status detection unit 32 (see FIG. 4) periodically detects the operational status of the relay apparatus 30, to which the status detection unit 32 belongs (step S1-1 to S1-4). The transmission/reception unit 31 of each of the relay apparatuses 30 periodically transmits the status information to the transmission management apparatus 50 via the communication network 2, so that the transmission management apparatus 50 manages in real time the operational status of the relay apparatuses (step S2-1 to S2-4). The status information includes the relay apparatus ID of the relay apparatus 30 and the operational status detected by the status detection unit 32 of the relay apparatus 30 corresponding to the relay apparatus ID. In the present embodiment, the relay apparatuses 30*a*, 30*b* and 30*d* normal operational states indicate "online", whereas the operational state of the relay apparatus 30*c* indicates "offline", wherein the relay apparatus 30*c* operates but has a problem in the program for executing the relaying operation of the relay apparatus 30*c*.

Next, in the transmission management apparatus 50, the transmission/reception unit 51 receives the status information transmitted from each of the relay apparatuses 30*a* to 30*d*, and manages the status information by storing the status information for each of the relay apparatus IDs in the relay apparatus management DB 5001 in the storage unit (the relay apparatus management table in FIG. 7) via the storage/readout process unit 59 (step S3-1 to S3-4). Accordingly, for the operational statuses of the relay apparatuses 30, as shown in the relay apparatus management table (see FIG. 7), the statuses "online" or "offline", are stored and managed for the respective relay apparatus IDs. Moreover, the reception time when the transmission management apparatus 50 receives the status information is also stored and managed for each relay apparatus ID. In the case that status information is not sent from the relay apparatus 30, in the relay apparatus management table, shown in FIG. 7, a field of the operational status and a field of the reception time in each record will be blank, or indicate the operational status and the reception time of the status information, received previously.

Next, with reference to FIG. 16, the processes in the preliminary stage before starting the communication between the transmission terminal 10*aa* and the transmission terminal 10*db* will be described in the following. At first, when the user turns on the power switch 109, shown in FIG. 2, the operation input reception unit 12, shown in FIG. 4, receives the user's operation, and the power is turned ON (step S21). Next, the login request unit 13, when receiving the operation for turning on the power, automatically sends login request information, indicating a login required, to the transmission management apparatus 50 from the transmission/reception unit 11 via the communication network 2 (step S22). The login request information includes the terminal ID for identifying the terminal 10*aa* as the request source terminal and the password. The terminal ID and the password have been read out from the storage unit 1000 via the storage/readout process unit 19 and have been transmitted to the transmission/reception unit 11. Moreover, when the login request information is sent from the transmission terminal 10*aa* to the transmission management apparatus 50, the transmission management apparatus 50 on the reception side can recognize the IP address of the transmission terminal 10*aa* on the transmission side.

Next, the terminal authentication unit 52 of the transmission management apparatus 50 (see FIG. 4) searches the terminal authentication management DB 5002 (the terminal authentication management table in FIG. 8) with the terminal ID and the password as a search key included in the login request information received via the transmission/reception unit 51, and performs terminal authentication by determining whether the same terminal ID and the password are managed in the terminal authentication management DB 5002 (step S23). When the terminal authentication unit 52 determines that the login request information is from the terminal 10, which has authorization for use, since the terminal authentication unit 52 manages the same terminal ID and the same password, the status management unit 53 stores in the terminal management DB 5003 (the terminal management table in FIG. 9) the terminal ID, an operational status, a reception time when the login request information is received, and the IP address of the terminal 10*aa*, which are associated with each other (Step S24). Accordingly, the terminal management table (see FIG. 9), stores the operational status "online", the reception time "2009.11.10.13:40", and the IP address of the terminal 10*aa* "1.2.1.3", associated with the terminal ID "01aa".

Next, the transmission/reception unit 51 of the transmission management apparatus 50 sends authentication result information, indicating a result of the authentication obtained by the terminal authentication unit 52, via the communication network 2, to the request source terminal 10*aa*, which has required the login (step S25). Further, a process when the terminal authentication unit 52 determines the request terminal has authorization for use will be explained as follows in the present embodiment.

The terminal extraction unit 54 of the transmission management apparatus 50 searches the destination list management table (see FIG. 10) with the terminal ID "01aa" of the request source terminal 10*aa*, which has required the login, as a search key, and extracts the terminal ID of a candidate of a destination terminal 10, which can communicate with the request source terminal 10*aa*, by reading out from the destination list management table (step S26). In the present embodiment, the terminal ID "01ab", "01ba" and "01db" of the destination terminals 10*ab*, 10*ba* and 10*db* corresponding to the terminal ID "01aa" of the request source terminal 10*aa*, are extracted.

Next, the terminal status acquisition unit 55 searches the terminal management table (see FIG. 9) with the terminal IDs of the candidates of the destination terminal 10 as a search key extracted by the terminal extraction unit 54 ("01ab", "01ba", "01db"), and acquires, by reading out an operational status ("offline", "online", "online") for each terminal ID, extracted by the terminal extraction unit 54, the operational status of each of the destination terminals 10*ab*, 10*ba* or 10*db* (step S27).

Next, the transmission/reception unit 51 sends destination status information including the terminal IDs used as the search key at step S27 ("01ab", "01ba" and "01db") and the operational statuses ("offline", "online" and "online") of the transmission terminals (10*ab*, 10*ba*, and 10*db*) corresponding to the terminal IDs, to the request source terminal 10*aa* via the communication network 2 (step S28). Accordingly, the request source terminal 10*aa* can recognize the operational status ("offline", "online", and "online") at present of each of terminals (10*ab*, 10*ba* and 10*db*) as the candidates of the destination terminal 10, which can communicate with the request source terminal 10*aa*.

Furthermore, the terminal extraction unit 54 of the transmission management apparatus 50 searches the destination list management table (see FIG. 10) with reference to the terminal ID "01aa" of the request source terminal 10*aa*, which has required the login, as a search key, and extracts terminal IDs of other request source terminals 10, which are registered candidates of a destination terminal 10 which includes the above request source terminal 10*aa* with the terminal ID "01aa" (step S29). In the destination list management table, shown in FIG. 10, the terminal IDs of the other request source terminals 10 extracted as above, are "01ab", "01ba" and "01db".

Next, the terminal status acquisition unit 56 of the transmission management apparatus 50, searches the terminal management table (see FIG. 9) with the terminal ID "01aa" of the request source terminal 10*aa*, which required the login, as a search key, and acquires the operational status of the request source terminal 10*aa* (step S30).

Next, the transmission/reception unit 51 sends, to the transmission terminals (10*ba* and 10*db*) with the operational status of "online", in the terminal management table (see FIG. 9), out of the transmission terminals (10*ab*, 10*ba* and 10*db*) corresponding to the terminal IDs ("01ab", "01ba" and "01db"), extracted at step S29, destination status information including the terminal ID "01aa" of the request source terminal 10*aa* acquired at step S30 and the operational status of "online" (steps S31-1 and S31-2). When the transmission/reception unit 51 sends the destination status information to the transmission terminals 10*ba* and 10*db*, based on the terminal IDs ("01ba" and "01db"), the transmission/reception unit 51 refers to the IP addresses of the transmission terminals managed in the terminal management table (see FIG. 9). Accordingly, the transmission/reception unit 51 can transfer, to each of the other destination terminals 10*ba* and 10*db*, which can communicate with the request source terminal 10*aa* having required the login, as a destination, the terminal ID "01aa" of the request source terminal 10*aa*, which required the login, and the operational status of "online".

On the other hand, in the other transmission terminals 10, when the user turns on the power switch 109, as shown in FIG. 2 (step S21, as above), the operation input reception unit 12 (see FIG. 4) receives the operation for the power to be ON. Since the same processes as in steps S22 to S31-1 and S31-2 are performed, an explanation is omitted.

Next, with reference to FIG. 17, the process of establishing the session by the transmission terminal will be explained in the following. In the present embodiment, the request source terminal 10*aa* can communicate with at least one of the transmission terminals 10*ba* and 10*db* with the operational status of "online", out of the terminals 10 as the candidates of the destination terminal, according to the destination status information received at step S28 above. Accordingly, in the following description, processes in the case where a user of the request source terminal 10*aa* selects to start communicating with the destination terminal 10*db* will be explained.

At first, the user selects the terminal 10*db* by depressing the operation button 108 (see FIG. 2) to select the terminal 10*db*, then the operation input reception unit 12 (see FIG. 4) receives the selection to assign the transmission terminal 10*db* to the destination (step S41). Next, the transmission/reception unit 11 of the transmission terminal 10*aa* sends start request information, including the terminal ID "01aa" of the request source terminal 10*aa* and the terminal ID "01db" of the destination terminal 10*db*, and indicates that starting the communication is required, to the transmission management apparatus 50 (step S42). According to the above processes, the transmission/reception unit 51 of the transmission management apparatus 50 receives the start request information and can recognize the IP address "1.2.1.3" of the request source terminal 10*aa* as the transmission source. The status management unit 53, based on the terminal ID "01aa" of the request source terminal 10*aa* and the terminal ID "01db" of the destination terminal 10*db*, included in the start request information, in the terminal management table (see FIG. 9) of the terminal management DB 5003, changes both of the fields of the operational status in the records, each including the terminal ID "01aa" or the terminal ID "01db", to "busy" (step S43). In this stage, although both the request source terminal 10*aa* and the destination terminal 10*db* have not yet started communicating with each other, both terminals 10 have transitioned to a busy state. When another transmission terminal tries to communicate with the request source terminal 10*aa* or the destination terminal 10*db*, a sound or a display indicating a busy state is output.

The transmission management apparatus 50 generates a session ID for selection used for executing the session for selecting the relay apparatus 30 (step S44). The session management unit 57 stores the session ID for selection "se1", generated at step S44, the terminal ID "01aa" of the request source terminal 10*aa*, and the terminal ID "01db" of the destination terminal 10*db*, which are associated with each other, into the session management table (see FIG. 11) of the storage unit 5000, and manages them (step S45).

After that, the transmission management apparatus 50 refines the selection for the relay apparatus 30, which relays communication between the request source terminal 10*aa* and the destination terminal 10*db*, based on the relay apparatus management DB 5001 and the terminal management DB 5003. However, further explanation in detail will be omitted.

Next, the session management unit 57 of the transmission management apparatus 50, in the session management table (see FIG. 11) of the session management DB 5005, stores the relay apparatus ID "111a" of the relay apparatus 30*a*, selected above as the final one, in the field of the relay apparatus ID in the record including the session ID for selection "se1", and manages it (step S67-1). The transmission/reception unit 51 sends the relay apparatus ID "111a" and the IP address of the destination terminal 10*db* to the request source terminal 10*aa* (step S67-21). The transmission/reception unit 51 of the transmission management apparatus 50 sends the relay start request information, indicating that commencement of relaying is required, to the relay apparatus 30*a* via the communication network 2 (not shown). The relay start request information includes the IP addresses of the request source terminal 10*aa* and the destination terminal 10*db*, which are relayed as "1.2.1.3" and "1.3.2.4". According to the above processes, the relay apparatus 30 establishes a session to send/receive three kinds of image data of the low image quality, intermediate image quality and a high image quality, and voice data between the transmission terminals 10*aa* and 10*db* (step S69). Accordingly, each of the transmission terminals 10*aa* and 10*db* can start a video conference. The number of kinds of image quality is not limited to three as in the present embodiment. The number of the kinds of image quality may be greater than three or may be less than three.

Each transmission terminal 10 according to the present embodiment sends/receives image data by using a standard for video encoding, such as H.264 (H.264/AVC. MPEG-4 part 10, MPEG4 AVC), H.264/SVC, which is the extended standard thereof, or MPEG-2.

Next, with reference to FIG. 18, the process of sending display data representing an image, displayed on the display unit 216 of the external input device 40, to the other transmission terminal 10, and displaying the display data on the display unit 120 of the other transmission terminal 10, after the relay apparatus is determined, will be explained as follows. In the present embodiment, the process in the case where information displayed on the external input device 40*aa* connected to the transmission terminal 10*aa* is displayed on the transmission terminal 10*db*, which is the destination terminal, will be explained as an example.

When the relay apparatus 30 is determined as above, the transmission/reception unit 11 of the transmission terminal 10*aa* receives the relay apparatus IP "111a" and the IP address "1.3.2.4" of the destination terminal 10*db*, which the transmission management apparatus 50 sends at step S67-21. The storage/readout process unit 19 stores the received relay apparatus ID "111a" and the IP address "1.3.2.4" into the storage unit 1000 (step S67-22).

Moreover, when the external input device 40*aa* is connected to the transmission terminal 10*aa*, the connection detection unit 42 (see FIG. 13) of the external input device 40*aa* detects the connection (step S70). At the time of starting up the external input device 40*aa*, the display control unit 47 displays a screen including at least the entire region. When the connection detection unit 42 detects the connection of the external input device 40*aa* to the transmission terminal 10*aa*, the installation determination unit 43*a* determines whether the external input device 40*aa* is equipped with the display data acquisition unit 451, the display data transmission unit 452, the resolution conversion unit 453 and the region size change unit 454 (step S71). Specifically, the installation determination unit 43*a* determines whether the program for external input device 1451 is installed in the external input device 40*aa*. If the program is installed, the installation determination unit 43*a* determines that the external input device 40*aa* is equipped with the functional element corresponding to the program.

On the other hand, when the installation determination unit 43*a* determines that the external input device is not equipped with any of the display data acquisition unit 451, the display data transmission unit 452, the resolution conversion unit 453 or the region size change unit 454, the mount unit 48 has the storage unit 1000 of the transmission terminal 10*aa* mounted thereon (step S72). Next, the program acquisition unit 43*b* acquires the program for external input device 1451 stored in the storage unit 1000 of the transmission terminal 10, and installs the acquired program in the external input device 40*aa* (step S73). According to the above process, the external input device 40*aa* is equipped with the display data acquisition unit 451, the display data transmission unit 452, the resolution conversion unit 453 and the region size change unit 454. The program for external input device 1451 may be installed in the external input device 40*aa* in advance.

After the process at step S73, the transmission/reception unit 41 sends information requiring a permission to execute the program for external input device 1451, i.e. a permission to activate the display data acquisition unit 451, the display data transmission unit 452, the resolution conversion unit 453 and the region size change unit 454, to the transmission terminal 10*aa* (step S74). When the transmission/reception unit 41 receives information indicating the permission in response to the requirement from the transmission terminal 10*aa*, the display data acquisition unit 451 acquires display data representing the image displayed on the display unit 216 (step S75). Next, the resolution conversion unit 453 converts the resolution of the display data acquired by the display data acquisition unit 451. Furthermore, the display data transmission unit 452 sends the display data, the resolution of which is converted, to the external information transmission/reception unit 18 of the transmission terminal 10*aa* (step S76). The process of converting the resolution of the display data by the resolution conversion unit 453 will be explained later in detail. The process of converting the resolution by the resolution conversion unit 453 is different from the process, which is performed based on the operational status of the above relay apparatus 30 or the transmission rate of the communication between the transmission terminal 10 and the relay apparatus. The resolution to be converted is not determined according to the operational status of the relay apparatus 30 or to the transmission rate between the relay apparatus 30 and the transmission terminal 10.

When the external information transmission/reception unit 18 of the transmission terminal 10*aa*, as the transmission source, receives the display data from the external input device 40*aa*, the storage/readout process unit 19 reads out the relay apparatus ID "111a" and the IP address "1.3.2.4" of the transmission terminal 10*db*, as the destination, stored in the storage unit 1000 (step S77). The transmission/reception unit 11 sends, to the relay apparatus 30 specified by the relay apparatus ID "111a" read out at step S77, the display data, the resolution of which is converted, and the IP address "1.3.2.4" of the transmission terminal, as the destination (step S78). When the relay apparatus 30 receives the display data transmitted from the transmission terminal 10*aa* at step S78, the relay apparatus 30 changes the image quality of the display data based on the IP address "1.3.2.4" of the transmission terminal 10*db*, as the destination (step S79), and sends the display data to the transmission terminal 10*db* (step S80). When the transmission/reception unit 11 of the transmission terminal 10*db* receives the display data sent from the relay apparatus 30, the image display control unit 14*b* displays an image represented by the received display data on the display unit 120 (step S81). FIG. 19 is a diagram illustrating an example of a screen image displayed on the display unit. In the left-hand area of the screen, the display data displayed on the external input device 40*aa* are displayed. In the upper right area of the screen, image data imaged by the image unit 14*a* of the transmission terminal 10*aa* and sent from the transmission/reception unit 11 are displayed. Moreover, in the lower right area of the screen, image data imaged by the image unit 14*a* of the transmission terminal 10*db* are displayed.

FIG. 20 is an explanatory diagram illustrating an example of screens displayed on the display units of the external input devices 40*aa* and 40*db*, and the display units 120*aa* and 120*db* connected to the transmission terminals 10*aa* and 10*db* respectively, in the whole configuration of the transmission system 1. The transmission system 1 (information processing system) according to the present embodiment includes the transmission terminal 10 communicably connected with another transmission terminal 10 via a network, and the external input device 40 (information processing apparatus) communicably connectable to the transmission terminal. The transmission system 1 further includes the region size change unit 454 (aspect ratio change unit) that changes an aspect ratio of a region displayed on the display unit 216 to a predetermined aspect ratio. The display unit 216 may be integrated with the information processing apparatus or may be connected to the information processing apparatus. The transmission system 1 further includes the display data acquisition unit 451 (acquisition unit) that acquires display data in the region the aspect ratio of which has been changed by the aspect ratio change unit; and the data transmission unit 452 that transmits the display data acquired by the acquisition unit to the transmission terminal 10. On the display unit of the external input device 40*aa*, a screen, which the user shares with the transmission terminal 10*db*, is displayed. The screens displayed on the external input devices 40*aa* and 40*db* are denoted as "desktop screens". In the entire region of the desktop screen (in the following, denoted "entire region") plural regions can be displayed. In FIG. 20, as an example, a region "A" and a region "B" are displayed in the entire region of the screen of the external input device 40*aa*.

According to the process illustrated in FIG. 18, the transmission terminal 10*aa* displays image data and display data on the display unit 120*aa*, and the transmission terminal 10*db* displays image data and display data on the display unit 120*db*. In the following, the screens displayed on the display unit are denoted as "transmission terminal screens". In the transmission terminal screens of the upper row in FIG. 20, the entire region is displayed as the display data, and a user "aa" of the transmission terminal 10*aa* and a user "db" of the transmission terminal 10db are displayed as the image data. In the transmission terminal screens of the lower row in FIG. 20, the region "A" is displayed as the display data, and the user "aa" of the transmission terminal 10aa and the user "db" of the transmission terminal 10db are displayed as the image data.

Moreover, in the display unit 216db of the external input device 40db, the entire region or a specific region, which the user "db" displays, remains displayed. The screen on the display unit 216db is not affected by the operation of the user "aa".

In the present embodiment, the user can select at least one of the entire region, the region "A" or the region "B", and display them on the transmission terminal screen.

First Example

In the present example, a transmission system 1, in which the user can select at least one of the entire region or arbitrary regions and display them on the transmission terminal screen only by operating a pointing device, such as a mouse 212, will be explained. Meanwhile, the pointing device, in the present example, is mainly a mouse 212. In the case where the display unit 216 is equipped with a touch panel, the pointing device is a function of detecting a position of a fingertip of the user.

Figure 21A:
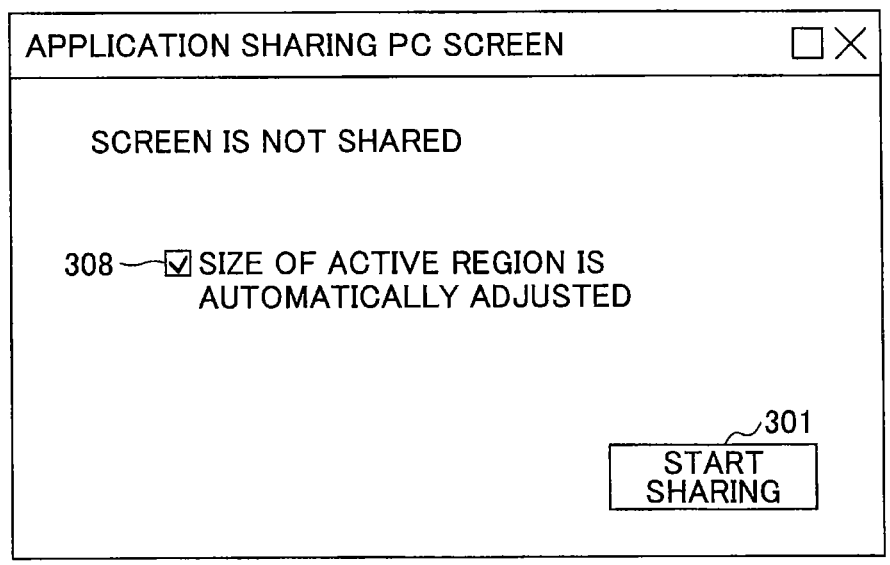
FIGS. 21A and 21B are diagrams illustrating an example of a user interface of a program for an external input device according to the present embodiment.
Figure 21B:
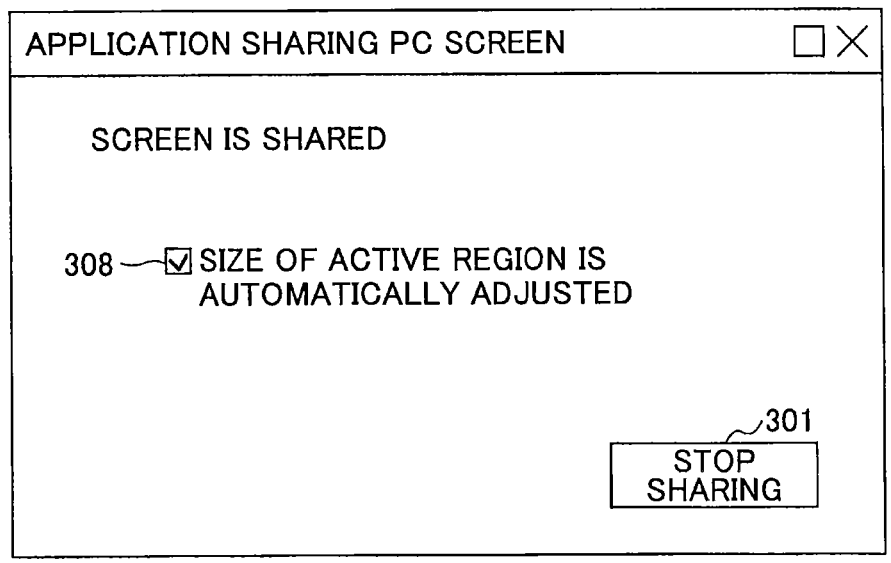

FIGS. 21A and 21B are diagrams illustrating an example of a user interface of the program for external input device 1451. In the external input device 40aa the program for external input device 1451 is installed, and the user interface is displayed on the display unit 216 by the user performing a predetermined operation. The predetermined operation includes, for example, clicking or double-clicking an icon of the program for external input device 1451 or the like. Moreover, the user interface may be displayed by the user connecting the external input device 40 to the transmission terminal 10.

In FIG. 21A, a title of the region is "Application sharing PC screen". This is a name for displaying, and means the program for external input device 1451.

A message "Screen is not shared" means that the transmission terminals 10aa and 10db do not share a screen displayed on the display unit 216 of the external input device 40aa (or 40db).

A checkbox 308 is for the user selecting whether a "size of active region is automatically adjusted". In the case where the checkbox 308 is checked, the operation input reception unit 46 receives this setting and memorizes that the setting of the "automatic size adjustment" is ON. In the case where the checkbox 308 is not checked, the operation input reception unit 46 memorized that the setting of the "automatic size adjustment" is OFF.

When the user clicks a sharing setting reception button 301 using a mouse or the like, a sharing of the display data displayed on the display unit 216aa of the external input device 40aa starts.

With the start of the sharing, the user interface in FIG. 21A is changed to that shown in FIG. 21B. In FIG. 21B, a message "screen is not shared" and the sharing setting reception button 301 on which a character string "stop sharing" is displayed are displayed. That is the sharing has already been started, and the function of the sharing setting reception button 301 is switched.

When the user clicks the sharing setting reception button 301 on which the character string "stop sharing" is displayed using the mouse or the like, the sharing of the display data displayed on the display unit 216aa of the external input device 40aa stops, i.e. the display data are not sent to the transmission terminal 10aa.

The operation input reception unit 46, shown in FIG. 13, receives the operation for the sharing setting reception button 301 by the user. The display data acquisition unit 451 acquires, when the user clicks the sharing setting reception button 301 on which the character string "start sharing" is displayed, a region selected by the user as display data.

Meanwhile, in the transmission system 1 according to the present embodiment, display data of an entire region or a region of the external input device 40, in which the sharing setting reception button 301 with "start sharing" is finally clicked, are shared. Accordingly, in the case where the user "db" clicks the sharing setting reception button 301 on which "start sharing" is displayed shown in FIG. 21A, even if the user "aa" does not click the sharing setting reception button 301 with "stop sharing" shown in FIG. 21B, the sharing of display data displayed on the display unit 216 of the external input device 40aa stops automatically.

Figure 22:
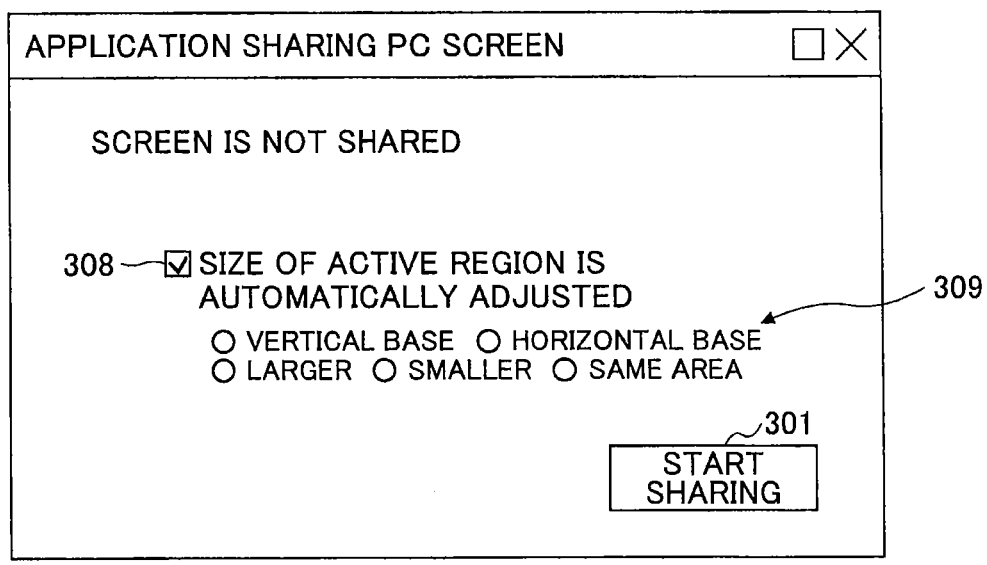
FIG. 22 is a diagram illustrating another example of a user interface according to the present embodiment.

FIG. 22 is a diagram illustrating another example of the user interface. Compared with FIG. 21A, an option setting column 309 is displayed. In the option setting column 309 a radio button is given to each of "vertical base, horizontal base, larger, smaller and same area". Accordingly, the user can select one from the five items. They are the option setting when the region size change unit 454 changes the aspect ratio of the region. They will be described later in detail. The region is changed as follows, respectively:

Vertical base: the horizontal size is changed so that the ratio becomes 16:9 based on the vertical size;

Horizontal base: the vertical size is changed so that the ratio becomes 16:9 based on the horizontal size;

Larger: based on the vertical size or the horizontal size which makes the area larger when the ratio is changed to 16:9;

Smaller: based on the vertical size or the horizontal size which makes the area smaller when the ratio is changed to 16:9; and Same area: the aspect ratio is changed to 16:9 while maintaining the area of the region constant.

Moreover, the user interface may be displayed by using a menu displayed by operating active regions, not displaying the user interface solely as shown in FIGS. 21A, 21B and 22.

Figure 23:
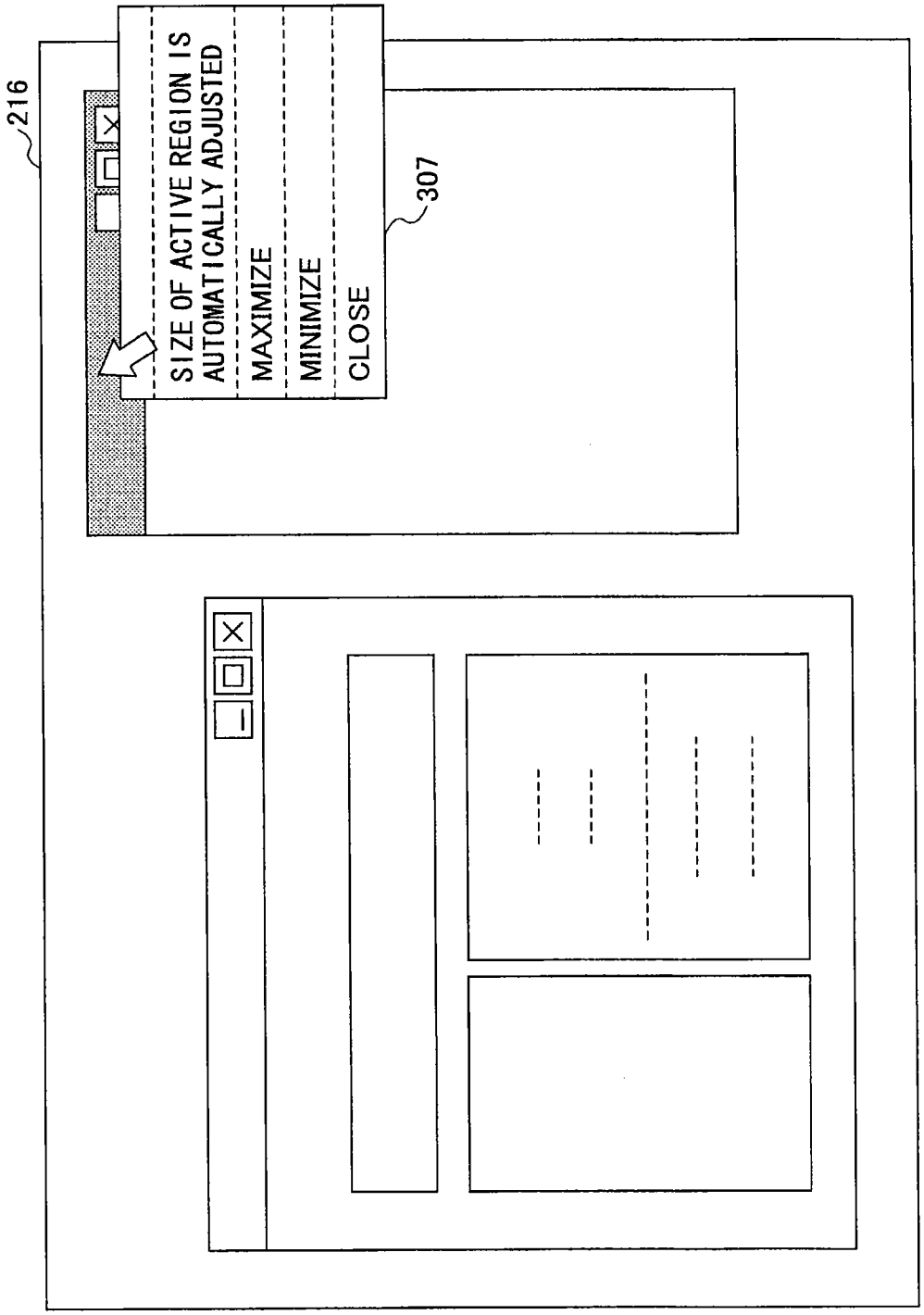
FIG. 23 is a diagram illustrating an example of a user interface displayed by a right click operation according to the present embodiment.

FIG. 23 is a diagram illustrating an example of a user interface displayed by a right clicking. By the user right-clicking a title in an active region, a menu 307 is displayed. Such menu 307 is called "context menu" in Windows (trademark registered). In FIG. 23, an item "size of active region is automatically adjusted" is displayed in the context menu.

By displaying as shown in FIG. 23, the user can select a region an aspect ratio of which will be automatically adjusted and turn the setting of "automatic size adjustment" to ON. Since a setting in the context menu can be set in each region, the user can set the automatic size adjustment of the aspect ratio only for an arbitrary region.

[Procedure of Operation]

Figure 24:
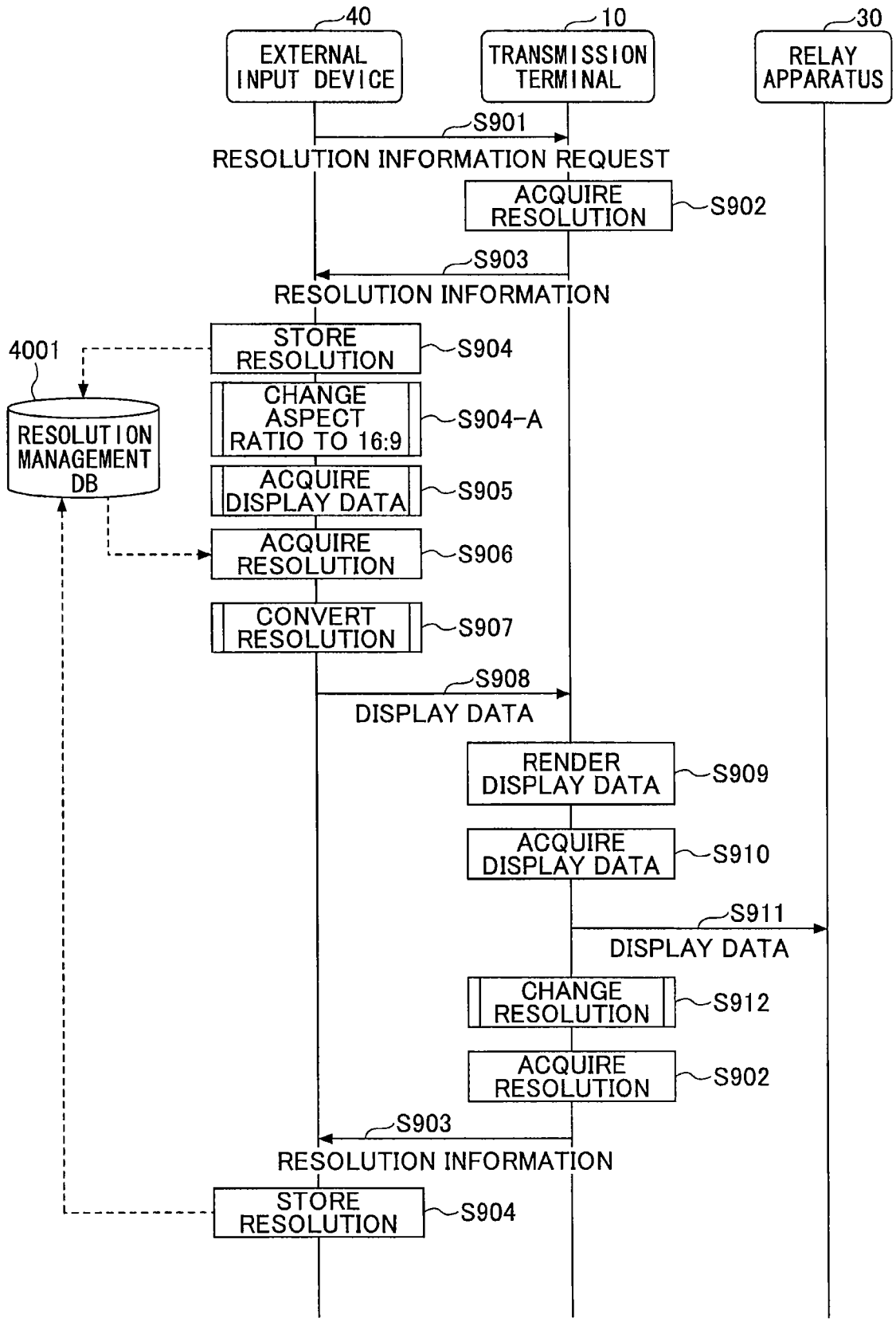
FIG. 24 is a sequence diagram illustrating an example of processes of changing the resolution by the transmission terminal and of converting the resolution by the external input device, using a non-compression format, according to the present embodiment.
Figure 25:
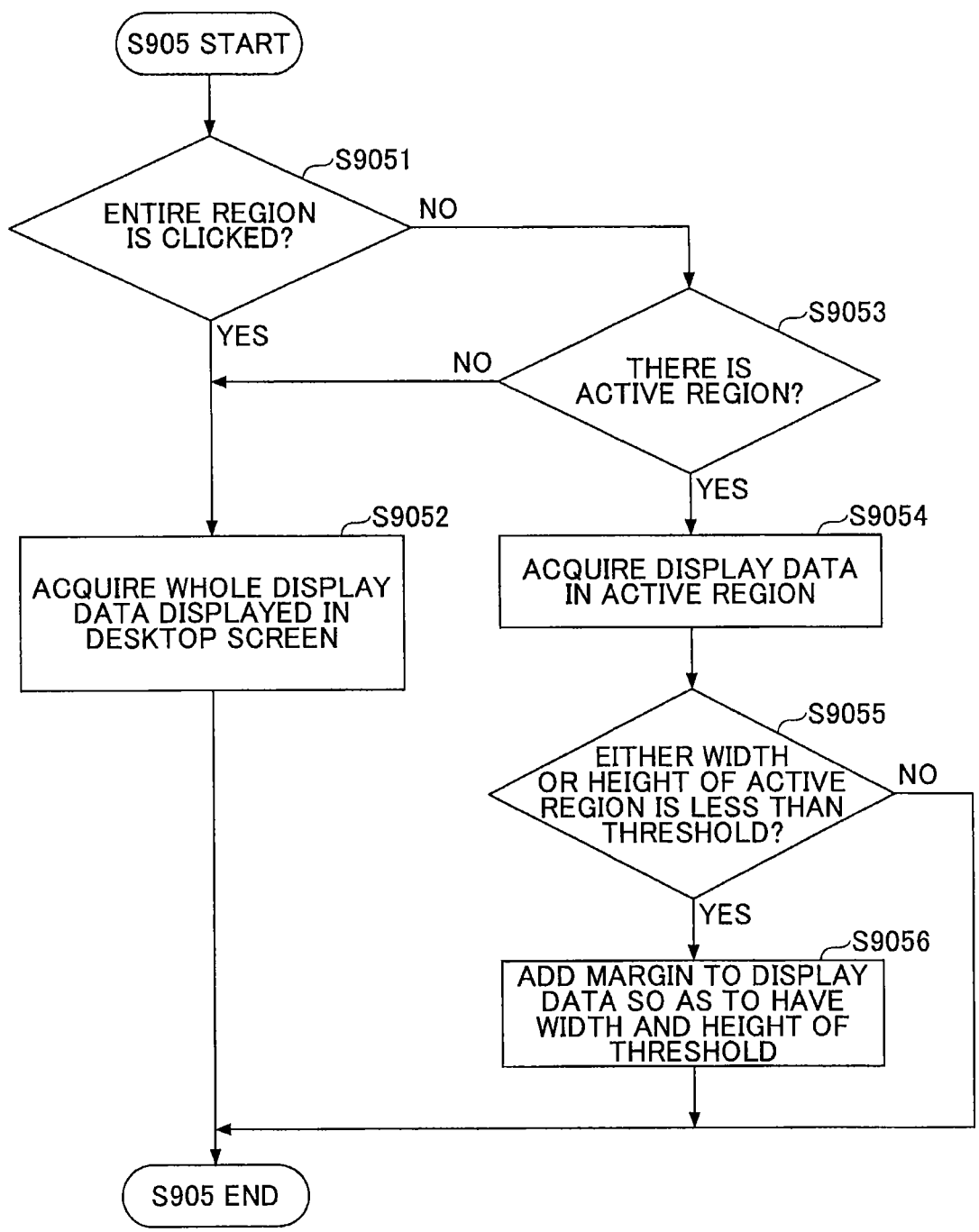
FIG. 25 is a flowchart illustrating an example of a procedure of acquiring displayed data in the entire region or a specific region by the display data acquisition unit according to the present embodiment.
Figure 26:
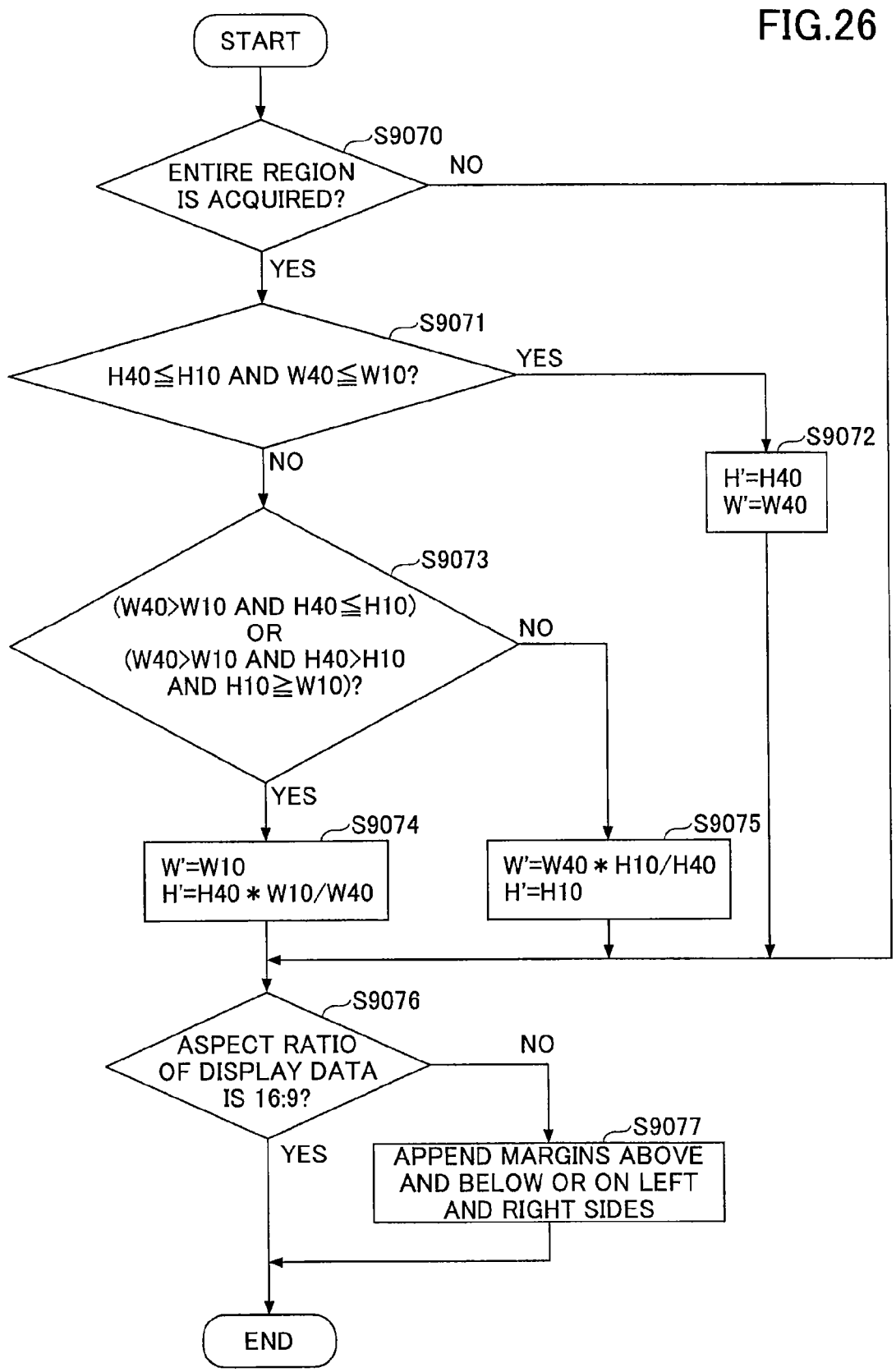
FIG. 26 is a flowchart illustrating an example of a procedure of converting the resolution of image data according to the present embodiment.
Figure 27:
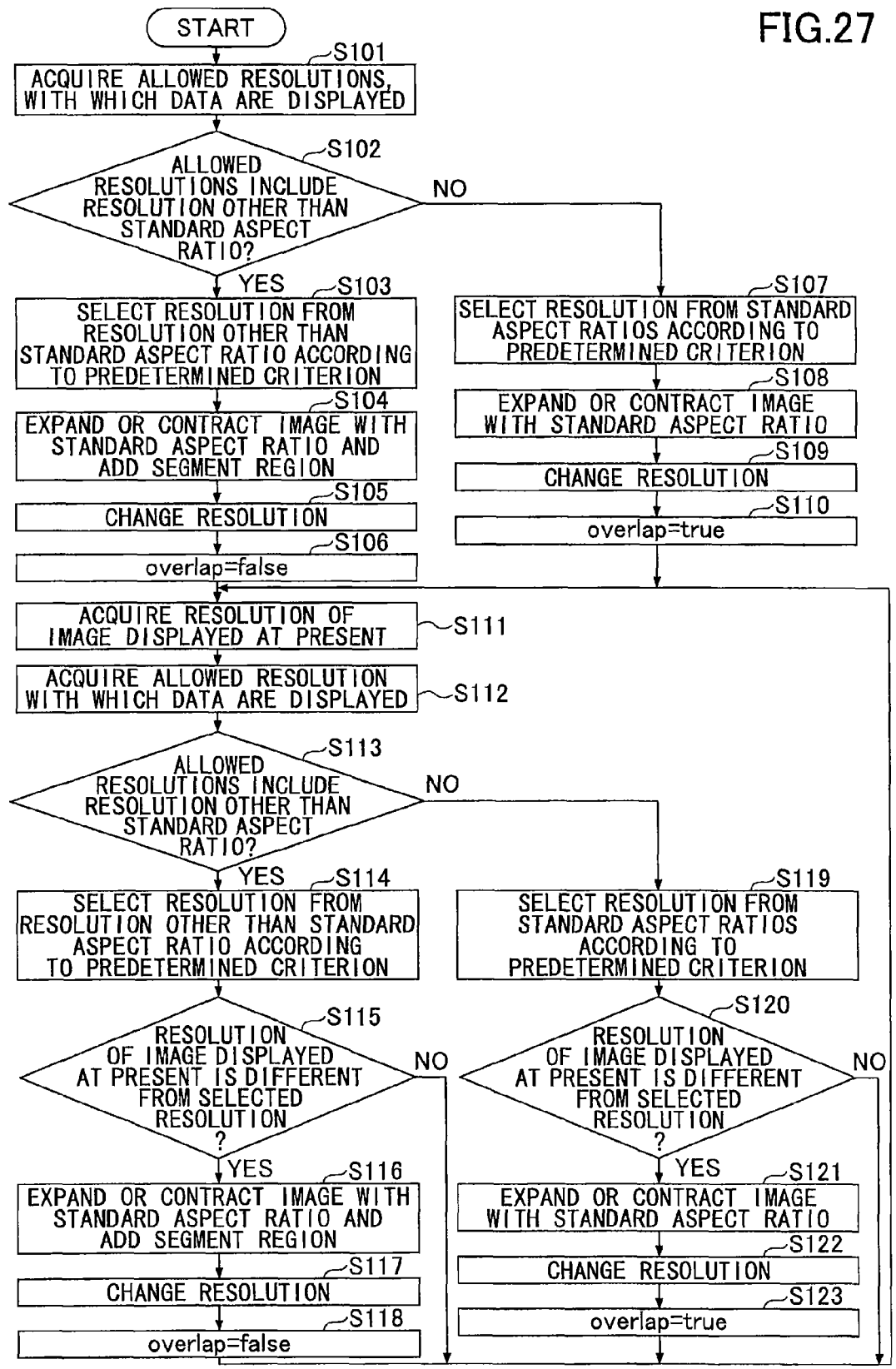
FIG. 27 is a flowchart illustrating an example of a procedure of controlling the resolution of image data, including changing the resolution, by the transmission terminal according to the present embodiment.
Figure 28A:
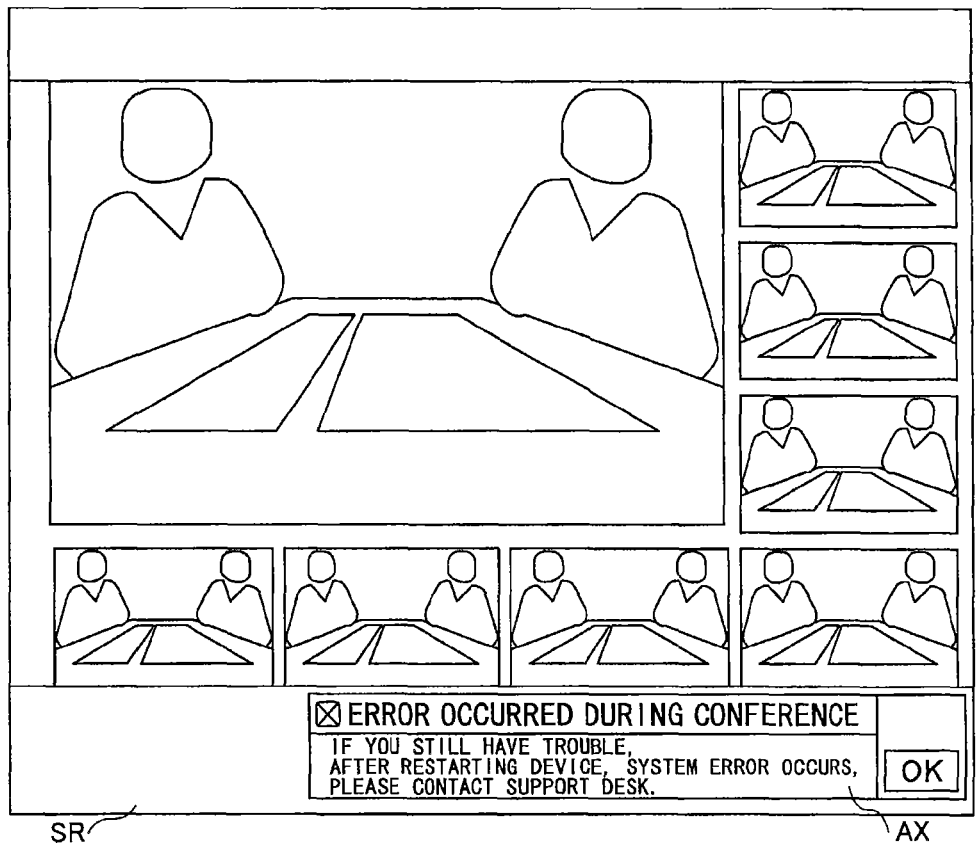
FIGS. 28A and 28B are diagrams illustrating an example of auxiliary information displayed in the screen, used in the supplemental explanation for a determination process at step S102 in FIG. 27 according to the present embodiment.
Figure 28B:
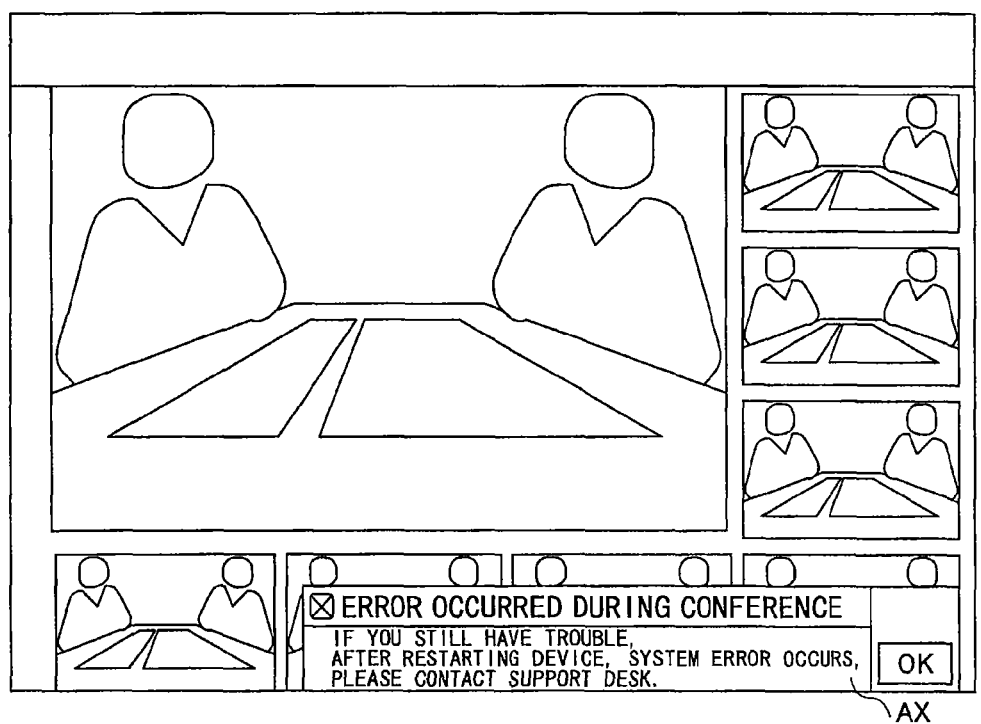
Figure 29:
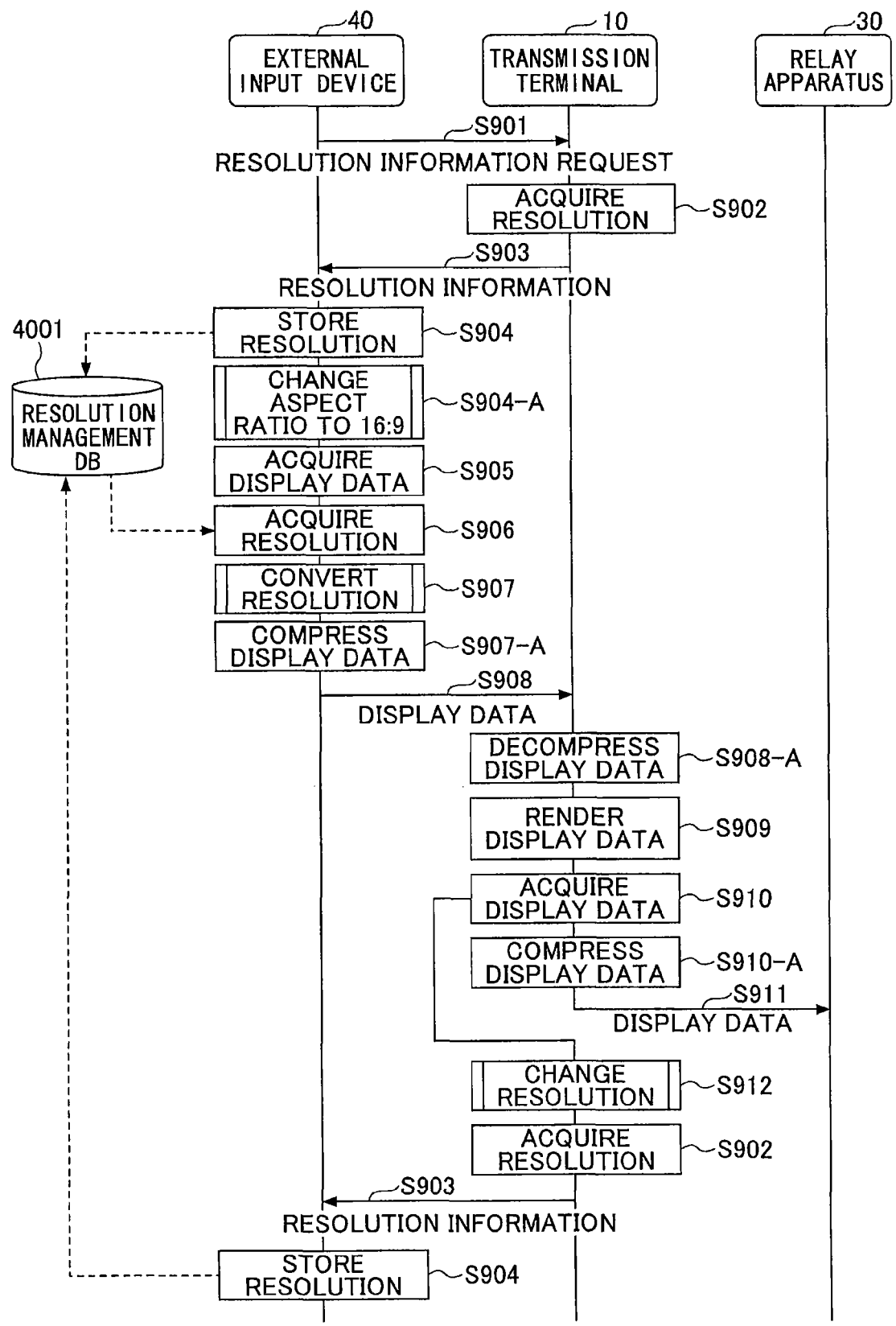
FIG. 29 is a sequence chart illustrating another example of processes of changing the resolution by the transmission terminal and of converting the resolution by the external input device, using a compression format, according to the present embodiment.

FIG. 24 is a sequence diagram illustrating an example of processes of changing a resolution by the transmission terminal 10 and of converting the resolution by the external input device 40, using a non-compression format. FIG. 25 is a flowchart illustrating an example of a procedure of acquiring display data in an entire region or a region by the display data acquisition unit 451. FIG. 26 is a flowchart illustrating an example of a procedure of converting the resolution. FIG. 27 is a flowchart illustrating an example of a procedure of controlling the resolution, including changing the resolution, by the transmission terminal 10. FIGS. 28A and 28B are diagrams illustrating an example of auxiliary information displayed in the screen, used in the supplemental explanation for a determination process at step S102 in FIG. 27. FIG. 29 is a sequence chart illustrating another example of processes of changing the resolution by the transmission terminal 10 and of converting the resolution by the external input device 40, using a compression format.

A process of converting a resolution of display data transmitted by the external input device 40 to the transmission terminal 10 based on the resolution of the display unit 120 of the transmission terminal 10 and the resolution of the display unit 216 if the external input device 40 will be explained with reference to the sequence diagram shown in FIG. 24. In the example shown in FIG. 24, the case of transmitting display data using a non-compression format is illustrated.

In FIG. 24, the transmission/reception unit 41 of the external input device 40 sends a request for resolution information of the display unit 120 to the transmission terminal 10 (step S901), and the resolution acquisition unit 21a acquires the resolution information indicating the resolution of the display unit 120 of the transmission terminal 10, stored in the resolution storage unit 1005 (step S902). When the resolution acquisition unit 21a acquires the resolution information, the external information transmission/reception unit 18 sends the acquired resolution information to the external input device 40 (step S903). In the external input device 40, when the transmission/reception unit 41 receives the resolution information of the display unit 120 of the transmission terminal 10, the storage/readout process unit 49 stores the received resolution information into the resolution management table of the resolution management DB 4001 (step S904).

Meanwhile, in the present example, at step S902 the resolution information of the display unit 120 of the transmission terminal 10 is acquired. The resolution information of the display unit 120 is preferably the resolution determined according to the mode specified by the user. The modes include, for example, a current mode, a HIGH mode (640 by 360), a MID mode (320 by 180) and a LOW mode (192 by 108). When the user perceives a delay in a transfer of the display data, the user can accelerate the transfer of the display data by converting the resolution of the mode arbitrarily. That is, in the case of the narrow bandwidth, by sending display data of lower resolution, not the resolution of the display unit 120, the delay in the transfer of the display data can be suppressed.

In the case where the setting of the "automatic size adjustment" is ON, when the user makes the region active on the display unit 216 of the external input device, the region size change unit 454 changes the aspect ratio of the active region to 16:9 (step S904-A). There are five methods of changing the aspect ratio of the region, which will be explained in series with reference to FIGS. 30 to 34 and FIGS. 35A to 39C. FIGS. 30 to 34 are flowcharts illustrating an example of procedures of the region size change unit 454 changing the aspect ratio of the region. FIGS. 35A to 39C are diagrams for schematically explaining an example of changing the region. Meanwhile, the aspect ratios in FIGS. 35A to 39C are not exact.

I. Change to 16:9 Based on the Horizontal Size (See FIGS. 30, 35A to 35C):

First, when the user clicks an arbitrary region with a mouse or the like, the operation input reception unit receives the click and makes the region active (step S9041a). Meanwhile, the size of the region may be changed when a sharing of display data starts (for example, when the sharing setting reception button 301 is held down), not triggered by the selection by the mouse.

The operation input reception unit 46 notifies the region size change unit 454 of the region which becomes active, and the region size change unit determines whether the setting of "automatic size adjustment" is ON or OFF (step S9042a).

When the setting of the "automatic size adjustment" is OFF (step S9042a: YES), the aspect ratio of the region is not adjusted and the process in FIG. 30 ends.

When the setting of the "automatic size adjustment" is not OFF (step S9042a: NO), the region size change unit 454 acquires the present aspect ratio (x, y) (step S9043a). The aspect ratio of the region can be acquired by specifying the region and inquiring of the OS or the like.

The region size change unit 454 determines whether a ratio x:y is 16:9 where x is the horizontal size and y is the vertical size (step S9044a)

In the case where the ratio x:y is 16:9 (step S9044a: YES), it is not necessary to change the aspect ratio of the region, and the process ends.

In the case where the ratio x:y is not 16:9 (step S9044a: NO), the region size change unit 454 changes the vertical size of the region to y' (step S9045).

The vertical size of the region y' is given by x×9/16. That is the vertical size is changed so that the aspect ratio of the region becomes 16:9 based on the horizontal size.

Figure 35A:
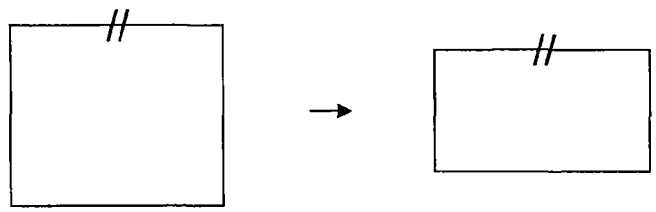
FIGS. 35A to 35C are diagrams for schematically explaining an example of changing the region while maintaining the horizontal size constant, according to the present embodiment.
Figure 35B:
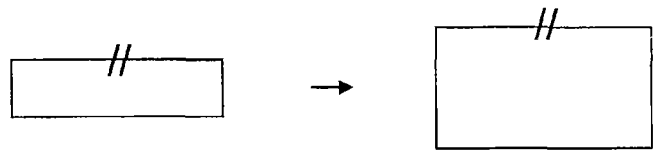
Figure 35C:
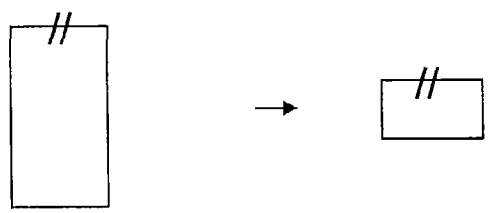

As shown in FIGS. 35A to 35C, the aspect ratio of the region is changed to 16:9 while maintaining the horizontal size constant. In FIG. 35A, an area decreases. In FIG. 35B, an area increases. In FIG. 35C, an area decreases.

An advantage of changing the aspect ratio of the region based on the horizontal size is that the aspect ratio of the region can be changed to 16:9 while maintaining the display data in an easily viewable state without changing the horizontal size, since the user often arranges a region a horizontal size of which is adjusted to the horizontal size of the display unit 216.

Figure 30:
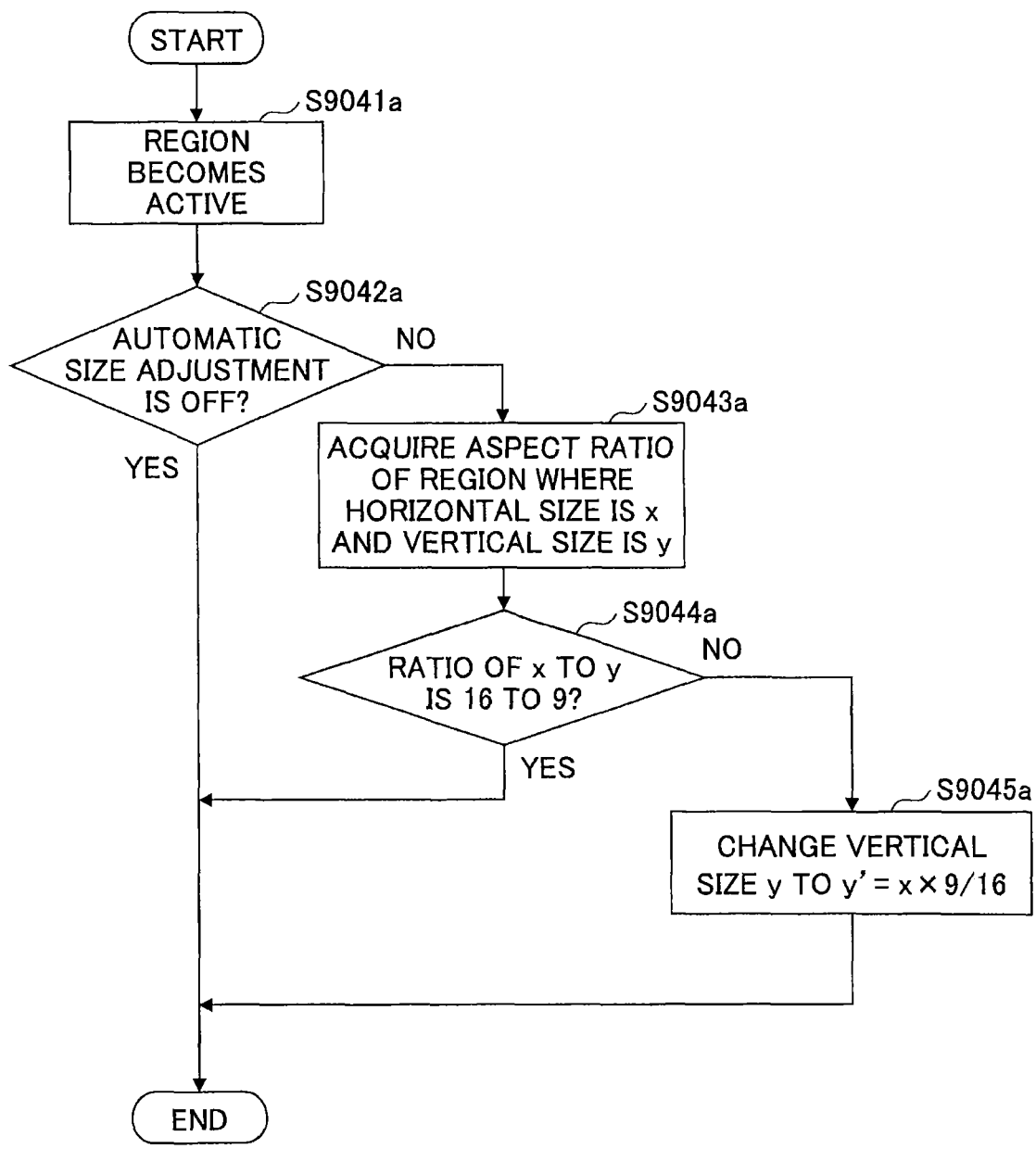
FIG. 30 is a flowchart illustrating an example of a procedure of a region size change unit changing a size while maintaining a horizontal size constant, according to the present embodiment.
Figure 31:
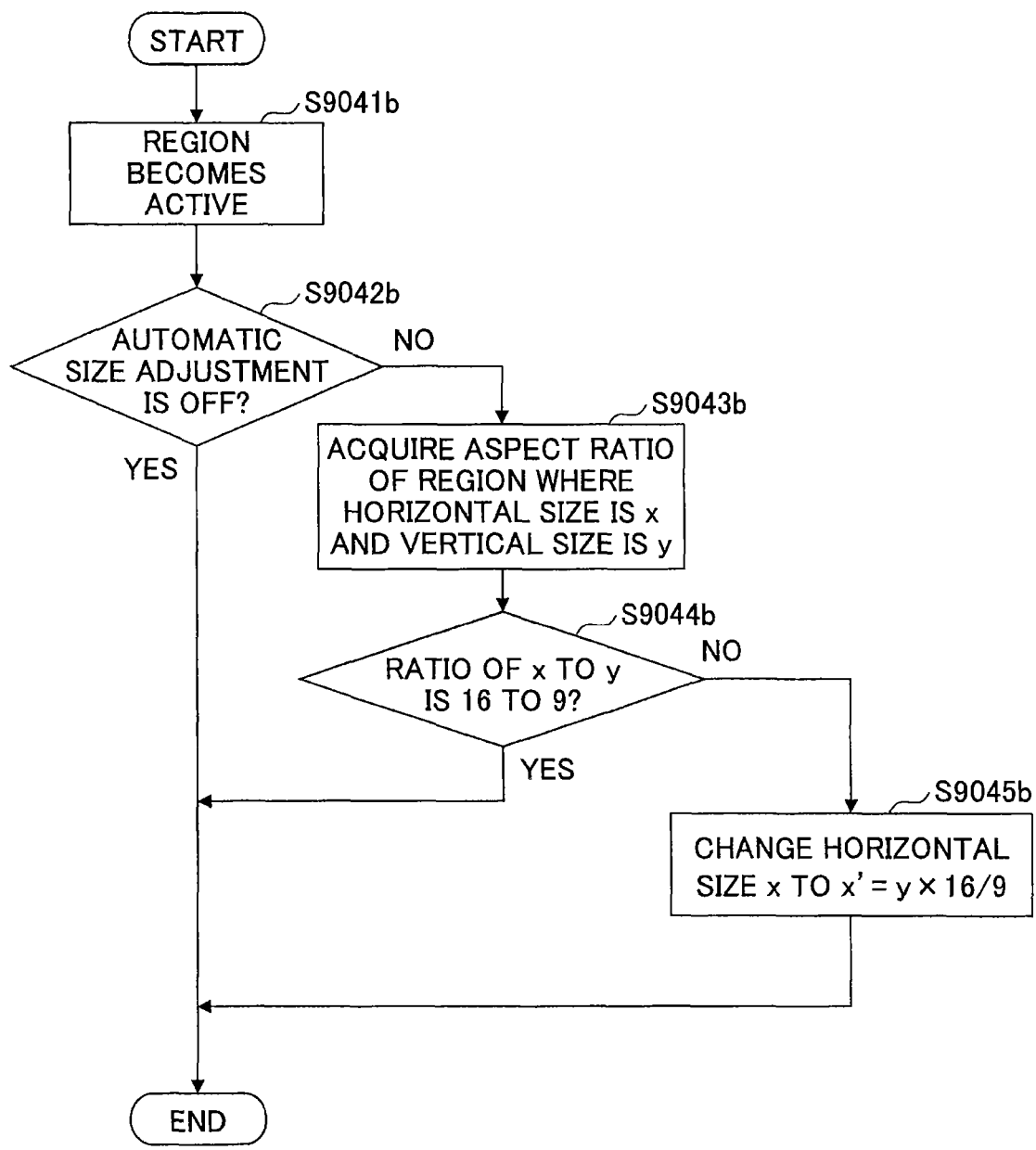
FIG. 31 is a flowchart illustrating an example of a procedure of the region size change unit changing the size while maintaining a vertical size constant, according to the present embodiment.

II. Change to 16:9 Based on the Vertical Size (See FIGS. 31, 36A to 36C):

In the process in FIG. 31, step S9045b is different from that of FIG. 30. That is, when the aspect ratio of the region x:y is not 16:9 (step S9044b: NO), the region size change unit 454 changes the horizontal size of the region to x' (step S9045b).

The horizontal size of the region x' is given by y×16/9. That is the horizontal size is changed so that the aspect ratio of the region becomes 16:9 based on the vertical size.

Figure 36A:
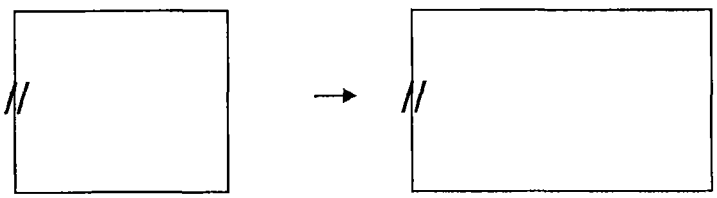
FIGS. 36A to 36C are diagrams for schematically explaining an example of changing the region while maintaining the vertical size constant, according to the present embodiment.
Figure 36B:
Figure 36C:
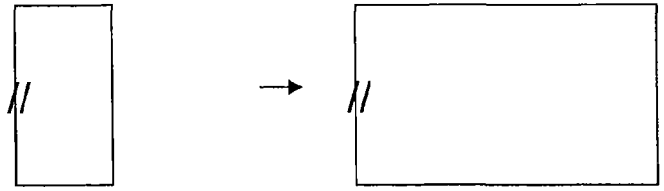

As shown in FIGS. 36A to 36C, the aspect ratio of the region is changed to 16:9 while maintaining the vertical size constant. In FIG. 36A, an area increases. In FIG. 36B, an area decreases. In FIG. 36C, an area increases.

An advantage of changing the aspect ratio of the region based on the vertical size is that the aspect ratio of the region can be changed to 16:9 while maintaining the display data in an easily viewable state without changing the vertical size, since the user often arranges a region a vertical size of which is adjusted to the vertical size of the display unit 216.

Figure 32:
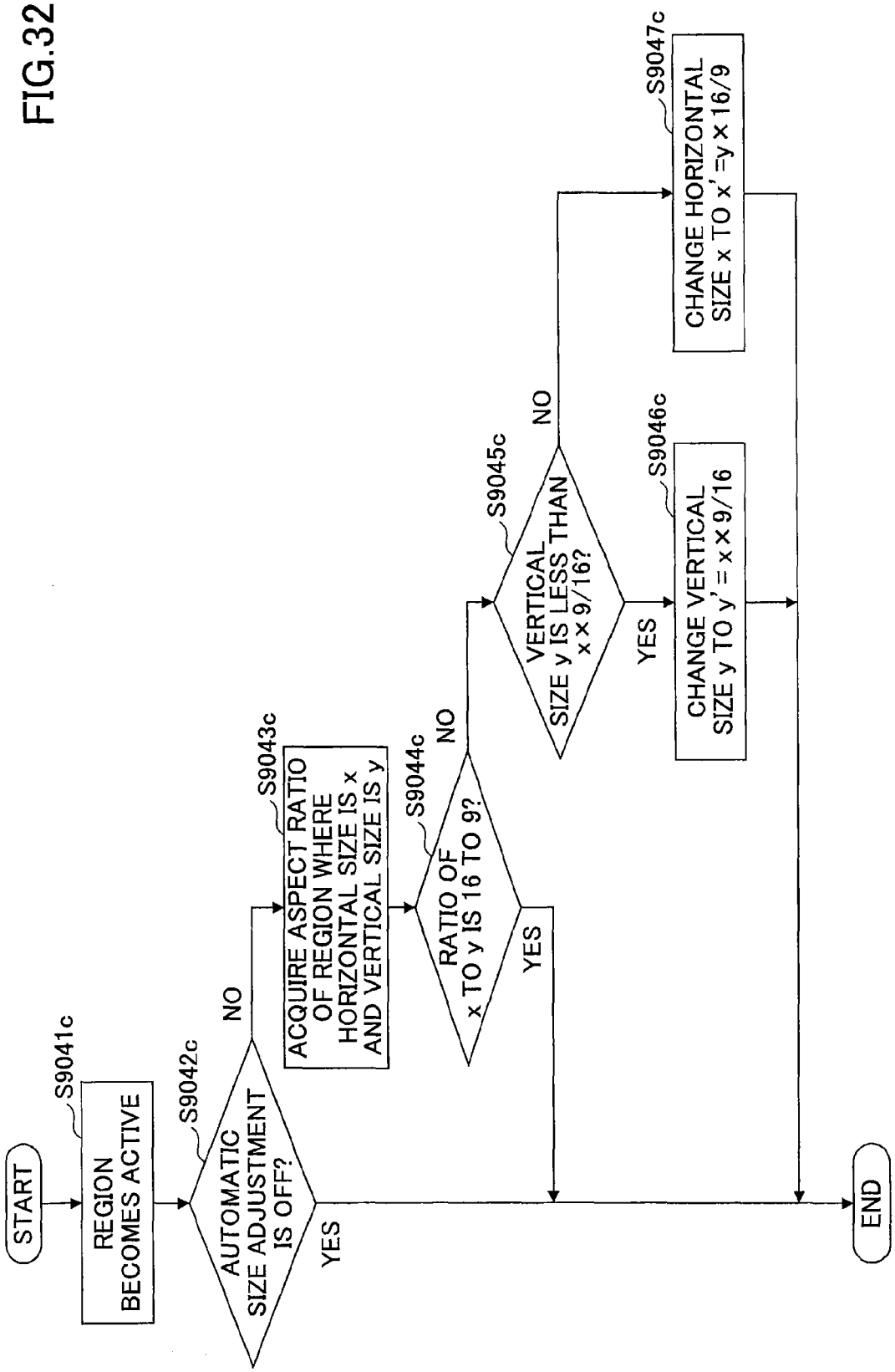
FIG. 32 is a flowchart illustrating an example of a procedure of the region size change unit selecting changing the horizontal size or the vertical size which makes an area larger and changing the size, according to the present embodiment.

III. Change to 16:9 Based on the Vertical Size or the Horizontal Size which Makes the Area Larger (See FIGS. 32, 37A to 37C):

In the process in FIG. 32, step S9045c and further are different from those of FIG. 30. That is, when the aspect ratio of the region x:y is not 16:9 (step 9044c: NO), the region size change unit 454 determines whether the vertical size y is less than x×9/16 (step S9045c). At this step, it is determined whether the vertical size y' when the ratio is changed to 16:9 based on the horizontal size is greater than the present vertical size y.

In the case where the present vertical size y is less than x×9/16 (step S9045c: YES), an area increases when the ratio is changed based on the horizontal size, and the region size change unit 454 changes the vertical size to y' (step S9046c).

The vertical size of the region y' is given by x×9/16.

In the case where the present vertical size y is greater than or equal to x×9/16 (step S9045c: NO), an area increases when the ratio is changed based on the vertical size, and the region size change unit 454 changes the horizontal size to x' (step S9047c).

The horizontal size of the region x' is given by y×16/9.

Figure 37A:
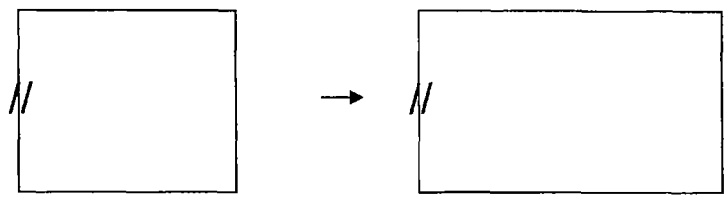
FIGS. 37A to 37C are diagrams for schematically explaining an example of changing the region in the case where the deformation maintaining the horizontal size constant or the deformation maintaining the vertical size constant which makes the area larger is selected, according to the present embodiment.
Figure 37B:
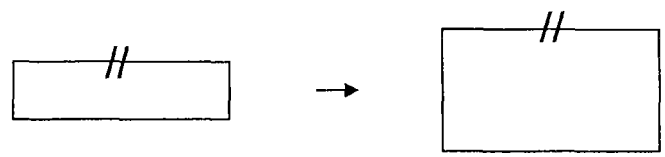
Figure 37C:
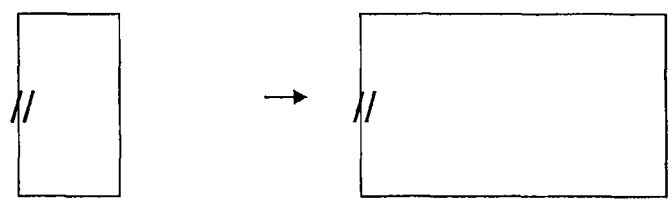

As shown in FIGS. 37A to 37C, the process in FIG. 32 inevitably increases the area of the region. In FIG. 37A, an area increases while maintaining the vertical size constant. In FIG. 37B, an area increases while maintaining the horizontal size constant. In FIG. 37C, an area increases while maintaining the vertical size constant.

In the vertical base or the horizontal base, according to the aspect ratio of the original region, an area may decrease by changing the size, and a part to be shown to the other party in the conference may become unrecognizable. When the aspect ratio is adjusted, by transforming so as to inevitably increase the area, the part to be shown can be certainly shown to the other party in the conference.

Figure 33:
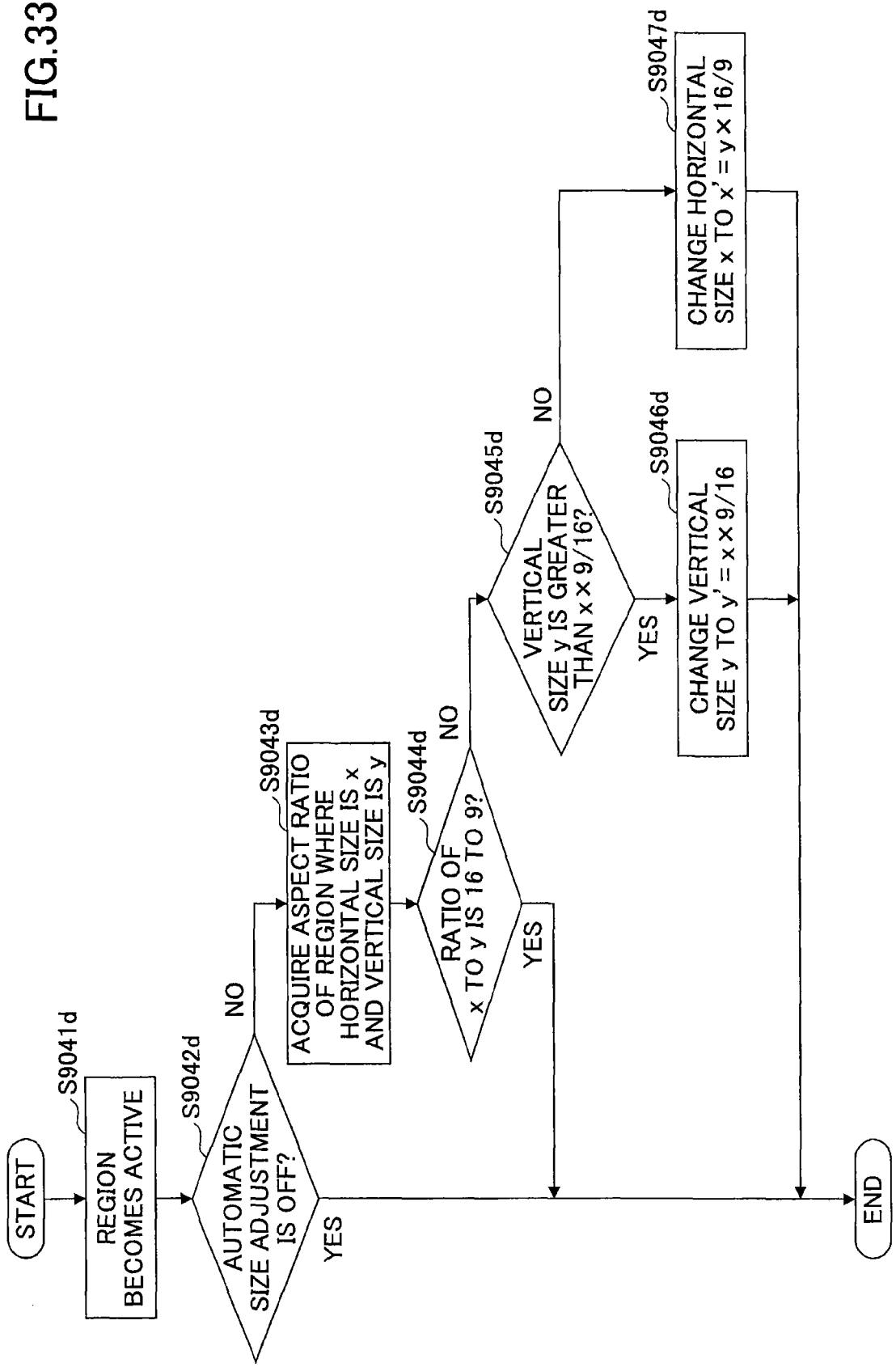
FIG. 33 is a flowchart illustrating an example of a procedure of the region size change unit selecting changing the horizontal size or the vertical size which makes the area smaller and changing the size, according to the present embodiment.

IV. Change to 16:9 Based on the Vertical Size or the Horizontal Size which Makes the Area Smaller (See FIGS. 33, 38A to 38C):

In the process in FIG. 33, step S9045d and further are different from those of FIG. 30. That is, when the aspect ratio of the region x:y is not 16:9 (step S9044d: NO), the region size change unit 454 determines whether the vertical size y is greater than x×9/16 (step S9045d). At this step, it is determined whether the vertical size y' when the ratio is changed to 16:9 based on the horizontal size is less than the present vertical size y.

In the case where the present vertical size y is greater than x×9/16 (step S9045d: YES), an area decreases when the ratio is changed based on the horizontal size, and the region size change unit 454 changes the vertical size to y' (step S9046d).

The vertical size of the region y' is given by x×9/16.

In the case where the present vertical size y is less than or equal to x×9/16 (step S9045d: NO), an area decreases when the ratio is changed based on the vertical size, and the region size change unit 454 changes the horizontal size to x' (step 39047d).

The vertical size of the region x' is given by y×16/9.

Figure 38A:
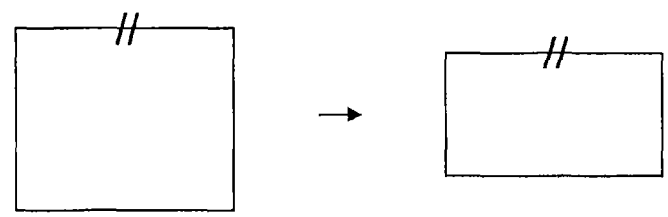
FIGS. 38A to 38C are diagrams for schematically explaining an example of changing the region in the case where the deformation maintaining the horizontal size constant or the deformation maintaining the vertical size constant which makes the area smaller is selected, according to the present embodiment.
Figure 38B:
Figure 38C:
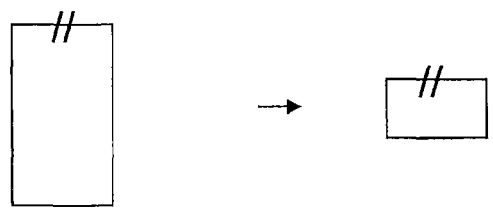

As shown in FIGS. 38A to 38C, the process in FIG. 33 inevitably decreases the area of the region. In FIG. 38A, an area decreases while maintaining the horizontal size constant. In FIG. 38B, an area decreases while maintaining the vertical size constant. In FIG. 38C, an area decreases while maintaining the horizontal size constant.

Even when the area of the region is reduced, an enlarged image of the region is shown to the other party of the conference, and in the case where the region includes small characters or a fine image, the region can be shown to the other party of the conference maximally in an easily viewable state by reducing the area of the region while adjusting the aspect ratio. Moreover, the size of the region can be prevented from going beyond the display size as a result of the adjustment.

Figure 34:
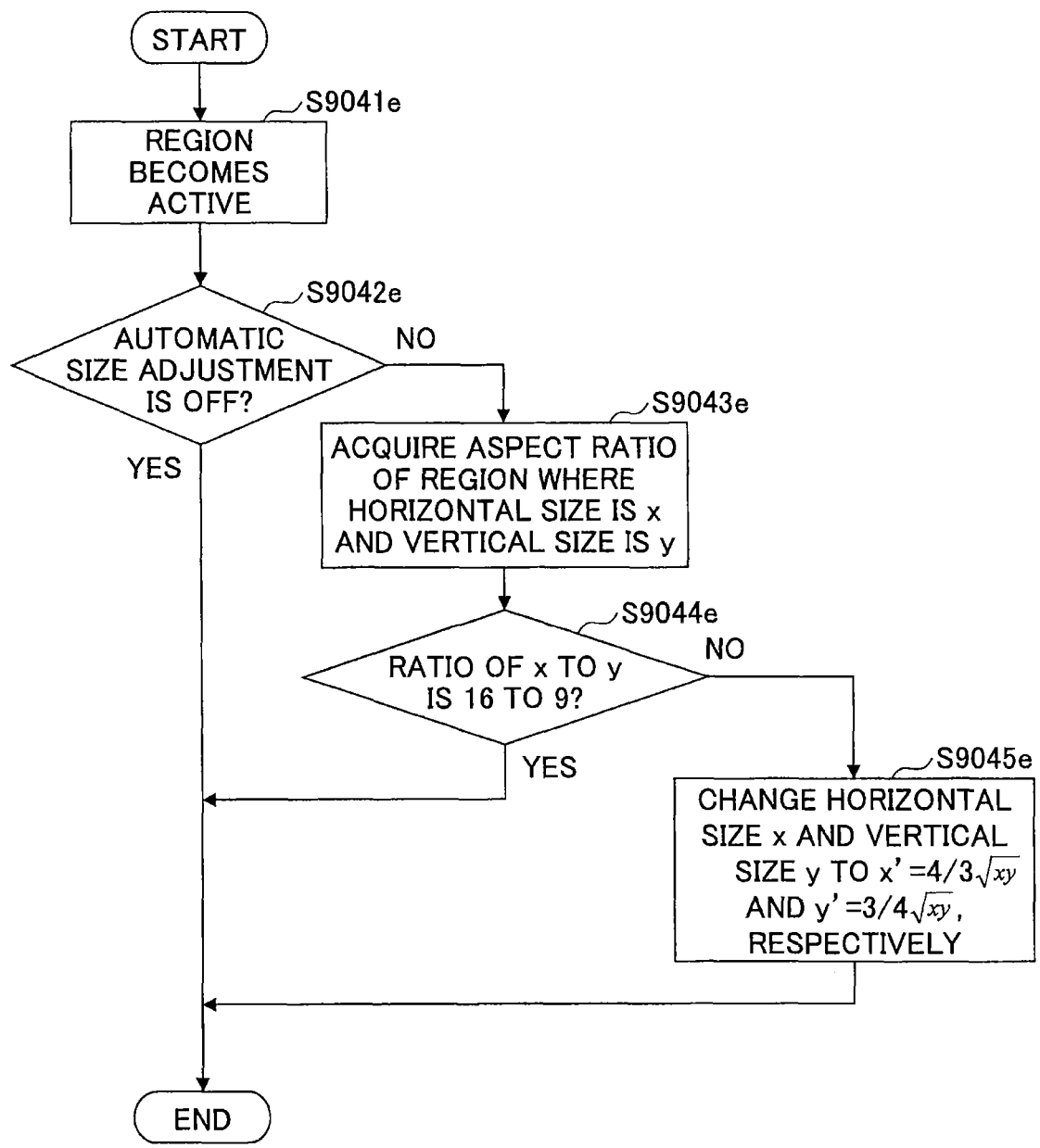
FIG. 34 is a flowchart illustrating an example of a procedure of the region size change unit changing the size while maintaining the area of the region constant, according to the present embodiment.

V. Change to 16:9 while Maintaining the Area of the Region Constant (See FIGS. 34, 39A to 39C):

In the process in FIG. 34, step S9045e is different from that of FIG. 30. That is, when the aspect ratio of the region x:y is not 16:9 (step S9044e: NO), the region size change unit 454 changes the horizontal size and the vertical size of the region to x' and y', respectively (step S9045e).

The horizontal size of the region x' is given by $(4/3)\sqrt{(x \times y)}$, and the vertical size of the region y' is given by $(3/4)\sqrt{(x \times y)}$. Accordingly, the aspect ratio can be changed to 16:9 while maintaining the area constant.

Figure 39A:
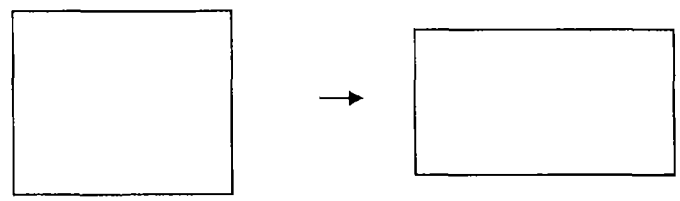
FIGS. 39A to 39C are diagrams for schematically explaining an example of changing the size of the region while maintaining the area constant, according to the present embodiment.
Figure 39B:
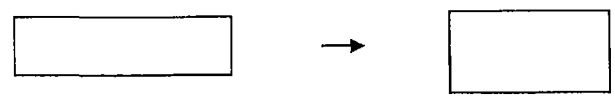
Figure 39C:
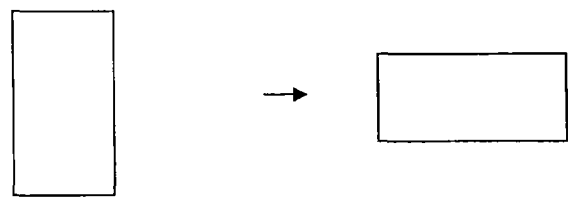

As shown in FIGS. 39A to 39C, the horizontal size and the vertical size are changed while maintaining the area constant. In FIGS. 39A and 39B, the region is transformed while maintaining horizontally long shapes. In FIG. 39C, the region is transformed from a vertically long shape to a horizontally long shape.

In the methods of I to IV, the region may become significantly larger or smaller and the user may be confused. On the other hand, by adjusting the aspect ratio while maintaining the area constant, the region can be transformed without changing a visual impression, and the user can easily follow a change in shape.

Next, the process returns to FIG. 24. The display data acquisition unit 451 of the external input device 40 acquires display data representing an image displayed on the display unit 216 by the display control unit 47 (step S905).

Here, the process of the display data acquisition unit 451 acquiring the display data will be explained in detail with reference to FIG. 25. The user "aa" is assumed to have already clicked the sharing setting reception button 301 shown in FIGS. 21 to 23.

The operation input reception unit 46 determines whether a selection of an entire region has been accepted (step S9051). In order to select the entire region, the user "aa" clicks a part on the desktop screen other than the region using a pointing device. The OS detects a position where the user clicks. In the present example, the OS operating in the external input device 40 treats not only the region but also the entire region as a region, and the click outside the region is the operation of selecting the entire region. That is, an entirety of the desktop screen is treated as a region (the entire region and the region are treated separately). In the OS, an API (application Program Interface) that facilitates a specification of an entire region indicating the whole screen (desktop screen) is defined. Accordingly, in the case of the user selecting this entire region using the pointing device, the operation input reception unit 46 detects the selection of the entire region via the API, and the entire region can be shared as the display data. There is an effect that the user can switch intuitively. Meanwhile, depending on the OS, the region may be called an object (object to be processed), and a position, an attribute value whether it is an object to be operated or the like is managed.

In the case of receiving the selection of the entire region (step S9051: YES), the display data acquisition unit 451 acquires an entirety of the desktop screen displayed on the display unit 216 as display data, and the process ends (step S9052).

In the case of not receiving the selection of the entire region (step S9051: NO), the display data acquisition unit 451 determines whether there is an active region (step S9053). For this determination, for example, the function of the OS may be used. For example, in the case of using Windows (trademark registered) API, a handle of an active region is acquired, and if the value of the handle is not NULL, the API determines that an active region exists. The active region is a region, which is an object of input or operation by the user. The object is denoted "active window" in Windows (registered trademark) and in Mac OS or the like.

If there is no active region by the user closing the active window or the like (step S9053: NO), the process proceeds to step S9052, and the whole desktop screen is acquired as display data.

If there is an active window (step S9053: YES), the display data acquisition unit 451 acquires, out of the display data displayed on the display unit 216 by the display control unit, the display data in the active region (step S9054). Since this region is specified by the handle of the active region acquired at step S9053, the display data acquisition unit 451 can refer to the display data in the region to be acquired.

Next, the display data acquisition unit 451 determines whether a width or a height of the acquired region is less than the threshold (S9055). In the present example, the threshold for the width is 128 pixels and the threshold for the height is 36 pixels. The purpose of the above determination is to exclude small active regions from processed objects, since display data in a small region may not have meaningful content, and a process load of an enlargement process of a small region in the resolution conversion, which will be explained later, may incidentally increase. Moreover, even if the small region is enlarged by converting the resolution, since the enlargement factor may be too great, the user "db" may not be able to make out the content. By defining the lower limit of size of the region to be enlarged, a load by the CPU in rendering the display data by the transmission terminal 10*aa* can be reduced.

When either the width or the height of the region is less than the threshold (step S9055: YES), the display data acquisition unit 451 adds black pixels to the region of the present display data until the region equals the size having the width and the height of the threshold, e.g. 128 pixels by 36 pixels (step S9056). The black pixels are inserted as follows. The region having the width and the height of the threshold is prepared. The present region is arranged so that the upper-left corner of the present region coincides with the upper-left corner of the region of the threshold. The black pixels are inserted in the region outside the present region but inside the threshold region. The present region may be arranged so that the upper right corner, the lower left corner or the lower right corner coincides with the upper right corner, the lower left corner or the lower right corner of the threshold region, respectively. The present region may be arranged so that the center of the present region coincides with the center of the threshold region. A color of the added pixel is not limited to black. Pixels of a color, other than black, may be inserted.

The process returns to FIG. 24, and the resolution acquisition unit acquires resolution information of the display unit 216 (step S906). The resolution conversion unit 453 converts the resolution of the display data to be transmitted to the transmission terminal 10 based on the resolution indicated by the resolution information of the display unit 120 of the transmission terminal 10, which is stored in the resolution management DB 4001 and the resolution indicated by the resolution information of the display unit 216 of the external input device 40, which has been acquired at step S906 (step S907).

The process of "conversion of resolution", performed by the resolution conversion unit 453 at step S907 will be explained in detail with reference to FIG. 26, as follows.

First, the region size change unit 454 determines whether the entire region is selected or an active region is selected at step S905 (step S9070). In the case where the active region is selected (step S9070: NO), the process proceeds to step S9076.

In the case where the entire region is selected (step S9070: YES), the resolution conversion unit converts a resolution of the display data as follows. For the purpose of illustration, out of the resolution information of the display unit 216 of the external input device 40 acquired at step S906, the resolution in the vertical direction (height direction, H) is denoted "H40" and the resolution in the horizontal direction (width direction, W) is denoted "W40". Similarly, out of the resolution information of the display unit 120 of the transmission terminal 10, stored in the resolution management DB 4001, the resolution in the vertical direction is denoted "H10" and the resolution in the horizontal direction is denoted "W10". The resolution conversion unit 453, based on these resolutions H40, W40, H10 and W10, converts the resolution of the display data in the vertical direction to "H'" and the resolution of the display data in the horizontal direction to "W'".

With reference to FIG. 26, the resolution conversion unit 453 determines whether H40 is less than or equal to H10 and W40 is less than or equal to W10 (step S9071). When it is determined that H40 is less than or equal to H10 and W40 is less than or equal to W10 (step S9071: YES), the resolution conversion unit 453 converts the resolution of the display data in the vertical direction H' to H40, and the resolution of the display data in the horizontal direction W' to W40, and does not convert the resolutions (step S9072).

On the other hand, when it is determined that H40 is not less than or equal to H10 or W40 is not less than or equal to W10 (Step S9071: NO), the resolution conversion unit 453 determines whether W40 is larger than W10 and H40 is less than or equal to H10, or W40 is larger than W10, or H40 is larger than H10 and H10 is larger than or equal to W10 (step S9073).

When it is determined that W40 is larger than W10 and H40 is less than or equal to H10, or W40 is larger than W10 and H40 is larger than H10 and H10 is larger than or equal to W10 (step S9073: YES), the resolution conversion unit 453 converts the resolution of the display data in the horizontal direction W' to W10, and converts the resolution of the display data in the vertical direction H' to H40×(W10/W40) (step S9074). In the above conversion, the ratio W10/W40 represents a compression ratio in the width (W) direction.

On the other hand, when it is not determined that W40 is larger than W10 and H40 is less than or equal to H10, or W40 is larger than W10 and H40 is larger than H10 and H10 is larger than or equal to W10 (step S9073: NO), the resolution conversion unit 453 converts the resolution of the display data in the vertical direction H' to H10, and converts the resolution of the display data in the horizontal direction W' to W40× (H10/H40) (step S9075). In the above conversion, the ratio H10/H40 represents a compression ratio in the height (H) direction.

In the case where it is not determined that W40 is larger than W10 or H40 is larger than H10 and H10 is larger than or equal to W10 at step S9073, for example, the resolution of the display unit 216 of the external input device 40 in the vertical direction is larger than the resolution of the display unit 120 of the transmission terminal 10 in the vertical direction and the resolution of the display unit 216 of the external input device 40 in the horizontal direction is less than or equal to the resolution of the display unit 120 of the transmission terminal 10 in the horizontal direction, i.e., H40 is larger than H10 and W40 is less than or equal to W10. Or the resolutions of the display unit 216 of the external input device 40 in the horizontal direction and in the vertical direction are larger than the resolutions of the display unit 120 of the transmission terminal 10 in the horizontal direction and in the vertical direction, respectively, and the resolution of the display unit 120 of the transmission terminal 10 in the vertical direction is less than the resolution thereof in the horizontal direction, i.e. W40 is larger than W10, H40 is larger than H10 and H10 is less than W10.

That is, at step S907, when the resolution of the display unit 216 of the external input device 40 in the vertical direction is less than the resolution of the display unit 120 of the transmission terminal 10 in the vertical direction, the resolution conversion unit 453 converts the resolution of the display data in the vertical direction H' to the resolution of the display unit 120 of the transmission terminal 10 in the vertical direction H10. Moreover, the resolution conversion unit 453 converts the resolution of the display data in the horizontal direction so that the horizontal to vertical ratio of the display data is the same as the horizontal to vertical ratio of the display unit 120 of the transmission terminal 10, i.e. W' is set to W40×(H10/H40).

Moreover, when the resolution of the display unit 120 of the transmission terminal 10 in the horizontal direction is less than the resolution of the display unit 216 of the external input device 40 in the horizontal direction, the resolution conversion unit 453 converts the resolution of the display data in the horizontal direction W' to the resolution of the display unit 120 of the transmission terminal 10 in the horizontal direction W10. Furthermore, the resolution conversion unit 453 converts the resolution of the display data in the vertical direction so that the horizontal to vertical ratio of the display data is the same as the horizontal to vertical ratio of the display unit 120 of the transmission terminal 10, i.e. H' is set to H40×(W10/W40).

Next, the region size change unit 454 determines whether an aspect ratio of the display data has already become 16:9 (step S9076).

When the aspect ratio of the display data is 16:9 (step S9076: YES), the process of the region size change unit 454 proceeds to the next step.

When the aspect ratio of the display data is not 16:9 (step S9076: NO), the region size change unit 454 adds a margin above and below, or left and right so that the aspect ratio of the display data becomes 16:9 (step S9077).

When the vertical size y is greater than the horizontal size x times 9/16, i.e. y>x×(9/16), the corrected horizontal size x' is set to (16/9)×y. Accordingly, a width of the margin to be added is a difference between the x' and x, i.e. (x'−x). For example, margins having a width of a half of (x'−x) are appended to regions on the left and right sides, respectively.

When the vertical size y is less than the horizontal size x times 9/16, i.e. y<x×(9/16), the corrected vertical size y' is set to (9/16)×x. Accordingly, a width of the margin to be added is a difference between the y' and y, i.e. (y'−y). For example, margins having a width of a half of (y'−y) are appended to region above and below, respectively.

Meanwhile, the margins are, for example, rectangular black regions. The margins may be white or blue. Furthermore, the whole of the rectangular region may not be of uniform density, and may have a gradation or may be patterned.

The process returns to FIG. 24. When the resolution conversion unit 453 converts the resolution of the display data, the display data transmission unit 452 sends the converted display data to the transmission terminal 10 (step S908).

The external information transmission/reception unit 18 of the transmission terminal 10 receives the display data sent from the display data transmission unit 452 (step S908), and the image display control unit 14*b* renders the received display data and displays the rendered data on the display unit 120 (step S909). The display image acquisition unit 14*c* acquires data, which represents the image displayed on the display unit 120 by the image display control unit 14*b* at step S909 (step S910). The transmission/reception unit 11 sends the data acquired by the display image acquisition unit 14*c* to the relay apparatus 30 (step S911).

Moreover, when the operation input reception unit 12 receives the resolution information, the resolution change unit 21*d* changes the resolution of the display unit 120 of the transmission terminal 10 (step S912). The "change of the resolution" is performed in a process of "change of resolution" at steps S105, S109, S117 and S122 in the process flow of FIG. 27, which will be described later.

When the resolution is changed, the resolution acquisition unit 21*a* acquires resolution information indicating the changed resolution (step S902), the external information transmission/reception unit 18 sends the resolution information to the external input device 40 (step S903). Further processes are the same as the above processes after step S904, and duplicate explanation is omitted.

Next, the process of controlling the resolution, including changing the resolution, by the transmission terminal 10 will be explained with reference to the flowchart illustrated in FIG. 27.

In FIG. 27, when the power in the transmission terminal 10 is turned ON, the process starts and the resolution acquisition unit 21*a*, shown in FIG. 4, accesses the display unit 120, to acquire allowed resolutions, with which data are displayed (step S101).

Next, the resolution determination unit 21*b* determines whether the allowed resolutions include the resolution other than the standard aspect ratios (for example, 16 (width) to 9 (height) and the resolutions are 1200 (width) by 720 (height)), which is used for transmitting image data between the transmission terminal 10 and the relay apparatus 30 (step S102). The above determination is performed for the purpose whereas a resolution other than the standard aspect ratios is selected, if possible, and a segment region, in which auxiliary information is displayed, is appended. FIG. 28A is a diagram illustrating an example of the screen, in which the segment region is appended. In FIG. 28A, a segment region SR is appended at the lower end of the screen. In the segment region SR, auxiliary information AX (error message and an operational button) is displayed. On the other hand, FIG. 28B is a diagram illustrating an example of the screen, in which the segment region is not appended. In FIG. 28B, the error message is displayed overlapping the lower end of the screen.

In the case where the resolution other than the standard aspect ratios is included in the allowed resolutions (step S102: YES), the resolution selection unit 21*c* selects a resolution according to a predetermined criterion from the resolutions other than the standard aspect ratios (step S103). The predetermined criterion is, for example, preferentially selecting the largest resolution, i.e. a product of the horizontal resolution and the vertical resolution is the largest, preferentially selecting the resolution having a specified aspect ratio, e.g. 8 to 5, selecting the resolution suitable for a character size or the number of characters of the auxiliary information, selecting the resolution defined by the user, e.g. WXGA (1280 by 800) or XGA (1024 by 768), or the like.

Next, an image processing unit (not shown), one of the functions of the image display control unit 14*b*, expands or contracts image data, generated internally with the standard aspect ratio, to the selected resolution, and appends a segment region (step S104). Specifically, the image process unit performs the following processes. The image before conversion is extended by proportional symmetry (with the same expansion or contraction ratio for the width direction and for the height direction) so that the width of the image coincides with the width of the screen. If the resolution before the conversion is the same as the resolution after the conversion, the expansion or contraction is not performed, i.e. the expansion factor or the contraction factor is one. Next, a height of the image after the expansion or contraction is obtained. A segment region is appended to the expanded or contracted image, so that a height of the converted image coincides with the height of the screen. In FIG. 28A, the segment region SR is appended at the lower end of the screen. The segment region may be appended at the upper end of the screen. Moreover, two segment regions having the same height may be appended at the upper and lower ends of the screen.

Next, the resolution change unit 21d changes the resolution of the display unit 120 to the selected resolution (step S105). According to the process, the screen in the display unit 120 is displayed with the changed resolution.

Next, a flag configuration unit (not shown), one of the functions of the image display control unit 14b, configures a flag "overlap" to "false" (step S106). The flag "overlap" is referred to when the image display control unit 14b detects an error or the like, and controls a display of auxiliary information other than the image data, which is displayed at present. The value of "overlap" becomes "true", when the auxiliary information is displayed overlapping the displayed image, as shown in FIG. 28B. When the auxiliary information does not overlap the displayed image, the value of "overlap" is "false".

On the other hand, in the case where the allowed resolutions do not include the resolution other than the standard aspect ratios (step S102: NO), the resolution selection unit 21c selects a resolution according to the predetermined criterion from the standard aspect ratios (step S107). The predetermined criterion is the same as the one, explained for step S103.

Next, the image processing unit (not shown), one of the functions of the image display control unit 14b, expands or contracts image data, generated internally with the standard aspect ratio, to the selected resolution (step S108). In this case, since the image is expanded or contracted with the same aspect ratio as that of the screen, a blank region does not occur in any of the width direction and the height direction. Accordingly, a segment region is not appended to the display image (see the example of display of the image in FIG. 28B).

Next, the resolution change unit 21d changes the resolution of the display unit 120 to the selected resolution (step S109). According to the process, the screen in the display unit 120 is displayed with the changed resolution. Next, the flag configuration unit (not shown), one of the functions of the image display control unit 14b, configures the flag "overlap" to "true" (step S110).

The processes as explained above are initial processes at the time when the power of the transmission terminal 10 is turned ON. In the following, a process in response to an exchange of the display unit 120 after the power is turned ON will be described.

The resolution acquisition unit 21a accesses the display unit 120 and acquires the resolution, with which an image is displayed on the display unit 120 at present (step S111). Next, the resolution acquisition unit 21a accesses the display unit 120, to acquire allowed resolutions, with which data are displayed (step S112).

Next, the resolution determination unit 21b determines whether the allowed resolutions include the resolution other than the standard aspect ratios (for example, 16 (width) to 9 (height)), which is used for transmitting image data between the transmission terminal 10 and the relay apparatus 30 (step S113). In the case where the resolution other than the standard aspect ratios is included in the allowed resolutions (step S113: YES), the resolution selection unit 21c selects a resolution according to the predetermined criterion from the resolutions other than the standard aspect ratios (step S114). The predetermined criterion is the same as the one explained for step S103.

Next, the resolution determination unit 21b determines whether the resolution, with which an image is displayed on the display unit 120 at present, is different from the selected resolution (step S115). If the resolution, with which the image is displayed at preset, is different from the selected resolution (step S115: YES), the image process unit (not shown), one of the functions of the image display control unit 14b, expands or contracts image data, generated internally with the standard aspect ratio, to the selected resolution, and appends a segment region (step S116).

Next, the resolution change unit 21d changes the resolution of the display unit 120 to the selected resolution (step S117). According to the process, the screen in the display unit 120 is displayed with the changed resolution. Next, the flag configuration unit (not shown), one of the functions of the image display control unit 14b, configures a flag "overlap" to "false" (step S118). On the other hand, when the resolution, with which the image is displayed at present, is the same as the selected resolution step S115: NO), the processes at steps S116 to S118 are not performed, since change in the resolution is not required.

On the other hand, in the case where the allowed resolutions do not include the resolution other than the standard aspect ratios (step S113: NO), the resolution selection unit 21c selects a resolution according to the predetermined criterion from the standard aspect ratios (step S119). The predetermined criterion is the same as the one, explained for step S103.

Next, the resolution determination unit 21b determines whether the resolution, with which an image is displayed on the display unit 120 at present, is different from the selected resolution (step S120). If the resolution, with which the image is displayed at preset, is different from the selected resolution (step S120: YES), the image process unit (not shown), one of the functions of the image display control unit 14b, expands or contracts image data, generated internally with the standard aspect ratio, to the selected resolution (step S121).

Next, the resolution change unit 21d changes the resolution of the display unit 120 to the selected resolution (step S122). According to the process, the screen in the display unit 120 is displayed with the changed resolution. Next, the flag configuration unit (not shown), one of the functions of the image display control unit 14b, configures a flag "overlap" to "true" (step S123). On the other hand, when the resolution, with which the image is displayed at present, is the same as the selected resolution (step S120: NO), the processes at steps S121 to S123 are not performed, since change in the resolution is not required.

The above processes are iterated during when the application program is executed. Accordingly, even when the display unit 120 is replaced by another display unit, which has a different resolution, the process in FIG. 27 continues. The above iteration process corresponds to a process of monitoring a change in the resolution of the display unit 120 periodically. Moreover, an event mechanism, known as a program in Windows (registered trademark), may be introduced, to perform the process. In this case, an event schedule may be registered in the event mechanism, so that when the resolution changes by connecting the other display unit 120, an event notification is issued, at the time of starting the program. After the program starts, the processes from step S111 are performed in the image display control unit 14b, each time the event notification is issued.

Figure 40A:
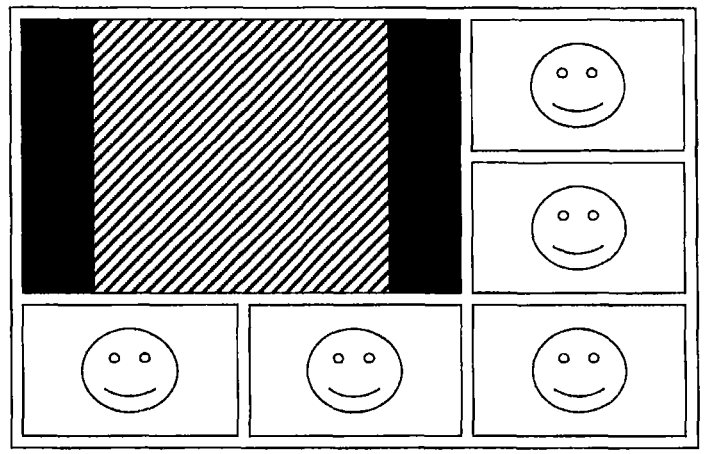
FIGS. 40A to 40C are diagrams illustrating an example of display data displayed on the display unit 120 connected to the transmission terminal 10aa, according to the present embodiment.
Figure 40B:
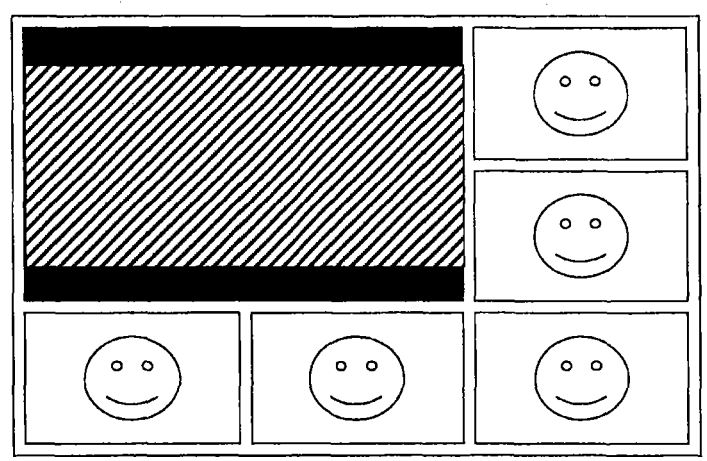
Figure 40C:
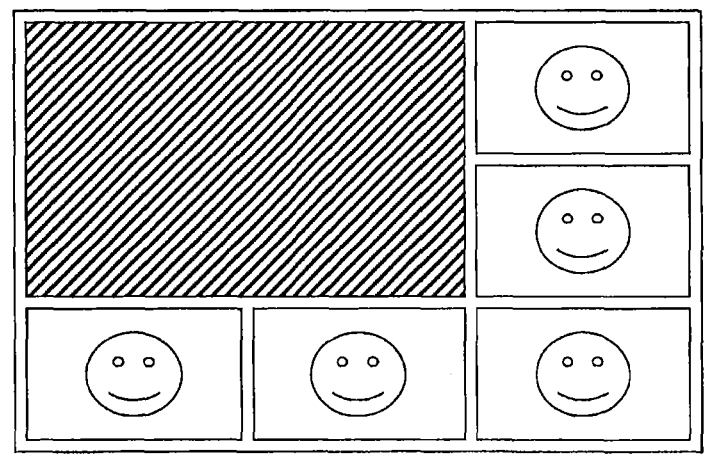

FIGS. 40A to 40C are diagrams illustrating an example of display data displayed on the display unit 120 connected to the transmission terminal 10aa. FIGS. 40A and 40B are examples of display data in the case where an aspect ratio of an active region is not adjusted to 16:9 automatically or by a user. Since the aspect ratio of the active region is not 16:9, in FIG. 40A margins are appended on the left and right sides and in FIG. 40B margins are appended above and below. In FIGS. 40A and 40B, a space is wasted for the margins (black frame), and a display region for display data becomes narrow.

FIG. 40C is an example of display data in the case where an aspect ratio of an active region is adjusted to 16:9 automatically. Since the aspect ratio of the region is adjusted to 16:9, margins are not appended and an information amount shared by the transmission terminal 10 can be maximized.

Variation of Example

In the embodiment, shown in FIG. 24, an example of transmission of display data, sent from the external input device to the transmission terminal 10 and sent from the transmission terminal 10 to the relay apparatus 30, in a bitmap format (uncompressed format) have been described. The present invention is not limited to this. For example, the display data may be transmitted in a compressed format, such as the JPEG (Joint Photographic Experts Group), GIF (Graphics Interchange Format) or the like.

In the following, with reference to FIG. 29, an example of the process of transmission of display data in the compressed format will be described. In the sequence chart shown in FIG. 29, a process of compressing display data and a process of decompressing the compressed data (steps S907-A, S908-A and S910-A) are added to the sequence chart shown in FIG. 24. The processes other than the steps S907-A, S908-A and S910-A are the same as in the FIG. 25, and an explanation is omitted.

In FIG. 29, the resolution conversion unit 453 of the external input device 40 performs the resolution conversion for the display data (step S907), and for the display data, the resolution of which is converted, a predetermined compression (encoding) process is performed (step S907-A). In the present embodiment, the display data acquisition unit 451 performs the compression process.

On the other hand, in the transmission terminal 10, the external information transmission/reception unit 18 receives the compressed display data after the resolution conversion, sent from the external input device 40 (step S908). The received compressed display data are decompressed (decoded) (step S908-A). In the present embodiment, the display image acquisition unit 14c decompresses the compressed display data.

Next, the image display control unit 14b renders the decompressed (decoded) display data, and displays the rendered data on the display unit 120 (step S909). The display image acquisition unit 14c acquires the display data displayed on the display unit 120 (step S910). The acquired display data (uncompressed data) are classified into two groups. The display image acquisition unit 14c performs the predetermined process of compression (encoding) for display data of one of the groups (step S910-A). The transmission/reception unit 11 sends the compressed display data, acquired by the display image acquisition unit 14c to the relay apparatus 30 via the communication network 2 (step S911).

The compressed display data are further received by the other transmission terminal 10, shown in FIG. 1, via the relay apparatus 30. In the transmission terminal 10, which receives the compressed display data, the image display control unit 14b performs the predetermined decompression (decoding) process for the received compressed display data, renders the decompressed display data, and displays the rendered data on the display unit 120. According to the above processes, the transmission terminal receiving the display data 10 shares the screen image data with the transmission terminal 10 of the transmission source. That is, by sending the display data in the external input device 40 to the transmission terminal 10 of the user and to the transmission terminal 10 of the other party, the display data can be shared between the transmission terminals 10 in respective regions.

On the other hand, the process of changing resolution is performed at step S912 for the display data of the other group of the two divided groups of the display data (uncompressed data) acquired by the display data acquisition unit 14c at step S910. Further processes after step S912 are the same as in the FIG. 27, and an explanation is omitted.

As described above, by converting the display data, the resolution of which is changed at the external input device 40, into a compressed format and sending the compressed displayed data, from the transmission terminal 10 to the other transmission terminal via the relay apparatus 30, the transmission capacity can be reduced compared with the transmission using the uncompressed format, such as Bitmap format, shown in FIG. 24. Accordingly, the communication load can be suppressed.

As explained above, in the transmission system according to the present embodiment, an image in the entire screen, if the entire region is selected by a mouse, and an image in the active region, if the entire region is not selected, can be shared with the transmission terminal used by the other party participating in the video conference. Accordingly, a whole screen or a partial region can be arbitrarily selected and shared.

Meanwhile, the present example does not limit the scope of the present invention, and it goes without saying that there are various system configuration examples according to an intended use or a purpose. For example, one information processing device may include functions of the transmission terminal 10 and of the external input device 216. In this case, the display units 120 and 216 are aggregated into one display unit, and this display unit may be integrated with one information processing device or may be connected to the information processing device.

Moreover, another information processing device may have the function which the external input device 40 has, and the external input device 40 may call and use the function. Other information processing devices may have the function which the transmission terminal 10 has, and the transmission terminal 10 may call and use the function. Moreover, plural information processing devices may have dispersed functions which the transmission management apparatus 50 has.

Moreover, the storage unit 5000, which the transmission management apparatus 50 has, only has to be on a communication network that the transmission management apparatus 50 can access. The storage unit 1000, which the transmission terminal 10 has, only has to be on a communication network that the transmission terminal 10 can access. The storage unit 4000, which the external input device 40 has, only has to be on a network that the external input device 40 can access.

Second Example

In the present example, the transmission system 1, in which by the user's operation for the display region selection menu displayed on the display unit 216 of the external input device 40, the user can select the entire region or an arbitrary region on the transmission terminal screen and display it, will be described.

Figure 41A:
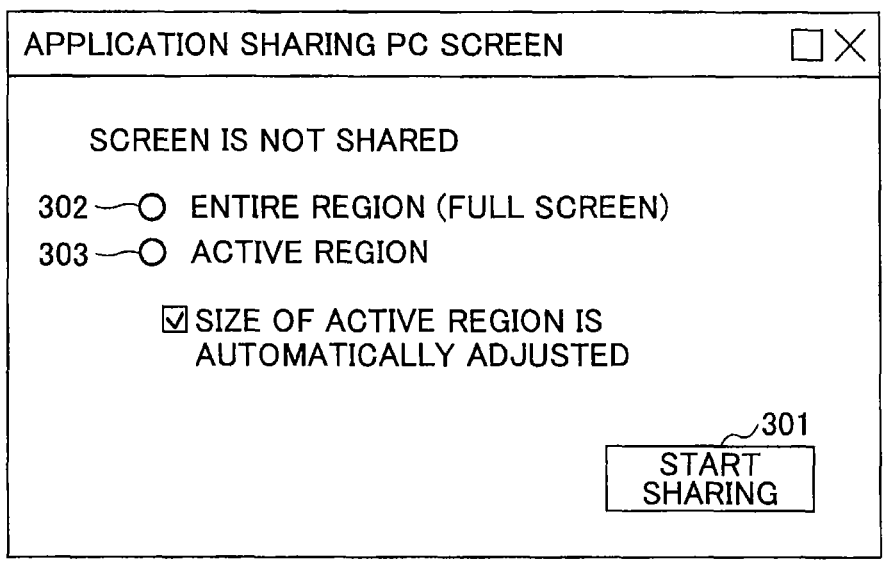
FIGS. 41A and 41B are diagrams illustrating an example of a user interface of a program for an external input device, according to the present embodiment.
Figure 41B:
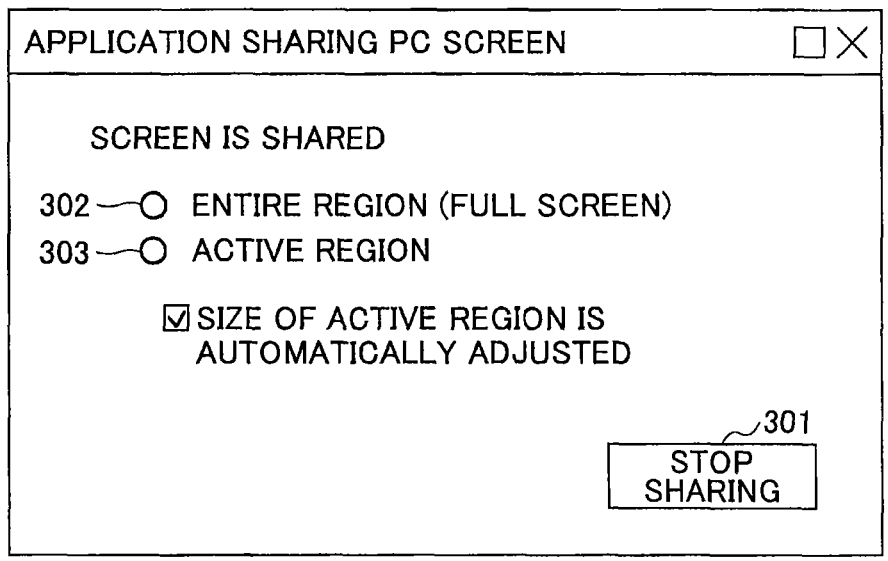

FIGS. 41A and 41B are diagrams illustrating an example of the user interface of the program for the external input device 1451, as in FIG. 21 of the first example. In FIG. 41A, the sharing setting reception button 301 on which a character string "start sharing" is displayed is shown. In FIG. 41B, the sharing setting reception button 301 on which a character string "stop sharing" is displayed is shown. The function of the sharing setting reception button is the same as in the first example.

Moreover, in FIGS. 41A and 41B, two radio buttons 302 and 303 are displayed in addition to the shared setting reception button 301, respectively. On the radio button 302 "entire region (full screen)" is displayed, and on the other radio button 303 "active region" is displayed. That is, the user exclusively selects either one of the entire region and the active region, in which the display data are displayed, by using the radio buttons 302 and 303. When the user selects one of the radio buttons 302 and 303, the operation input reception unit 35 receives the selection.

In the case that the "start sharing" is selected by the shared setting reception button 301, i.e. the display data are shared, when the user switches between the radio buttons 302 and 303, a region, in which the display data are displayed, on the display unit 120 of the transmission terminal 10aa, switches alternately between the entire region and the active region.

In the case that the "start sharing" is not selected by the shared setting reception button 301, i.e. the display data are not shared, when the user clicks the "start sharing", sharing of the display data selected by the radio button 302 or 303 starts.

Figure 42:
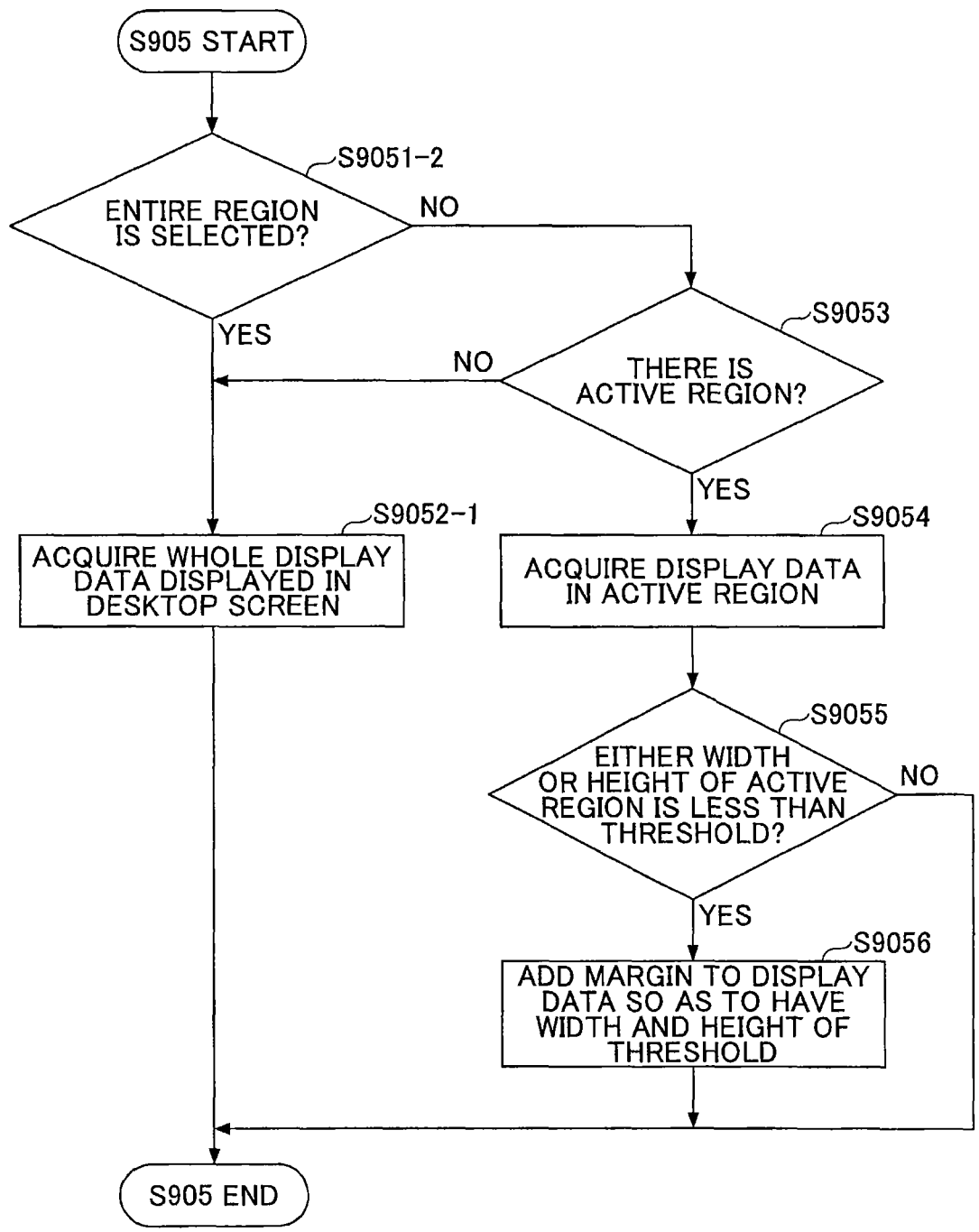
FIG. 42 is a flowchart illustrating in detail an example of a procedure of a display data acquisition unit acquiring display data according to a second embodiment.

Flowcharts for explaining the operation procedure are the same as those in FIGS. 24 to 39C in the first example, but a part in the processes in FIG. 25 is different. FIG. 42 is a diagram illustrating an example of a flowchart for explaining in detail the procedure of the display data acquisition unit 451 acquiring display data.

The operation input reception unit 46 determines whether the user selects the entire region by the radio button 302 (step S9051-2).

In the case where the user selects the entire region by the radio button 302 (step S9051-2: YES), the display data acquisition unit 451 acquires the whole desktop screen displayed on the display unit 216 as the display data (step S9052-1), and the process ends.

In the case that the user does not select the entire region by the radio button 302 (step S9051-2: NO), i.e. the user selects the active region (step S9051-2: NO) by the radio button 303, the display data acquisition unit 451 determines whether there is an active region (step S9053). The method of determination is the same as in the first example.

When the user "aa" closes the active region and there is no active region (step S9053: NO), the process proceeds to step S9052, and the display data acquisition unit 451 acquires the whole desktop screen as the display data.

When there is an active region (step S9053 YES), the display data acquisition unit 451 acquires the display data in the active region, out of display data displayed on the display unit 216 by the display control unit 47 (step S9054). Further processes are the same as in the first example.

According to the present example, even if the OS does not support the operation of treating the whole desktop screen as one region, the user can select the entire region by the display region selection menu 310.

Supplement to Embodiment

Moreover, the transmission system 1 may be a system including a car navigation device mounted on a moving body.

Figure 43:
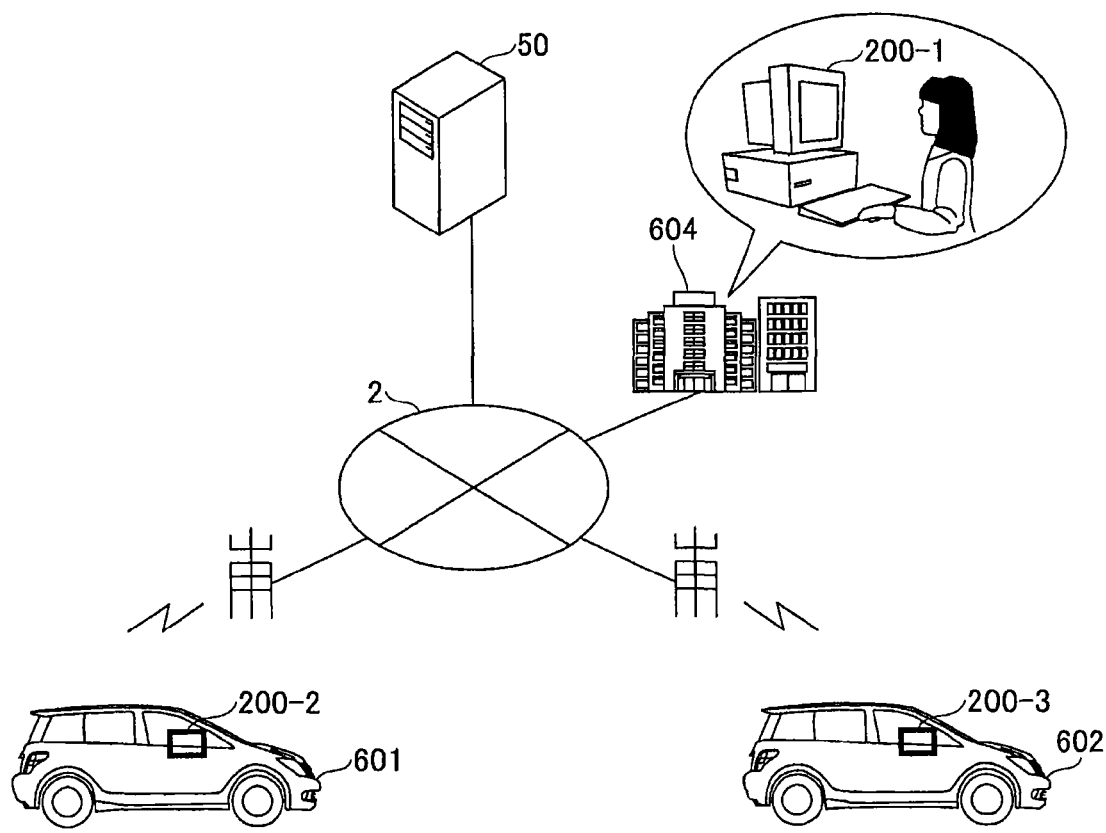
FIG. 43 is a diagram illustrating an example of a system configuration in the case of applying the transmission terminal to the car navigation device, according to the present embodiment.

FIG. 43 is a diagram illustrating an example of a system configuration in the case of applying the transmission terminal 10 to the car navigation device 200. In the following, in the case of distinguishing the car navigation device 200, a reference numeral of the car navigation device 200 will be denoted by 200-i, where i is a natural number.

In this case, one transmission terminal 10 corresponds to a car navigation device 200-2 mounted on a vehicle 601. Another transmission terminal 10 corresponds to a management terminal 200-1 used by a communicator in a management center 604 or to a car navigation device 200-3 mounted on another vehicle 602. The management terminal 200-1 and the car navigation devices 200-2 and 200-3 are connected to each other via a communication network 2. Moreover, the transmission management apparatus 50 establishes sessions for the management terminal 200-1 and the car navigation devices 200-2 and 200-3.

Figure 44:
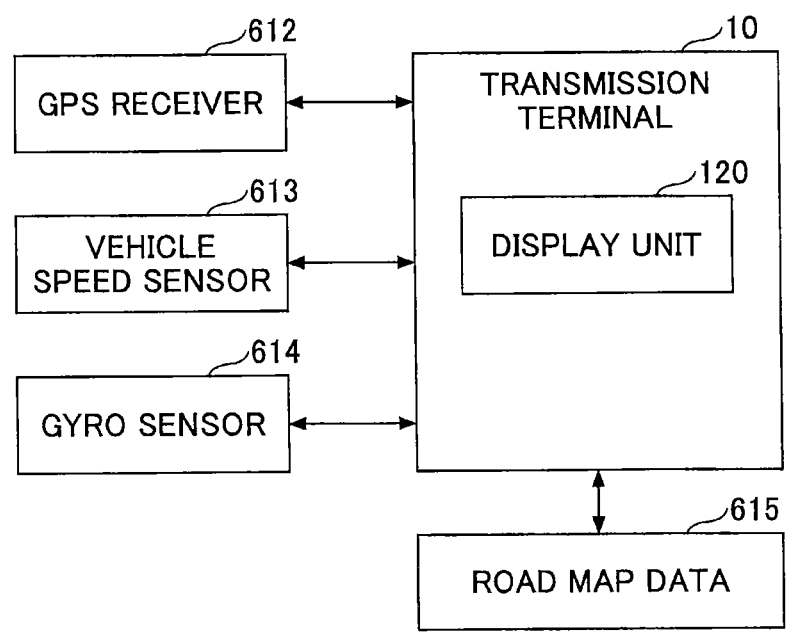
FIG. 44 is a diagram illustrating an example of a configuration of the car navigation device, according to the present embodiment.
Figure 45:
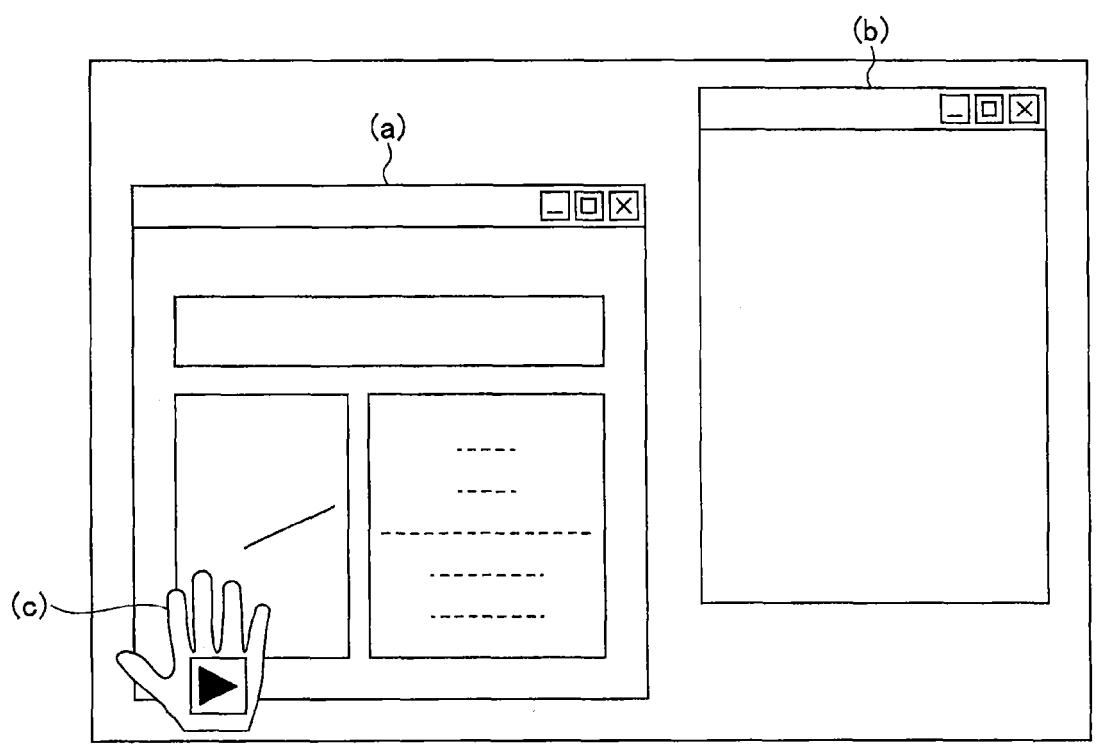
FIG. 45 is a diagram illustrating an example of a screen displayed on an external input device in the related art.

FIG. 44 is a diagram illustrating an example of a configuration of a car navigation device 200. The car navigation device 200 has a mode in which a GPS receiver 612, a vehicle speed sensor 613, a gyro sensor 614 and road map data 615 are connected to the transmission terminal 10 as described above. Moreover, the transmission terminal 10 has a display unit 120 integrated with the transmission terminal 10. Meanwhile, the display unit 120 may be connected with the transmission terminal 10 by wire or wirelessly. The display unit 120 may be detachable from the transmission terminal 10.

The transmission terminal 10 provides functions of the car navigation device 200 by executing programs. The GPS receiver 612 acquires signals from GPS satellites and outputs coordinates of the present position. The vehicle speed sensor 613 is a sensor that detects a velocity of the vehicle 601 or 602 (rotational speed of a wheel). The gyro sensor 614 is a sensor that detects an angular velocity. By integrating the angular velocity, a direction of travel of the vehicle can be detected.

The road map data 615 are data that express a road by a combination of nodes and links. The road map data 615 may be downloaded from outside or may be retained in the vehicle in advance. The road map data are displayed on the display unit 120.

Meanwhile, a PC for sharing screen may be connected to the transmission terminal 10. Moreover, the car navigation device 200 may include a tuner function of receiving radio or TV broadcasting, an audio function of reproducing music, a cooperation function of cooperating with a car-mounted camera such as a rear-view camera or a browsing function of displaying a Web site in addition to the configuration illustrated in FIG. 44.

The transmission terminal 10 estimates a position of the vehicle according to the autonomous navigation which accumulates travel distances detected by the vehicle speed sensor 613 in the direction of travel detected by the gyro sensor 614 starting from the position information detected by the GPS receiver 612. The position of the vehicle is displayed on the road map by a vehicle icon. Moreover, a path to a destination is searched for and a driver is guided. In this way, the transmission terminal 10 realizes the function of the car navigation device.

The car navigation device 200 is connected to the communication network 2 via the transmission terminal 10. For example, by using a mobile phone it is connected to the communication network 2 via a mobile phone network or the like, including wireless communication covering a relatively wide range, mainly an outdoor area or the like, according to antenna power from a base station.

The transmission terminal (car navigation device) 10 displays a list of destination terminals including another transmission terminal 10 connected to the communication network 2 on the display unit 120. From the list of the destination terminals displayed on the display unit 120, a destination terminal is selected. When a session with the destination terminal is established, the transmission terminal 10 (car navigation device) can send image data, sound data or the like to the destination terminal or can receive image data, sound data or the like from the destination terminal. Moreover, by operating the transmission terminal 10 (car navigation device), the information processing device (control unit 611) can acquire display data such as a road map or TV video data. The transmission terminal (car navigation device) can send display data to the other transmission terminal 10 (car navigation device) connected to the communication network 2.

As explained above, a transmission terminal (car navigation device) mounted on a moving body sends/receives image data, sound data, display data or the like, in the same manner as the transmission terminal 10 in the video conference system. Accordingly, the transmission system 1 may be a system including a transmission terminal 10 (car navigation device) mounted on a moving body.

A system according to the present embodiment includes a first transmission terminal communicably connected with a second transmission terminal via a network, and an information processing apparatus communicably connectable to the first transmission terminal. The system according to the present embodiment further includes an aspect ratio change unit that transforms a shape of a display region in a screen which is displayed on a display unit so that an aspect ratio of the display region is changed to a predetermined value, the display unit being integrated with the information processing apparatus or being connected to the information processing apparatus; an acquisition unit that acquires display data displayed in the display region, an aspect ratio of the display region having been changed to the predetermined value by the aspect ratio change unit; and a data transmission unit that transmits the display data displayed in the display region acquired by the acquisition unit to the first transmission terminal.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Further, the present invention is not limited to these embodiments, but various variations and modifications may be made without departing from the scope of the present invention.

The present application is based on and claims the benefit of priority of Japanese Priority Applications No. 2013-194124 filed on Sep. 19, 2013 and No. 2014-155220 filed on Jul. 30, 2014, the entire contents of which are hereby incorporated by reference.

What is claimed is:

1. An information processing apparatus, communicably connectable to a first transmission terminal, which is configured to perform video communication with a second transmission terminal via a network, comprising:
   circuitry configured to
      transform a shape of a display region in a screen which is displayed on a first display so that an aspect ratio of the display region is changed to a predetermined value, the first display being integrated with the information processing apparatus or being connected to the information processing apparatus, the first display being separate from a second display used by the first transmission terminal to display the video communication with the second transmission terminal;
      acquire display data displayed in the display region, an aspect ratio of the display region having been changed to the predetermined value by the circuitry; and
      transmit the acquired display data to the first transmission terminal to be included in the video communication with the second communication terminal.

2. The information processing apparatus as claimed in claim 1, wherein the circuitry changes a length of a vertical size of the display region without changing a length of a horizontal size of the display region to change the aspect ratio of the display region to the predetermined value.

3. The information processing apparatus as claimed in claim 1, wherein the circuitry changes a length of a horizontal size of the display region without changing a length of a vertical size of the display region to change the aspect ratio of the display region to the predetermined value.

4. The information processing apparatus as claimed in claim 1, wherein the circuitry changes a length of a vertical size of the display region without changing a length of a horizontal size of the display region to change the aspect ratio of the display region to the predetermined value in the case where an area of the display region increases when the length of the vertical size of the display region is changed and the length of the horizontal size of the display region is not changed so as to change the aspect ratio of the display region to the predetermined value, and the circuitry changes the length of the horizontal size of the display region without changing the length of the vertical size of the display region to change the aspect ratio of the display region to the predetermined value in the case where the area of the display region increases when the length of the horizontal size of the display region is changed and the length of the vertical size of the display region is not changed so as to change the aspect ratio of the display region to the predetermined value.

5. The information processing apparatus as claimed in claim 1, wherein the circuitry changes a length of a vertical size of the display region without changing a length of a horizontal size of the display region to change the aspect ratio of the display region to the predetermined value in the case where an area of the display region decreases when the length of the vertical size of the display region is changed and the length of the horizontal size of the display region is not changed so as to change the aspect ratio of the display region to the predetermined value, and the circuitry changes the length of the horizontal size of the display region without changing the length of the vertical size of the display region to change the aspect ratio of the display region to the predetermined value in the case where the area of the display region decreases when the length of the horizontal size of the display region is changed and the length of the vertical size of the display region is not changed so as to change the aspect ratio of the display region to the predetermined value.

6. The information processing apparatus as claimed in claim 1, wherein the circuitry changes a length of a horizontal size of the display region and a length of a vertical size of the display region so that an area of the display region remains unchanged to change the aspect ratio of the display region to the predetermined value.

7. The information processing apparatus as claimed in claim 1, wherein:
the circuitry receives a setting whether to permit the changing the aspect ratio of the display region.

8. The information processing apparatus as claimed in claim 7, wherein the circuitry receives any one of a setting of changing a length of a vertical size of the display region without changing a length of a horizontal size of the display region to change the aspect ratio of the display region to the predetermined value, a setting of changing the length of the horizontal size of the display region without changing the length of the vertical size of the display region to change the aspect ratio of the display region to the predetermined value, a setting of selecting from the length of the horizontal size of the display region and the length of the vertical size of the display region the length which is not changed when the aspect ratio of the display region is changed to the predetermined value where an area of the display region increases, a setting of selecting from the length of the horizontal size of the display region and the length of the vertical size of the display region the length which is not changed when the aspect ratio of the display region is changed to the predetermined value where the area of the display region decreases, and a setting of changing the length of the horizontal size of the display region and the length of the vertical size of the display region so that the area of the display region remains unchanged to change the aspect ratio of the display region to the predetermined value.

9. The information processing apparatus as claimed in claim 1, wherein the predetermined value is an aspect ratio of a screen of the second display connected to the first transmission terminal.

10. An information processing method in an information processing apparatus communicably connectable to a first transmission terminal, which is configured to perform video communication with a second transmission terminal via a network, the method comprising:
transforming, by circuitry of the information processing apparatus, a shape of a display region in a screen which is displayed on a first display so that an aspect ratio of the display region is changed to a predetermined value, the first display being integrated with the information processing apparatus or being connected to the information processing apparatus, the first display being separate from a second display used by the first transmission terminal to display the video communication with the second transmission terminal;
acquiring, by the circuitry, display data displayed in the display region, an aspect ratio of the display region having been changed to the predetermined value by the circuitry; and
transmitting the acquired display data to the first transmission terminal to be included in the video communication with the second communication terminal.

11. The information processing apparatus as claimed in claim 1, wherein the circuitry changes a length of one of a vertical size and horizontal size of the display region without changing a length of the other one of the vertical size and the horizontal size of the display region to change the aspect ratio of the display region to the predetermined value.

12. A non-transitory computer-readable recording medium for storing therein a computer program that includes instructions which when executed on an information processing apparatus communicably connectable to a first transmission terminal, which is configured to perform video communication with a second transmission terminal via a network, causes the information processing apparatus to perform a method comprising:
transforming, by circuitry of the information processing apparatus, a shape of a display region in a screen which is displayed on a first display so that an aspect ratio of the display region is changed to a predetermined value, the first display being integrated with the information processing apparatus or being connected to the information processing apparatus, the first display being separate from a second display used by the first transmission terminal to display the video communication with the second transmission terminal;
acquiring, by the circuitry, display data displayed in the display region, an aspect ratio of the display region having been changed to the predetermined value by the circuitry; and
transmitting the acquired display data to the first transmission terminal to be included in the video communication with the second communication terminal.

* * * * *